(12) United States Patent
Yuan et al.

(10) Patent No.: US 9,389,367 B2
(45) Date of Patent: Jul. 12, 2016

(54) OPTICAL WAVEGUIDE AND LUMINAIRE INCORPORATING SAME

(71) Applicant: Cree, Inc., Durham, NC (US)

(72) Inventors: Zongjie Yuan, Grayslake, IL (US); Kurt S. Wilcox, Libertyville, IL (US); Eric J. Tarsa, Goleta, CA (US); Fabian Jean-Daniel Rol, Goleta, CA (US); James Ibbetson, Santa Barbara, CA (US); Bernd P. Keller, Santa Barbara, CA (US); Nicholas W. Medendorp, Jr., Raleigh, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 13/938,877

(22) Filed: Jul. 10, 2013

(65) Prior Publication Data

US 2014/0211508 A1    Jul. 31, 2014

Related U.S. Application Data

(63) Continuation of application No. 13/840,563, filed on Mar. 15, 2013.

(60) Provisional application No. 61/758,660, filed on Jan. 30, 2013.

(51) Int. Cl.
*F21V 7/04* (2006.01)
*G02B 6/30* (2006.01)
(Continued)

(52) U.S. Cl.
CPC . *G02B 6/305* (2013.01); *F21K 9/52* (2013.01); *G02B 6/0021* (2013.01);
(Continued)

(58) Field of Classification Search
CPC ........ G02B 5/045; G02B 6/00; G02B 6/0038; G02B 6/0013; G02B 6/0016; G02B 6/0033; G02B 6/0036; G02B 6/0073; G02B 6/0011; G02B 6/0023; G02B 6/0021; G02B 6/0028; G02B 6/003; G02B 6/0035; G02B 6/0091; G02B 6/34; G02B 6/262; F21Y 2101/02; F21Y 2105/00; F21Y 48/2243; F21Y 48/2268; F21Y 48/2281; F21Y 48/236
USPC ............ 362/23.1, 23.2, 97.1, 97.2, 97.3, 230, 362/244, 297–299, 309, 329, 333, 336, 337, 362/339, 555, 608, 610, 612, 613, 619, 620, 362/621, 625, 626; 349/57, 58, 62, 64, 65
See application file for complete search history.

(56) References Cited

U.S. PATENT DOCUMENTS

| 615,108 A | 11/1898 | De Segundo |
| 766,515 A | 8/1904 | Northrup |

(Continued)

FOREIGN PATENT DOCUMENTS

| DE | 20014114 | 12/2000 |
| DE | 20107425 | 7/2001 |

(Continued)

OTHER PUBLICATIONS

U.S. Appl. No. 13/657,421, filed Oct. 22, 2012 (38 pages).
(Continued)

*Primary Examiner* — Hargobind S Sawhney
(74) *Attorney, Agent, or Firm* — McCracken & Gillen LLC

(57) ABSTRACT

An optical waveguide includes a body of optically transmissive material having a width substantially greater than an overall thickness thereof. The body of material has a first side, a second side opposite the first side, and a plurality of interior bores extending between the first and second sides each adapted to receive a light emitting diode. Extraction features are disposed on the second side and the extraction features direct light out of at least the first side and at least one extraction feature forms a taper disposed at an outer portion of the body.

13 Claims, 50 Drawing Sheets

(51) Int. Cl.
*F21K 99/00* (2016.01)
*G02B 6/24* (2006.01)
*G02B 6/32* (2006.01)
*G02B 6/34* (2006.01)
*G02B 6/26* (2006.01)
*F21V 8/00* (2006.01)

(52) U.S. Cl.
CPC ........... *G02B 6/0031* (2013.01); *G02B 6/0035* (2013.01); *G02B 6/24* (2013.01); *G02B 6/262* (2013.01); *G02B 6/32* (2013.01); *G02B 6/34* (2013.01)

(56) References Cited

U.S. PATENT DOCUMENTS

| | | |
|---|---|---|
| D67,806 S | 7/1925 | Hoyt et al. |
| 2,043,951 A | 6/1936 | Eksergian |
| 2,992,587 A | 4/1958 | Hicks, Jr. et al. |
| 3,372,740 A | 3/1968 | Kastovich et al. |
| 3,532,871 A | 10/1970 | Shipman |
| D219,546 S | 12/1970 | Kaiser et al. |
| 4,146,297 A | 3/1979 | Alferness et al. |
| 4,441,787 A | 4/1984 | Lichtenberger |
| 4,714,983 A | 12/1987 | Lang |
| D298,861 S | 12/1988 | Ewing et al. |
| 4,914,553 A | 4/1990 | Hamada et al. |
| 4,954,930 A | 9/1990 | Maegawa et al. |
| 4,977,486 A | 12/1990 | Gotoh |
| 5,005,108 A | 4/1991 | Pristash |
| 5,009,483 A | 4/1991 | Rockwell, III |
| 5,026,161 A | 6/1991 | Werner |
| 5,040,098 A | 8/1991 | Tanaka et al. |
| 5,047,761 A * | 9/1991 | Sell .......... 340/815.42 |
| 5,061,404 A | 10/1991 | Wu et al. |
| 5,097,258 A | 3/1992 | Iwaki |
| 5,113,177 A | 5/1992 | Cohen |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A * | 10/1995 | Ciupke et al. ............ 362/617 |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,624,202 A | 4/1997 | Grierson |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,002,079 A | 12/1999 | Shin et al. |
| 6,002,829 A | 12/1999 | Winston et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A * | 8/2000 | Jenkins et al. ................ 359/726 |
| 6,134,092 A | 10/2000 | Pelka et al. |
| 6,139,163 A | 10/2000 | Satoh et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| D446,333 S | 8/2001 | Fröis |
| 6,304,693 B1 | 10/2001 | Buelow, II et al. |
| 6,310,704 B1 | 10/2001 | Dogan et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang et al. |
| 6,485,157 B2 | 11/2002 | Ohkawa |
| 6,508,563 B2 | 1/2003 | Parker et al. |
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |

(56) References Cited

U.S. PATENT DOCUMENTS

| | | |
|---|---|---|
| 6,612,723 B2 | 9/2003 | Futhey et al. |
| 6,616,290 B2 | 9/2003 | Ohkawa |
| 6,629,764 B1 * | 10/2003 | Uehara .................. 362/609 |
| 6,633,722 B1 | 10/2003 | Kohara et al. |
| 6,634,772 B2 | 10/2003 | Yaphe et al. |
| 6,637,924 B2 | 10/2003 | Pelka et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,854,857 B2 | 2/2005 | Hara et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| D511,221 S | 11/2005 | Zucker |
| 6,971,758 B2 | 12/2005 | Inui et al. |
| 6,974,241 B2 | 12/2005 | Hara et al. |
| 6,992,335 B2 | 1/2006 | Ohkawa |
| 7,008,097 B1 | 3/2006 | Hulse |
| 7,010,212 B2 | 3/2006 | Emmons et al. |
| D518,911 S | 4/2006 | Lee |
| 7,021,805 B2 | 4/2006 | Armano et al. |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,063,430 B2 * | 6/2006 | Greiner .................. 362/30 |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| D532,532 S | 11/2006 | Maxik |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston et al. |
| 7,218,830 B2 | 5/2007 | Iimura |
| 7,222,995 B1 | 5/2007 | Bayat et al. |
| 7,223,004 B2 | 5/2007 | Chen et al. |
| D544,110 S | 6/2007 | Hooker et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,290,906 B2 | 11/2007 | Suzuki et al. |
| 7,292,767 B2 | 11/2007 | Cheng |
| 7,322,733 B2 | 1/2008 | Chang et al. |
| D563,036 S | 2/2008 | Miryairi et al. |
| D565,778 S | 4/2008 | Pedersen |
| D566,300 S | 4/2008 | Lo |
| 7,364,342 B2 | 4/2008 | Parker et al. |
| D568,529 S | 5/2008 | Colleran, Jr. et al. |
| D570,025 S | 5/2008 | Walker |
| 7,369,918 B2 | 5/2008 | Cosgrove |
| D573,292 S | 7/2008 | Zheng et al. |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| D575,898 S | 8/2008 | Tran et al. |
| 7,407,303 B2 | 8/2008 | Wanninger et al. |
| 7,422,357 B1 * | 9/2008 | Chang .................. 362/602 |
| D581,555 S | 11/2008 | To et al. |
| 7,455,416 B2 | 11/2008 | Chen |
| 7,458,714 B2 * | 12/2008 | Chang .................. 362/626 |
| 7,465,074 B2 | 12/2008 | Blumel |
| D584,838 S | 1/2009 | To et al. |
| 7,486,854 B2 | 2/2009 | Van Ostrand et al. |
| 7,488,093 B1 | 2/2009 | Huang et al. |
| D587,839 S | 3/2009 | Guerico |
| D589,195 S | 3/2009 | Sabering |
| 7,513,672 B2 | 4/2009 | Parker |
| 7,520,650 B2 * | 4/2009 | Smith .................. 362/555 |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| D604,002 S | 11/2009 | Santoro |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,193 B2 | 12/2009 | Chang |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| D609,384 S | 2/2010 | Gray et al. |
| D610,722 S | 2/2010 | Bi |
| 7,654,687 B2 | 2/2010 | Tsai et al. |
| 7,654,719 B2 | 2/2010 | Chang |
| 7,663,804 B2 | 2/2010 | Chang |
| D612,527 S | 3/2010 | Espiau et al. |
| 7,674,018 B2 | 3/2010 | Holder et al. |
| 7,695,165 B2 | 4/2010 | Chang |
| 7,696,531 B2 | 4/2010 | Miyao |
| 7,703,945 B2 | 4/2010 | Leung |
| 7,703,950 B2 | 4/2010 | Ewert et al. |
| 7,703,967 B2 | 4/2010 | Parker |
| D615,232 S | 5/2010 | Xiao et al. |
| D616,145 S | 5/2010 | Boissevain |
| 7,710,663 B2 | 5/2010 | Barnes et al. |
| 7,722,224 B1 | 5/2010 | Coleman et al. |
| 7,722,241 B2 * | 5/2010 | Chang .................. 362/620 |
| 7,724,321 B2 | 5/2010 | Hsieh et al. |
| D617,489 S | 6/2010 | Santoro |
| D618,842 S | 6/2010 | Ngai et al. |
| 7,730,967 B2 | 6/2010 | Ballantyne et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 * | 7/2010 | Sakai et al. .................. 362/619 |
| D622,894 S | 8/2010 | Ngai et al. |
| 7,766,515 B2 | 8/2010 | Condon et al. |
| 7,771,087 B2 | 8/2010 | Wilcox et al. |
| 7,775,697 B2 | 8/2010 | Hirano et al. |
| 7,776,236 B2 | 8/2010 | Shih et al. |
| 7,780,306 B2 * | 8/2010 | Hoshi .................. 362/97.1 |
| 7,784,954 B1 | 8/2010 | Coleman |
| D623,793 S | 9/2010 | Ngai et al. |
| 7,798,695 B2 | 9/2010 | Parker |

(56) References Cited

U.S. PATENT DOCUMENTS

| | | |
|---|---|---|
| D626,260 S | 10/2010 | Wei |
| 7,806,581 B2 | 10/2010 | Lee |
| 7,810,949 B2 | 10/2010 | Chang |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| D627,913 S | 11/2010 | Gielen |
| D628,319 S | 11/2010 | Yoshinobu et al. |
| 7,826,698 B1 | 11/2010 | Meir et al. |
| D629,129 S | 12/2010 | Lin et al. |
| 7,845,826 B2 | 12/2010 | Aylward et al. |
| 7,850,357 B2 | 12/2010 | Kim et al. |
| 7,857,487 B2 | 12/2010 | Wu et al. |
| 7,857,619 B2 | 12/2010 | Liu |
| D630,347 S | 1/2011 | Pei et al. |
| D630,775 S | 1/2011 | Pan |
| D631,577 S | 1/2011 | Yoshinobu et al. |
| D631,601 S | 1/2011 | Lodhie |
| 7,866,871 B2 | 1/2011 | Couzin et al. |
| D633,636 S | 3/2011 | Gielen |
| D634,056 S | 3/2011 | Hokzaono et al. |
| 7,905,646 B2 | 3/2011 | Adachi et al. |
| 7,907,804 B2 | 3/2011 | Meir et al. |
| 7,909,496 B2 | 3/2011 | Matheson et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 * | 6/2011 | Bloemen et al. ............... 362/299 |
| 7,969,531 B1 | 6/2011 | Li et al. |
| 7,970,246 B2 | 6/2011 | Travis et al. |
| D641,923 S | 7/2011 | Radchenko et al. |
| 7,976,204 B2 | 7/2011 | Li et al. |
| D642,725 S | 8/2011 | Kong et al. |
| 7,991,257 B1 | 8/2011 | Coleman |
| 7,997,784 B2 | 8/2011 | Tsai |
| 8,002,450 B2 | 8/2011 | Van Ostrand et al. |
| D645,194 S | 9/2011 | Budike, Jr. et al. |
| D646,406 S | 10/2011 | Tsai et al. |
| 8,033,674 B1 | 10/2011 | Coleman et al. |
| 8,033,706 B1 | 10/2011 | Kelly et al. |
| 8,038,308 B2 * | 10/2011 | Greiner ............................ 362/84 |
| 8,047,673 B2 | 11/2011 | Santoro |
| 8,047,696 B2 | 11/2011 | Ijzerman et al. |
| 8,052,316 B2 | 11/2011 | Lee |
| 8,054,409 B2 | 11/2011 | Hsieh et al. |
| 8,057,056 B2 | 11/2011 | Zhu et al. |
| 8,061,877 B2 * | 11/2011 | Chang ............................ 362/339 |
| 8,064,743 B2 | 11/2011 | Meir et al. |
| 8,067,884 B2 | 11/2011 | Li |
| 8,070,345 B2 | 12/2011 | Zhang et al. |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| D654,618 S | 2/2012 | Kong et al. |
| 8,113,704 B2 * | 2/2012 | Bae et al. ........................ 362/613 |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| D659,880 S | 5/2012 | Maxik et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| D662,255 S | 6/2012 | Kluś |
| D662,256 S | 6/2012 | Kluś |
| D662,643 S | 6/2012 | Takahashi et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| D668,370 S | 10/2012 | Guercio |
| D669,624 S | 10/2012 | Daniels |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 * | 10/2012 | Coushaine et al. ........... 362/329 |
| 8,297,818 B2 | 10/2012 | Richardson |
| 8,301,002 B2 | 10/2012 | Shani |
| D670,422 S | 11/2012 | Siekmann |
| D670,856 S | 11/2012 | Butler et al. |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmerman |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 * | 1/2013 | Nakamura .................... 362/97.3 |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmakjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| D677,806 S | 3/2013 | Jiang et al. |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| D679,437 S | 4/2013 | Watt |
| D679,444 S | 4/2013 | Vasylyev |
| D679,843 S | 4/2013 | Hsu et al. |
| D681,262 S | 4/2013 | Lee |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shaiu et al. |
| 8,434,892 B2 | 5/2013 | Zwak et al. |
| 8,434,893 B2 | 5/2013 | Boyer et al. |
| 8,434,913 B2 * | 5/2013 | Vissenberg ............... 362/311.12 |
| 8,434,914 B2 | 5/2013 | Li et al. |
| 8,449,128 B2 | 5/2013 | Ko et al. |
| 8,449,142 B1 | 5/2013 | Martin et al. |
| D684,296 S | 6/2013 | Henderson et al. |
| 8,454,218 B2 | 6/2013 | Wang et al. |

(56) References Cited

U.S. PATENT DOCUMENTS

| | | | |
|---|---|---|---|
| 8,461,602 B2 | 6/2013 | Lerman et al. | |
| 8,469,559 B2 | 6/2013 | Williams | |
| 8,475,010 B2 | 7/2013 | Vissenberg et al. | |
| 8,482,186 B2 | 7/2013 | Wang et al. | |
| 8,485,684 B2 | 7/2013 | Lou et al. | |
| 8,506,112 B1 | 8/2013 | Dau et al. | |
| 8,511,868 B2 | 8/2013 | Haugaard et al. | |
| 8,534,896 B2 | 9/2013 | Boonekamp | |
| 8,534,901 B2 | 9/2013 | Panagotacos et al. | |
| 8,541,795 B2 | 9/2013 | Keller et al. | |
| 8,547,022 B2 | 10/2013 | Summerford et al. | |
| 8,564,004 B2 | 10/2013 | Tarsa et al. | |
| 8,567,983 B2 | 10/2013 | Boyer et al. | |
| 8,567,986 B2 | 10/2013 | Szprengiel et al. | |
| D694,449 S | 11/2013 | Walker | |
| 8,573,823 B2 | 11/2013 | Dau et al. | |
| 8,585,253 B2 | 11/2013 | Duong et al. | |
| 8,591,072 B2 | 11/2013 | Shani et al. | |
| 8,591,090 B2 | 11/2013 | Lin | |
| 8,593,070 B2 | 11/2013 | Wang et al. | |
| D695,431 S | 12/2013 | Lay | |
| D695,442 S | 12/2013 | Speier et al. | |
| D695,447 S | 12/2013 | Speier et al. | |
| 8,598,778 B2 | 12/2013 | Allen et al. | |
| 8,602,586 B1 | 12/2013 | Dau et al. | |
| 8,608,351 B2 | 12/2013 | Peifer | |
| 8,616,746 B2 | 12/2013 | Shinohara | |
| 8,618,735 B2 | 12/2013 | Coplin et al. | |
| 8,632,214 B1 | 1/2014 | Tickner et al. | |
| 8,641,219 B1* | 2/2014 | Johnson et al. | 362/97.3 |
| 8,657,479 B2 | 2/2014 | Morgan et al. | |
| D702,377 S | 4/2014 | Lay | |
| 8,696,173 B2 | 4/2014 | Urtiga et al. | |
| 8,702,281 B2 | 4/2014 | Okada et al. | |
| 8,724,052 B2 | 5/2014 | Hsieh et al. | |
| 8,740,440 B2 | 6/2014 | Mizuno et al. | |
| 8,755,005 B2 | 6/2014 | Bierhuizen et al. | |
| 8,770,821 B2 | 7/2014 | Ijzerman et al. | |
| 8,780,299 B2 | 7/2014 | Ryu et al. | |
| 8,833,996 B2 | 9/2014 | Dau et al. | |
| 8,833,999 B2 | 9/2014 | Wang et al. | |
| 8,840,276 B2 | 9/2014 | Shani et al. | |
| 8,851,712 B2 | 10/2014 | Shani et al. | |
| 8,864,360 B2 | 10/2014 | Parker et al. | |
| 8,870,430 B2 | 10/2014 | Kamikatano et al. | |
| 8,870,431 B2 | 10/2014 | Lin et al. | |
| 8,882,323 B2 | 11/2014 | Solomon et al. | |
| 8,905,569 B2 | 12/2014 | Thomas et al. | |
| 8,915,611 B2 | 12/2014 | Zhang | |
| 8,917,962 B1 | 12/2014 | Nichol et al. | |
| 8,950,919 B2 | 2/2015 | Chen | |
| 8,960,969 B2 | 2/2015 | Freund | |
| 8,975,827 B2 | 3/2015 | Chobot et al. | |
| 9,046,225 B2 | 6/2015 | Meyers et al. | |
| 9,081,125 B2 | 7/2015 | Dau et al. | |
| 2001/0019479 A1 | 9/2001 | Nakabayashi et al. | |
| 2002/0061178 A1 | 5/2002 | Winston et al. | |
| 2002/0172039 A1 | 11/2002 | Inditsky | |
| 2003/0034985 A1 | 2/2003 | Needham Riddle et al. | |
| 2003/0146688 A1 | 8/2003 | Kitazawa et al. | |
| 2004/0008952 A1 | 1/2004 | Kragl | |
| 2004/0080938 A1 | 4/2004 | Holman et al. | |
| 2004/0135933 A1 | 7/2004 | Leu et al. | |
| 2004/0146241 A1 | 7/2004 | Deladurantaye et al. | |
| 2004/0213003 A1 | 10/2004 | Lauderdale et al. | |
| 2004/0240217 A1 | 12/2004 | Rice | |
| 2005/0024744 A1 | 2/2005 | Falicoff et al. | |
| 2005/0111235 A1 | 5/2005 | Suzuki et al. | |
| 2005/0201103 A1 | 9/2005 | Saccomanno et al. | |
| 2005/0210643 A1 | 9/2005 | Mezei et al. | |
| 2005/0286251 A1 | 12/2005 | Smith | |
| 2006/0002146 A1* | 1/2006 | Baba | 362/613 |
| 2006/0076568 A1 | 4/2006 | Keller et al. | |
| 2006/0187651 A1 | 8/2006 | Kim et al. | |
| 2006/0262521 A1 | 11/2006 | Piepgras et al. | |
| 2007/0081780 A1 | 4/2007 | Scholl | |
| 2007/0086179 A1* | 4/2007 | Chen et al. | 362/27 |
| 2007/0121340 A1* | 5/2007 | Hoshi | 362/600 |
| 2007/0139905 A1 | 6/2007 | Birman et al. | |
| 2007/0189033 A1* | 8/2007 | Watanabe et al. | 362/606 |
| 2007/0245607 A1 | 10/2007 | Awai et al. | |
| 2007/0253058 A1 | 11/2007 | Wood | |
| 2007/0274654 A1 | 11/2007 | Choudhury et al. | |
| 2008/0002399 A1 | 1/2008 | Villard et al. | |
| 2008/0037284 A1 | 2/2008 | Rudisill | |
| 2008/0094853 A1 | 4/2008 | Kim et al. | |
| 2008/0137695 A1 | 6/2008 | Takahashi et al. | |
| 2008/0186273 A1 | 8/2008 | Krijn et al. | |
| 2008/0192458 A1 | 8/2008 | Li | |
| 2008/0199143 A1 | 8/2008 | Turner | |
| 2008/0266879 A1 | 10/2008 | Chang | |
| 2008/0266901 A1 | 10/2008 | Chang | |
| 2009/0027893 A1 | 1/2009 | Chang | |
| 2009/0091948 A1 | 4/2009 | Wang et al. | |
| 2009/0103293 A1 | 4/2009 | Harbers et al. | |
| 2009/0196071 A1 | 8/2009 | Matheson et al. | |
| 2009/0257242 A1 | 10/2009 | Wendman | |
| 2009/0297090 A1 | 12/2009 | Bogner et al. | |
| 2009/0309494 A1 | 12/2009 | Patterson et al. | |
| 2009/0310367 A1 | 12/2009 | Kuo | |
| 2009/0316414 A1 | 12/2009 | Yang et al. | |
| 2010/0008088 A1 | 1/2010 | Koizumi et al. | |
| 2010/0008628 A1 | 1/2010 | Shani | |
| 2010/0027257 A1 | 2/2010 | Boonekamp et al. | |
| 2010/0046219 A1* | 2/2010 | Pijlman et al. | 362/235 |
| 2010/0053959 A1 | 3/2010 | Ijzerman et al. | |
| 2010/0073597 A1* | 3/2010 | Bierhuizen et al. | 349/62 |
| 2010/0079843 A1 | 4/2010 | Derichs et al. | |
| 2010/0079980 A1* | 4/2010 | Sakai | 362/97.1 |
| 2010/0110673 A1 | 5/2010 | Bergman et al. | |
| 2010/0110679 A1 | 5/2010 | Teng et al. | |
| 2010/0118531 A1 | 5/2010 | Montagne | |
| 2010/0128483 A1 | 5/2010 | Reo et al. | |
| 2010/0133422 A1 | 6/2010 | Lin et al. | |
| 2010/0157577 A1 | 6/2010 | Montgomery et al. | |
| 2010/0208460 A1 | 8/2010 | Ladewig et al. | |
| 2010/0220484 A1 | 9/2010 | Shani et al. | |
| 2010/0220497 A1 | 9/2010 | Ngai | |
| 2010/0231143 A1 | 9/2010 | May et al. | |
| 2010/0238645 A1 | 9/2010 | Bailey | |
| 2010/0238671 A1 | 9/2010 | Catone et al. | |
| 2010/0246158 A1 | 9/2010 | Van Gorkom et al. | |
| 2010/0254129 A1 | 10/2010 | Le Toquin et al. | |
| 2010/0301360 A1 | 12/2010 | Van De Ven et al. | |
| 2010/0302218 A1 | 12/2010 | Bita et al. | |
| 2010/0302616 A1 | 12/2010 | Bita et al. | |
| 2010/0302783 A1 | 12/2010 | Shastry et al. | |
| 2010/0302803 A1 | 12/2010 | Bita et al. | |
| 2010/0315833 A1 | 12/2010 | Holman et al. | |
| 2010/0320904 A1 | 12/2010 | Meir | |
| 2010/0328936 A1 | 12/2010 | Pance et al. | |
| 2011/0007505 A1 | 1/2011 | Wang et al. | |
| 2011/0013397 A1 | 1/2011 | Catone et al. | |
| 2011/0013420 A1 | 1/2011 | Coleman et al. | |
| 2011/0037388 A1 | 2/2011 | Lou et al. | |
| 2011/0044022 A1 | 2/2011 | Ko et al. | |
| 2011/0044582 A1 | 2/2011 | Travis et al. | |
| 2011/0051457 A1 | 3/2011 | Chen | |
| 2011/0058372 A1 | 3/2011 | Lerman et al. | |
| 2011/0063830 A1 | 3/2011 | Narendran et al. | |
| 2011/0063838 A1 | 3/2011 | Dau et al. | |
| 2011/0063855 A1 | 3/2011 | Vissenberg | |
| 2011/0069843 A1 | 3/2011 | Cohen et al. | |
| 2011/0122616 A1 | 5/2011 | Hochstein | |
| 2011/0163681 A1 | 7/2011 | Dau et al. | |
| 2011/0163683 A1 | 7/2011 | Steele et al. | |
| 2011/0170289 A1 | 7/2011 | Allen et al. | |
| 2011/0180818 A1 | 7/2011 | Lerman et al. | |
| 2011/0187273 A1 | 8/2011 | Summerford et al. | |
| 2011/0193105 A1 | 8/2011 | Lerman et al. | |
| 2011/0193106 A1 | 8/2011 | Lerman et al. | |
| 2011/0193114 A1 | 8/2011 | Lerman et al. | |
| 2011/0195532 A1 | 8/2011 | Lerman et al. | |
| 2011/0198631 A1 | 8/2011 | Lerman et al. | |

(56) References Cited

U.S. PATENT DOCUMENTS

| | | |
|---|---|---|
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1* | 10/2011 | Boonekamp ............ 362/555 |
| 2011/0261570 A1 | 10/2011 | Okada et al. |
| 2011/0273079 A1 | 11/2011 | Pickard et al. |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0014128 A1 | 1/2012 | Lin |
| 2012/0020108 A1 | 1/2012 | Chang |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0068615 A1 | 3/2012 | Duong |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0075873 A1 | 3/2012 | Cooper |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |
| 2012/0147624 A1 | 6/2012 | Li et al. |
| 2012/0152490 A1 | 6/2012 | Wen et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Pectavich et al. |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0287677 A1 | 11/2012 | Wheatley et al. |
| 2012/0298181 A1 | 11/2012 | Cashion et al. |
| 2012/0307496 A1 | 12/2012 | Phillips et al. |
| 2012/0320626 A1 | 12/2012 | Quilici et al. |
| 2012/0326614 A1 | 12/2012 | Tsuji et al. |
| 2013/0003363 A1 | 1/2013 | Lu et al. |
| 2013/0003409 A1 | 1/2013 | Vissenberg et al. |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1 | 2/2013 | Dau et al. |
| 2013/0044480 A1 | 2/2013 | Sato et al. |
| 2013/0077298 A1 | 3/2013 | Steele et al. |
| 2013/0107518 A1 | 5/2013 | Boyer et al. |
| 2013/0107527 A1 | 5/2013 | Boyer et al. |
| 2013/0107528 A1 | 5/2013 | Boyer et al. |
| 2013/0128593 A1 | 5/2013 | Luo |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0300310 A1 | 11/2013 | Hu et al. |
| 2013/0328073 A1 | 12/2013 | Lowes et al. |
| 2013/0336001 A1 | 12/2013 | Boonekamp |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211496 A1 | 7/2014 | Durkee |
| 2014/0211497 A1 | 7/2014 | Yuan et al. |
| 2014/0211502 A1 | 7/2014 | Keller et al. |
| 2014/0211503 A1 | 7/2014 | Tarsa |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268761 A1 | 9/2014 | Raleigh et al. |
| 2014/0268762 A1 | 9/2014 | Raleigh et al. |
| 2014/0268875 A1 | 9/2014 | Durkee |
| 2014/0268879 A1 | 9/2014 | Mizuyama et al. |
| 2014/0270672 A1 | 9/2014 | Durkee |
| 2014/0334126 A1 | 11/2014 | Speier et al. |
| 2014/0347885 A1 | 11/2014 | Wilcox et al. |
| 2014/0355297 A1 | 12/2014 | Castillo et al. |
| 2014/0355302 A1 | 12/2014 | Wilcox et al. |
| 2015/0003059 A1 | 1/2015 | Haitz et al. |
| 2015/0049507 A1 | 2/2015 | Shani et al. |
| 2015/0049511 A1 | 2/2015 | Tarsa et al. |
| 2015/0055369 A1 | 2/2015 | Tarsa et al. |
| 2015/0055371 A1 | 2/2015 | van de Ven et al. |
| 2015/0109820 A1 | 4/2015 | Wilcox et al. |
| 2015/0160396 A1 | 6/2015 | Wilcox et al. |
| 2015/0177439 A1 | 6/2015 | Durkee et al. |
| 2015/0192742 A1 | 7/2015 | Tarsa et al. |
| 2015/0198760 A1 | 7/2015 | Wilcox et al. |
| 2015/0204491 A1 | 7/2015 | Yuan et al. |

FOREIGN PATENT DOCUMENTS

| | | | |
|---|---|---|---|
| DE | 10047101 | 5/2002 | |
| DE | 10203106 | 7/2003 | |
| DE | 10302563 | 7/2004 | |
| DE | 10302564 | 7/2004 | |
| DE | 102006009325 | 9/2007 | |
| DE | 102006011296 | 9/2007 | |
| DE | 102006013343 | 9/2007 | |
| JP | H10173870 | 6/1998 | |
| JP | 11227248 A * | 8/1999 | |
| JP | 2000/147264 | 5/2000 | |
| JP | 2004227934 A * | 8/2004 | ............ F21V 8/00 |
| JP | 3093080 U | 12/2005 | |
| JP | 2006/131444 | 5/2006 | |
| JP | 2006221922 A * | 8/2006 | |
| JP | 2007123130 A * | 5/2007 | |
| WO | WO 96/21122 | 7/1996 | |
| WO | WO 96/21884 | 7/1996 | |
| WO | WO 99/04531 | 1/1999 | |
| WO | WO 03/031869 | 4/2003 | |
| WO | WO 2009/012484 | 1/2009 | |
| WO | WO 2011/130648 | 10/2011 | |
| WO | WO 2013/078463 | 5/2013 | |
| WO | WO 2013/082537 | 6/2013 | |
| WO | WO 2014/120672 A2 | 8/2014 | |
| WO | WO 2014/120968 | 8/2014 | |

(56) References Cited

FOREIGN PATENT DOCUMENTS

| WO | WO 2014/120971 | 8/2014 |
|---|---|---|
| WO | WO 2014/120672 A3 | 9/2014 |
| WO | WO 2014/145283 | 9/2014 |

OTHER PUBLICATIONS

International Search Report and Written Opinion dated Jul. 10, 2014, for International Application No. PCT/US2014/013934, Applicant, Cree, Inc. (19 pages).
Invitation to Pay Additional Fees dated May 1, 2014, for International Application No. PCT/US2014/013934, Applicant, Cree, Inc. (2 pages).
International Search Report and Written Opinion for International Application No. PCT/US2014/013854, issued Jun. 5, 2014, Applicant, Cree, Inc. (15 pages).
International Search Report and Written Opinion dated May 19, 2014, for International Application No. PCT/US2014/013891 (12 pages).
Web page at http://www.oluce.com/en/lamps/table/colombo-281-detail, printed Nov. 19, 2013 (2 pages).
Web page at http://www.fusionoptix.com/lighting/components/array-optics.htm, printed May 9, 2013 (2 pages).
Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).
Ji et al., Electrically Controllable Microlens Array Fabricated by Anisotropic Phase Separation From Liquid-Crystal and Polymer Composite Materials, Jul. 1, 2003 (4 pages).
Iijima et al., Document scanner using polymer waveguides with a microlens array, Oct. 28, 2002 (4 pages).
Non-final Office action dated Jul. 31, 2015 for U.S. Appl. No. 14/015,801, Applicant, Cree, Inc. (48 pages).
Non-final Office action dated Aug. 12, 2015, for U.S. Appl. No. 14/577,730, Applicant, Cree, Inc. (52 pages).
Invitation to Pay Additional Fees for International Application No. PCT/US2015/032011 dated Aug. 6, 2015, Applicant, Cree, Inc. (2 pages).
Invitation to Pay Additional Fees for International Application No. PCT/US2015/032040 dated Aug. 6, 2015, Applicant, Cree, Inc. (2 pages).
Invitation to Pay Additional Fees for International Application No. PCT/US2015/020601 dated Jun. 5, 2015, Applicant, Cree, Inc. (2 pages).
IPRP for International Application No. PCT/US2014/013840, Applicant, Cree, Inc. dated Aug. 13, 2015 (10 pages).
IPRP for International Application No. PCT/US2014/013937, Applicant, Cree, Inc. dated Aug. 13, 2015 (16 pages).
IPRP for International Application No. PCT/US2014/013891, Applicant, Cree, Inc., dated Aug. 13, 2015, (8 pages).
IPRP for International Application No. PCT/US2014/013934, Applicant, Cree, Inc., dated Aug. 13, 2015, (11 pages).
IPRP for International Application No. PCT/US2014/013854, Applicant, Cree, Inc., dated Aug. 13, 2015, (9 pages).
IPRP for International Application No. PCT/US2014/013931, Applicant, Cree, Inc., dated Aug. 13, 2015, (15 pages).
IPRP for International Application No. PCT/US2014/013408, Applicant, Cree, Inc., dated Aug. 13, 2015, (15 pages).
U.S. Appl. No. 14/801,476, filed Jul. 16, 2015, Inventors, de Sugny et al. (38 pages).
U.S. Appl. No. 14/839,557, filed Aug. 28, 2015, Inventors, Wilcenski et al. (63 pages).
Final Office action dated Jun. 2, 2015, for U.S. Appl. No. 13/841,622, Applicant, Cree, Inc. (58 pages).
Non-final Office action dated Jun. 30, 2015, for U.S. Appl. No. 14/583,415, Applicant, Cree, Inc. (216 pages).
International Search Report and Written Opinion for International Application No. PCT/US2015/020601, Applicant, Cree, Inc. dated Jul. 31, 2015, (23 pages).
U.S. Appl. No. 14/291,829, filed May 30, 2014, entitled "High Efficiency Driver Circuit with Fast Response", Inventors, Hu et al., (65 pages).
U.S. Appl. No. 14/292,001, filed May 30, 2014, et al., entitled "SEPIC Driver Circuit with Low Input Current Ripple", Inventors, Hu et al., (38 pages).
U.S. Appl. No. 14/657,988, filed Mar. 13, 2015, entitled "Luminaire Utilizing Waveguide", Inventors, Wilcox et al., (181 pages).
U.S. Appl. No. 61/932,058, filed Jan. 27, 2014, entitled "Enhanced Network Lighting", Inventors, Carrigan et al., (203 pages).
U.S. Appl. No. 14/292,286 filed May 30, 2014, entitled entitled "Lighting Fixture Providing Variable CCT", Inventors, McBryde et al., (103 pages).
U.S. Appl. No. 29/496,754, filed Jul. 16, 2014, entitled "Roadway Luminaire", Inventors, Snell et al., (35 pages).
U.S. Appl. No. 14/462,322, filed Aug. 18, 2014, entitled "Flood Optic", Inventor, Castillo, (31 pages).
U.S. Appl. No. 14/618,884, filed Feb. 10, 2015, entitled "LED Luminaire and Components Therefor", Inventors, Castillo et al., (56 pages).
U.S. Appl. No. 62/088,375, filed Dec. 5, 2015, entitled "Voltage Configurable Solid State Lighting Apparatuses, Systems, and Related Methods", Inventors, Hussell et al., (51 pages).
U.S. Appl. No. 14/618,819, filed Feb. 10, 2015, entitled "LED Luminaire", Inventors, Bendtsen et al., (37 pages).
U.S. Appl. No. 14/801,476, filed Jul. 16, 2015, entitled "Dual Edge Coupler", Inventors, Ramey de Sugny et al., (38 pages).
Non-Final Office Action dated Apr. 1, 2015, U.S. Appl. No. 13/841,074, Applicant, Cree, Inc., (57 pages).
Non-Final Office Action dated Mar. 24, 2015, U.S. Appl. No. 13/840,563, Applicant, Cree, Inc., (36 pages).
Non-Final Office Action dated Apr. 30, 2015, U.S. Appl. No. 14/101,132, Applicant, Cree, Inc., (21 pages).
Non-Final Office Action dated May 20, 2015, U.S. Appl. No. 14/101,051, Applicant, Cree, Inc., (17 pages).
Non-Final Office Action Feb. 27, 2015, U.S. Appl. No. 14/292,778, Applicant, Cree, Inc., (10 pages).
Search Report and Written Opinion dated Jul. 28, 2014, International Application No. PCT/US2014/013840, Applicant, Cree, Inc., (17 pages).
Search Report and Written Opinion dated Jul. 11, 2014, International Application No. PCT/US14/13937, Applicant, Cree, Inc., (29 pages).
Search Report and Written Opinion dated Aug. 1, 2014, International Application No. PCT/US14/30017, (21 pages).
Search Report and Written Opinion dated Mar. 25, 2015, International Application No. PCT/US14/72848, (17 pages).
IPRP for International Application No. PCT/US2014/30017, Applicant, Cree, Inc., dated Sep. 24, 2015, (15 pages).
Non-final Office action dated Sep. 4, 2015, for U.S. Appl. No. 14/101,132, Applicant, Cree, Inc. (48 pages).
IPRP for International Application No. PCT/US2014/028887, Applicant, Cree, Inc., dated Sep. 24, 2015, (9 pages).
IPRP for International Application No. PCT/US2014/013400, Applicant, Cree, Inc., dated Sep. 24, 2015, (14 pages).
IPRP for International Application No. PCT/US2014/028938, Applicant, Cree, Inc., dated Sep. 24, 2015, (12 pages).

* cited by examiner

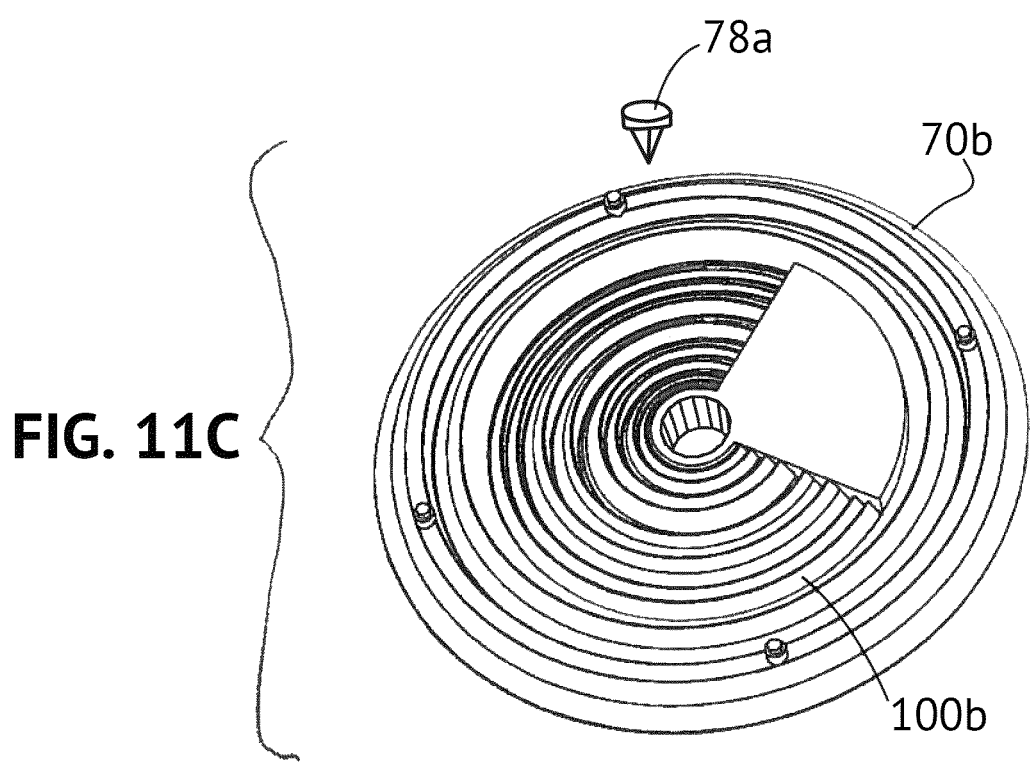

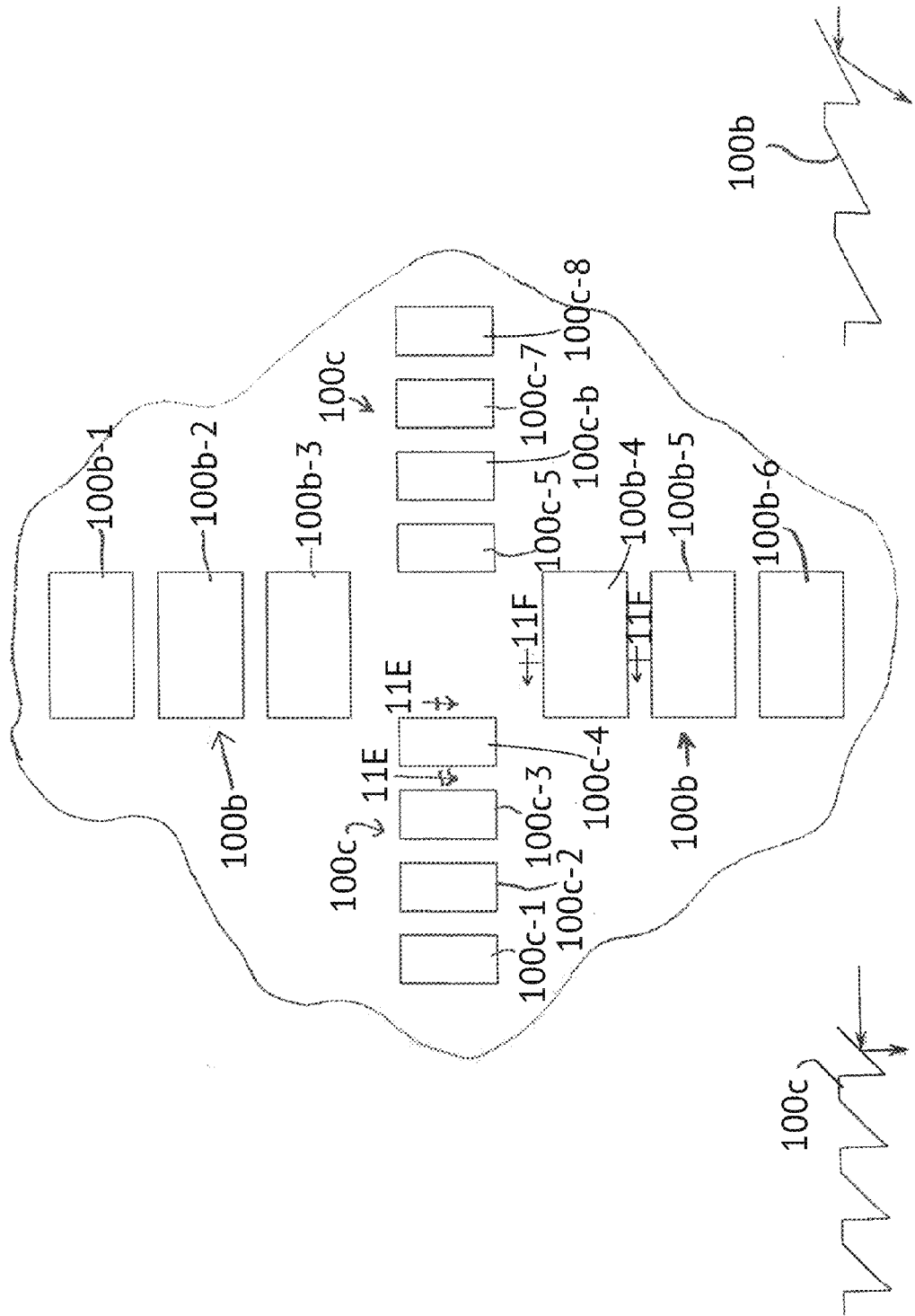

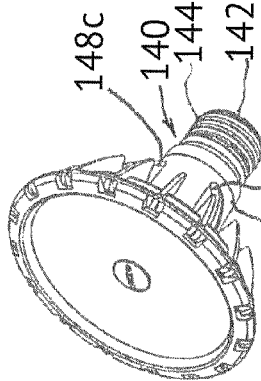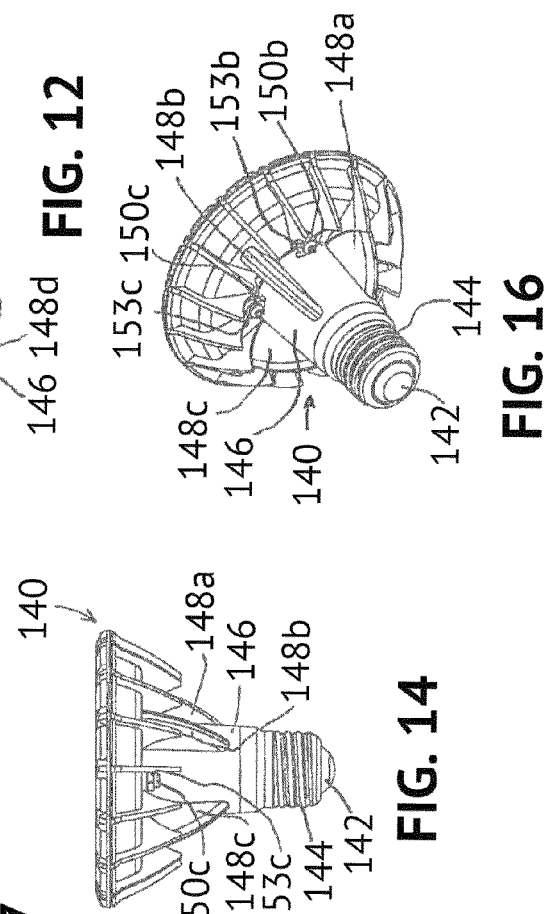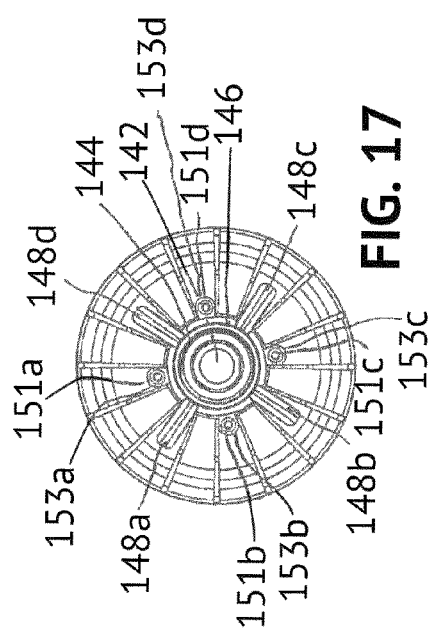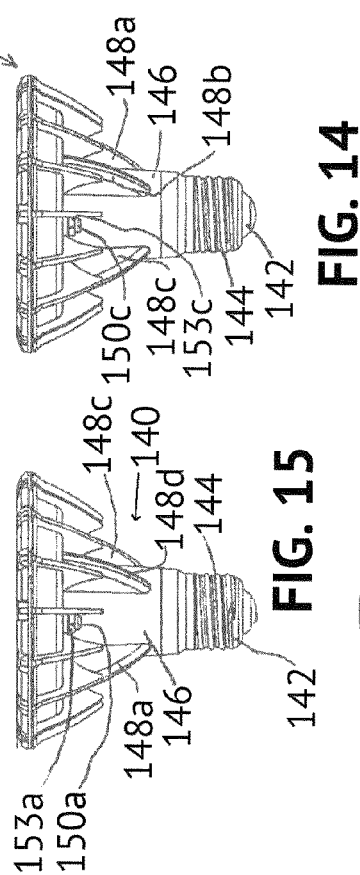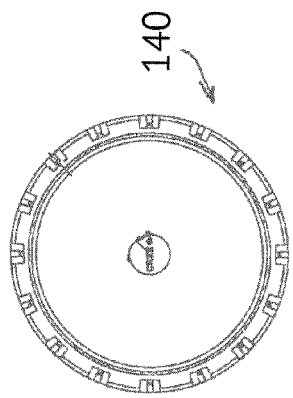

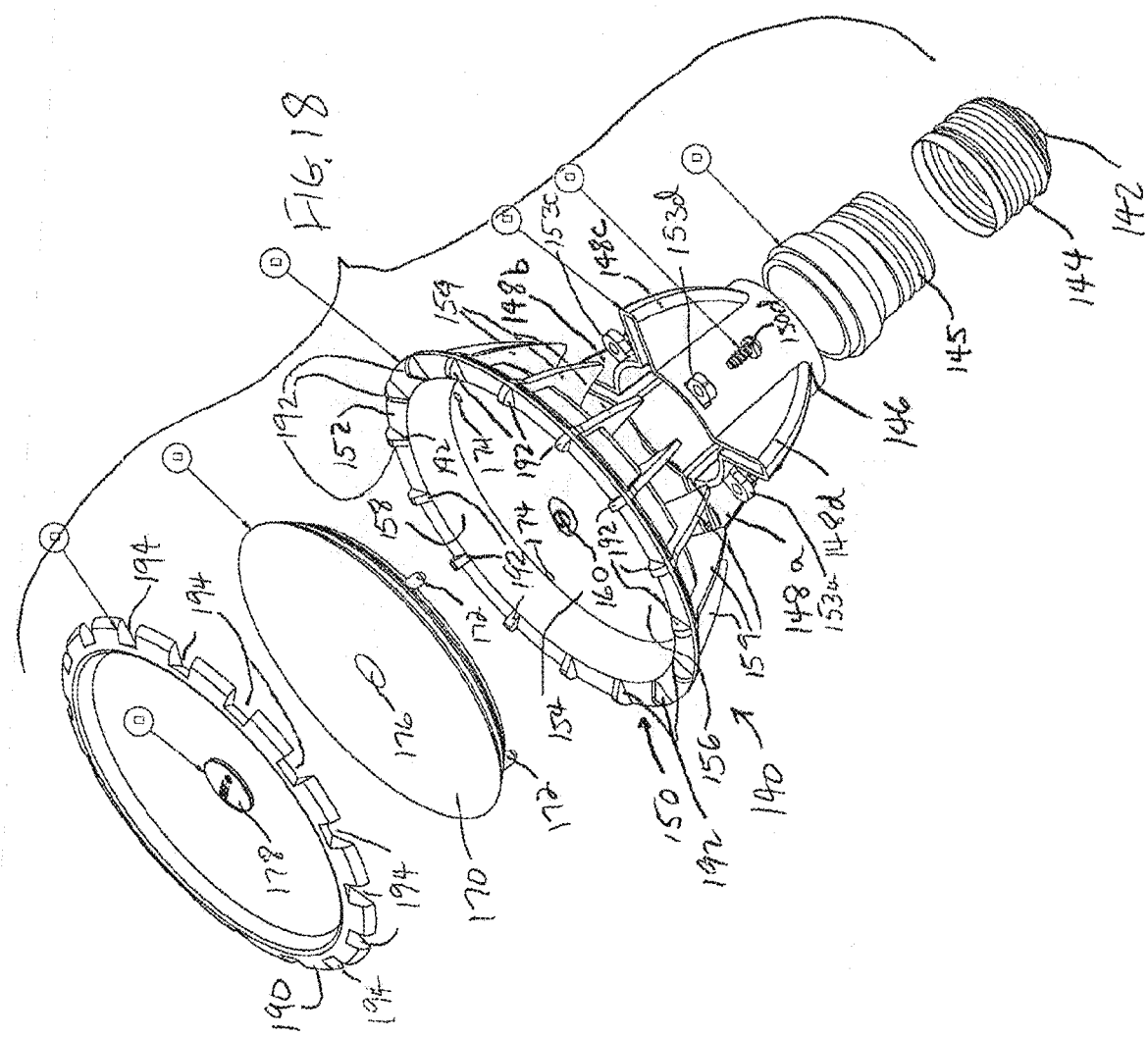

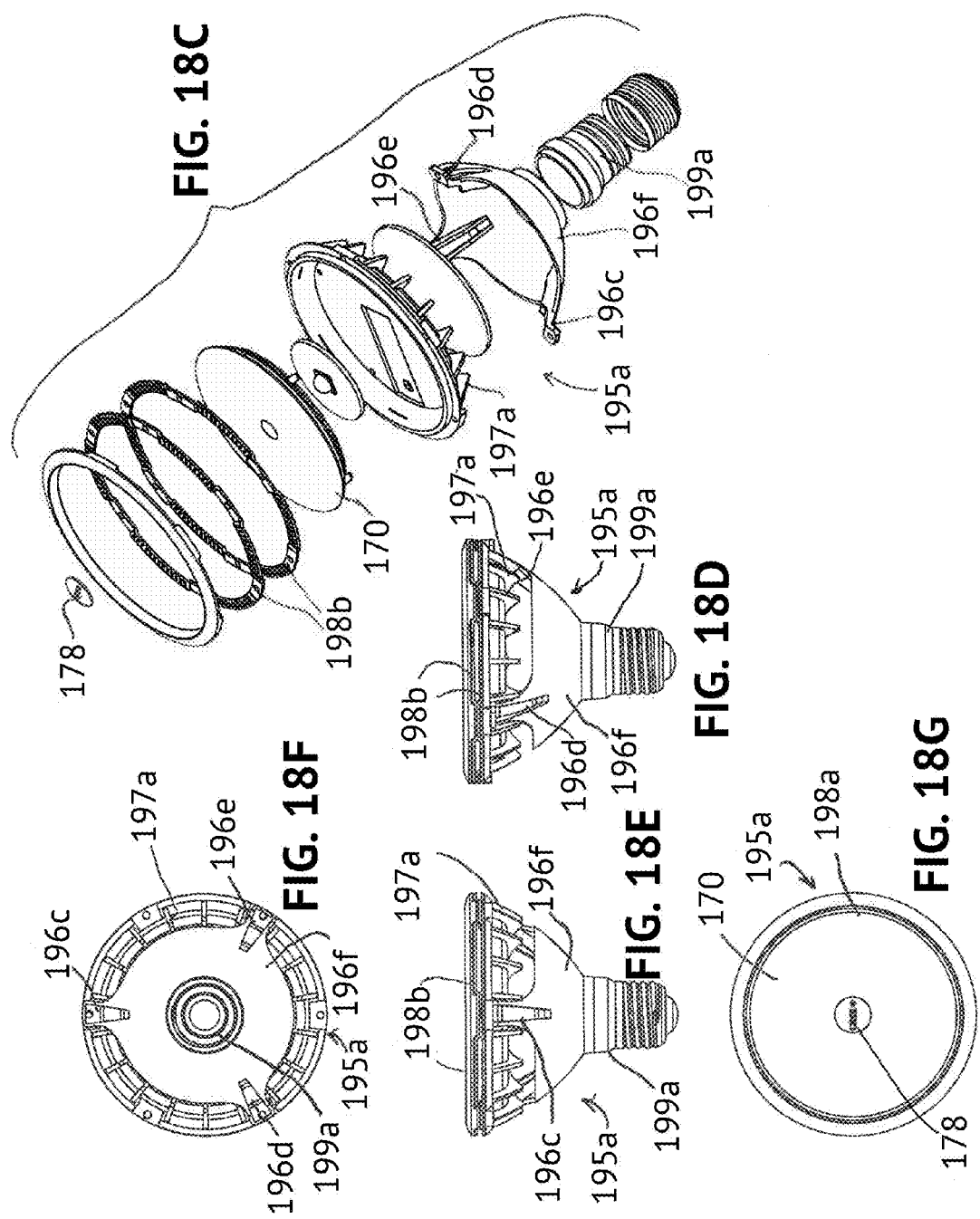

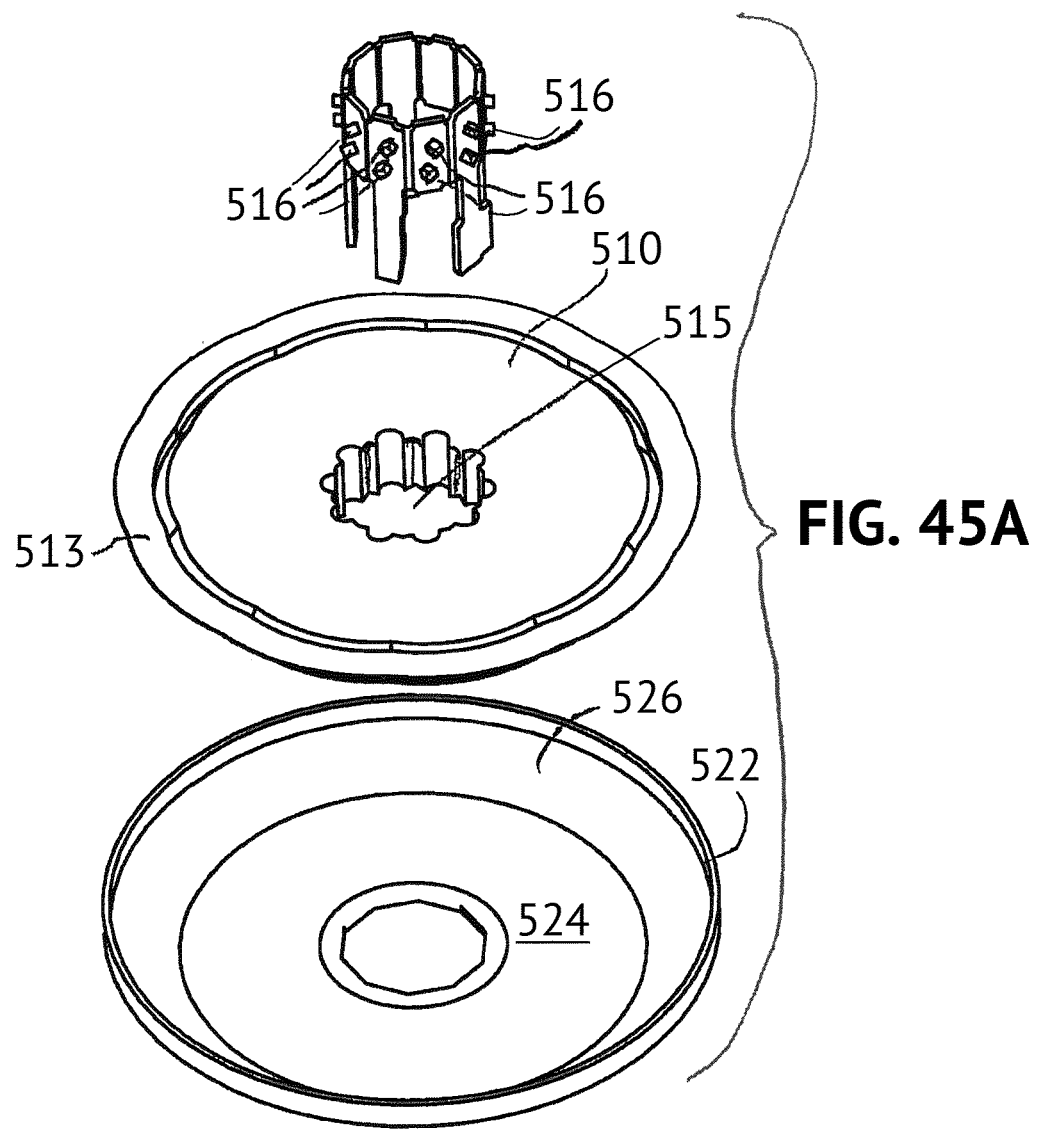

OPTICAL WAVEGUIDE AND LUMINAIRE INCORPORATING SAME

CROSS REFERENCE TO RELATED APPLICATIONS

The present application is a continuation of U.S. Non-Provisional patent application Ser. No. 13/840,563, filed Mar. 15, 2013, which claims the benefit of U.S. Provisional patent application Ser. No. 61/758,660, filed Jan. 30, 2013, entitled "Optical Waveguide" and owned by the assignee of the present application.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present inventive subject matter relates to optical waveguides, and more particularly to optical waveguides for general lighting.

2. Background of the Invention

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

SUMMARY OF THE INVENTION

According to one aspect of the present invention, an optical waveguide includes a body of optically transmissive material having a width substantially greater than an overall thickness thereof. The body of material has a first side, a second side opposite the first side, and a plurality of interior bores extending between the first and second sides each adapted to receive a light emitting diode. Extraction features are disposed on the second side and the extraction features direct light out of at least the first side and at least one extraction feature forms a taper disposed at an outer portion of the body.

According to another aspect of the present invention, an optical waveguide assembly comprises a plurality of waveguides each including a body of optically transmissive material having a width substantially greater than an overall thickness thereof and including a first side, a second side opposite the first side and extraction features on the second side. At least one of the waveguides includes an interior recess extending between the first and second sides and is adapted to receive a light emitting diode. The extraction features are adapted to direct light out of at least one of the first and second sides and at least one extraction feature is disposed at an outer portion of each body.

According to a still further aspect of the present invention, an optical waveguide luminaire includes a plurality of modular tiles. Each tile includes a planar waveguide body having a first surface, a plurality of interior recesses disposed in the planar body, and LEDs extending into the plurality of interior recesses. Light diverters are disposed in the plurality of interior recesses and are adapted to direct light developed by the LEDs transversely into the waveguide body. Extraction features are disposed in the first face surface and adapted to extract light out of the first surface. The optical waveguide luminaire further includes a frame for retaining the plurality of modular tiles in fixed relationship with respect to one another.

Other aspects and advantages of the present invention will become apparent upon consideration of the following detailed description and the attached drawings.

BRIEF DESCRIPTION OF THE DRAWINGS

FIGS. 11B and 11C are isometric views of non-circular and asymmetric waveguides, respectively;

FIG. 11D is a diagrammatic elevational view of an asymmetric waveguide;

FIGS. 11E and 11F are cross sectional views taken generally along the lines 11E-11E and 11F-11F, respectively, of FIG. 11D;

FIG. 12 is an isometric view of a first end of a second lamp incorporating a waveguide according to a second embodiment of the present invention;

FIG. 13 is a first end elevational view of the lamp of FIG. 12;

FIG. 14 is a first side elevational view of the lamp of FIG. 12;

FIG. 15 is a second side elevational view of the lamp of FIG. 12;

FIG. 16 is a second end isometric view of the lamp of FIG. 12;

FIG. 17 is a second end elevational view of the lamp of FIG. 12;

FIG. 18 is an exploded isometric first end view of the lamp of FIG. 12;

FIG. 18C is an exploded isometric view of yet another lamp;

FIG. 18D is a side elevational view of the lamp of FIG. 18C as assembled;

FIG. 18E is a front elevational view of the lamp of FIG. 18D;

FIG. 18F is a bottom elevational view of the lamp of FIG. 18D;

FIG. 18G is a top plan view of the lamp of FIG. 18D;

FIGS. 45A and 45B are exploded isometric views of the light assembly of FIG. 43;

DETAILED DESCRIPTION OF THE PREFERRED EMBODIMENTS

Figure 1:
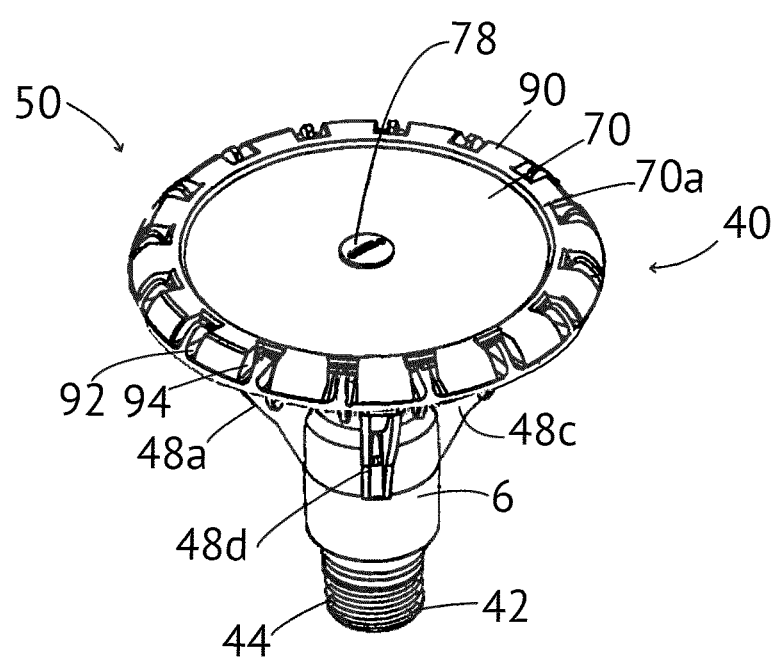
FIG. 1 is an isometric view of a first end of a first lamp incorporating a waveguide according to a first embodiment of the present invention.

Referring first to FIGS. 1-8, a lamp 40 includes a base 42 at which an Edison-style plug 44 is disposed. Extending away from the base 42 is a central body 46. Four arms 48a-48d extend away from the central body 46. A light assembly 50 is disposed on ends of the arms 48a-48d and is secured thereto by any suitable means, such as three screws 51 or other fasteners (shown in FIGS. 5 and 7) that extend through holes in the ends of the arms 48a-48c into threaded bores of the light assembly 50.

Figure 6:
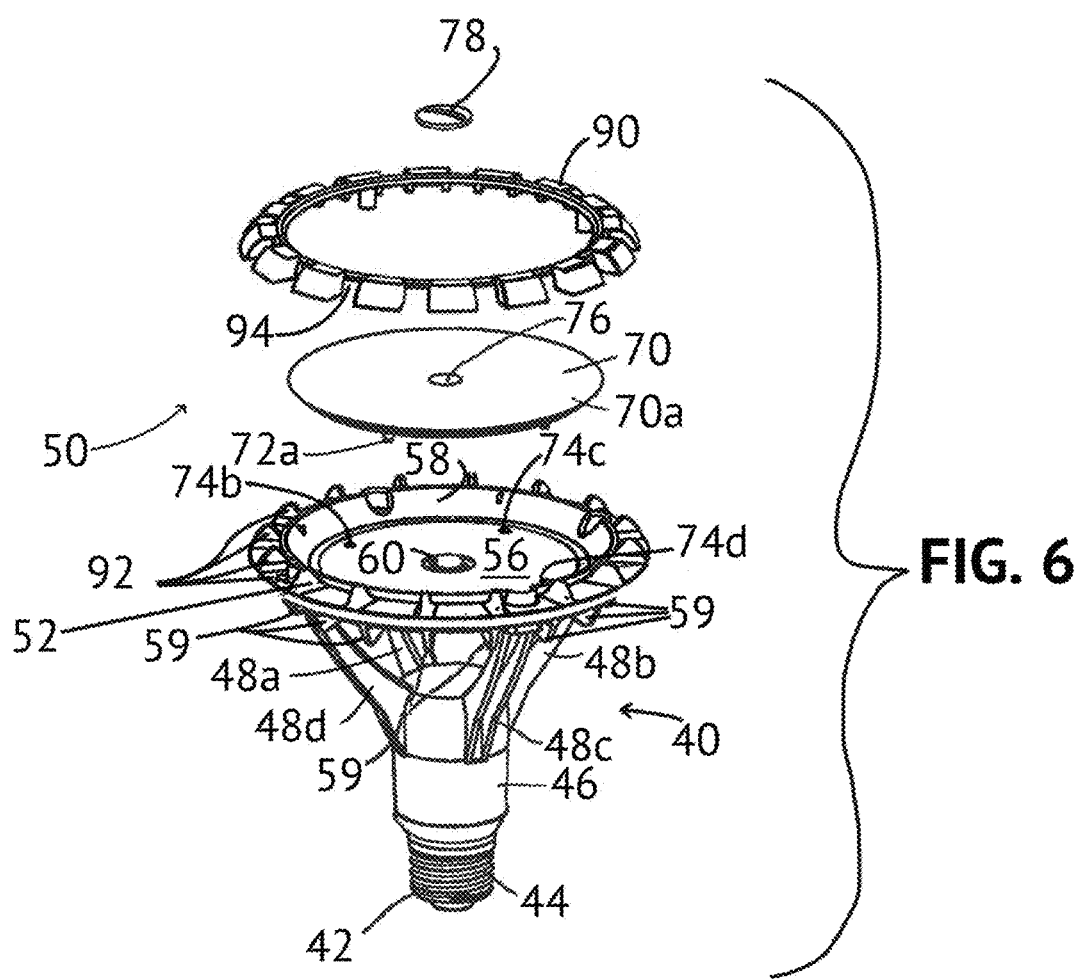
FIG. 6 is an exploded isometric first end view of the lamp of FIG. 1.
Figure 7:
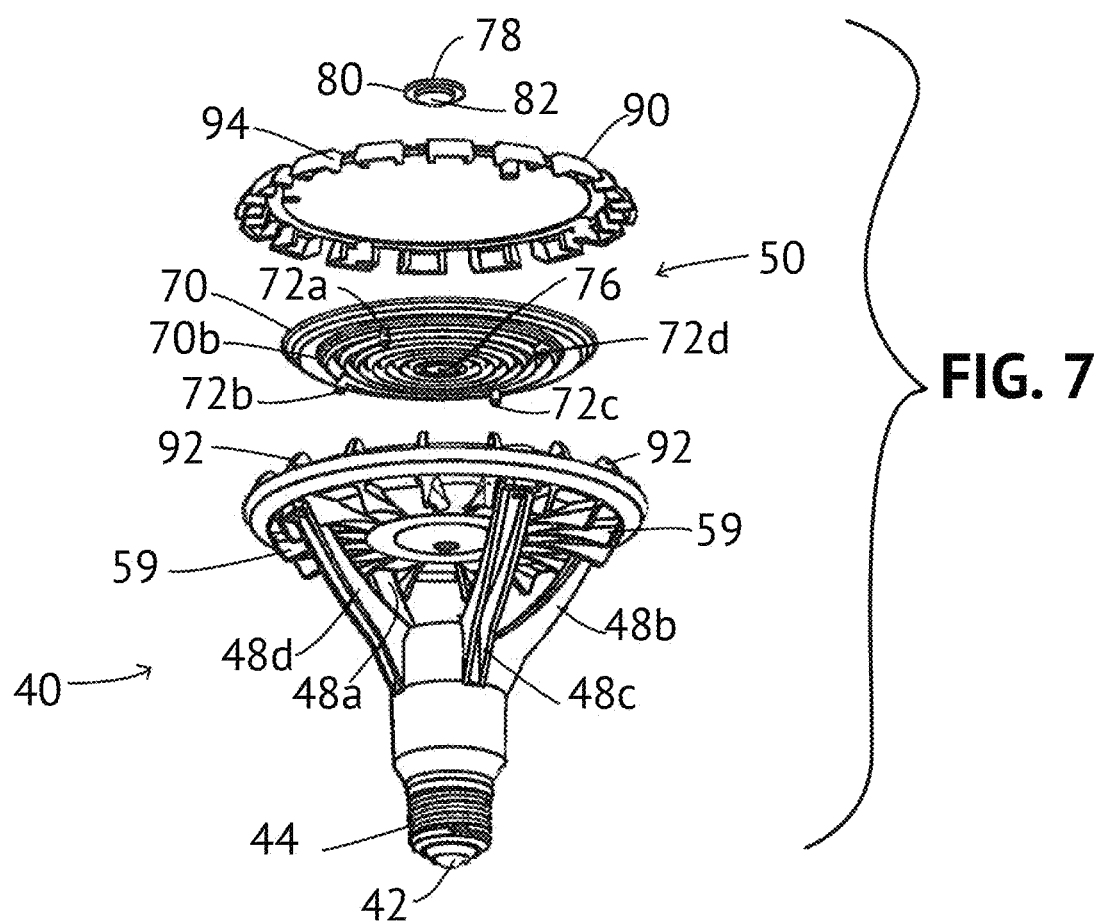
FIG. 7 is an exploded isometric second end view of the lamp of FIG. 1.
Figure 8:
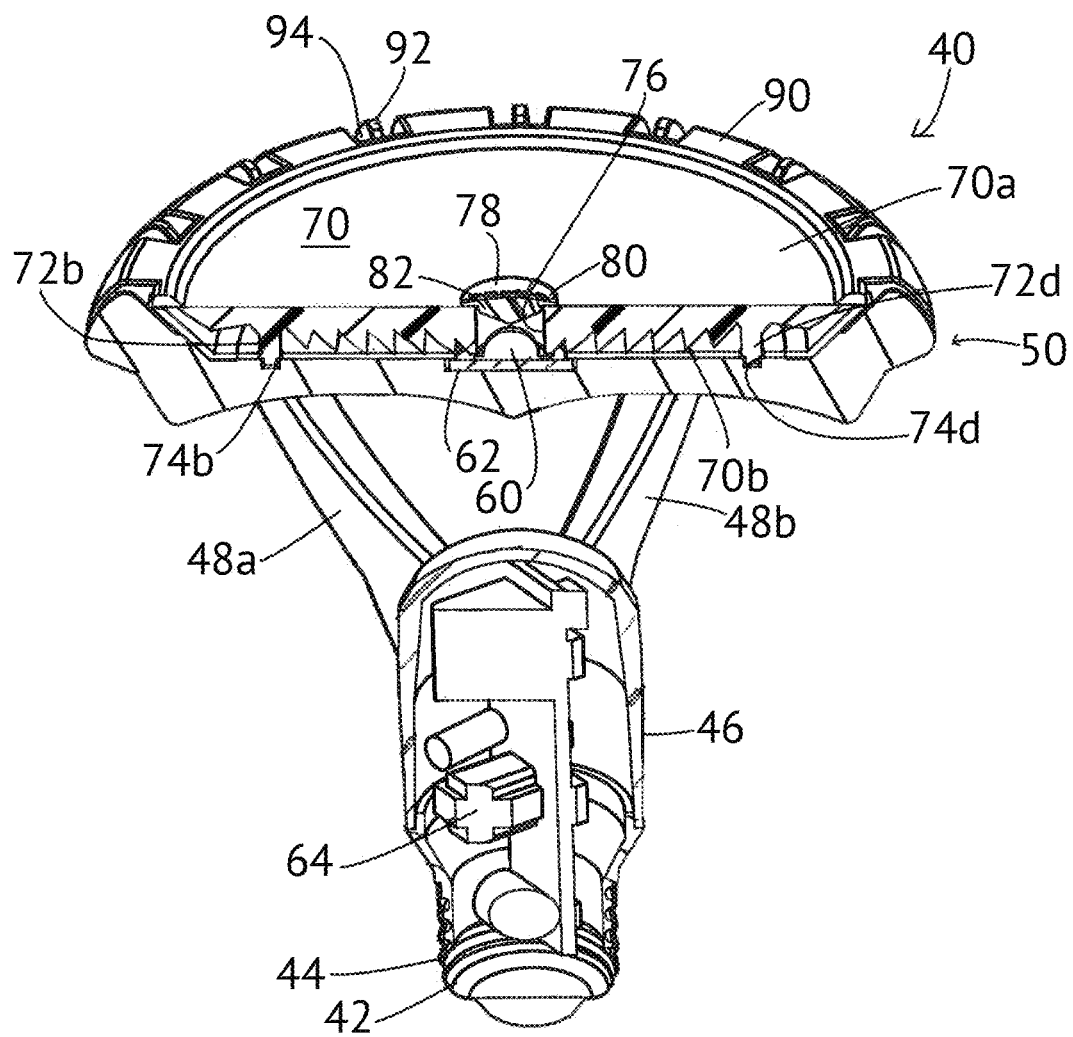
FIG. 8 is a sectional isometric view of the lamp of FIG. 1.

As seen in FIGS. 6 and 8, the light assembly 50 includes a base element in the form of a heat exchanger 52 having a central recess 54 defined by a base surface 56 and a tapered circumferential wall 58. The heat exchanger 52 is made of any suitable heat conductive material, such as aluminum, and includes a plurality of heat exchanger fins 59 (FIGS. 3-7) on a side thereof opposite the central recess 54. Further, if desired, the base surface 56 and/or the tapered circumferential wall 58 may be covered or coated by a reflective material, which may be a white material or a material that exhibits specular reflective characteristics. A light source that may include one or more light emitting diodes (LEDs) 60 (seen in FIG. 8) is mounted on a support member 62 comprising a heat conductive substrate, such as a metal circuit board, and extends beyond the base surface 56. The LED 60 may be a white LED or may comprise multiple LEDs either mounted separately or together on a single substrate or package including a phosphor-coated LED either alone or in combination with a color LED, such as a green LED, etc. In those cases where a soft white illumination is to be produced, the light source 60 typically includes a blue shifted yellow LED and a red LED. Different color temperatures and appearances could be produced using other LED combinations, as is known in the art. In one embodiment, the light source comprises any LED, for example, an MT-G LED incorporating TrueWhite® LED technology as developed and manufactured by Cree, Inc., the assignee of the present application. In any of the embodiments disclosed herein the LED(s) may each have a directional emission distribution (e.g., a side emitting or other distribution or a lambertian distribution), as necessary or desirable.

The light source 60 is operated by control circuitry 64 in the form of a driver circuit (seen in FIG. 8) disposed in the central body 46 that receives AC power via the Edison-style plug. The control circuitry 64 may be potted within the central body 46. Wires or conductors extend through one or more of the arms 48a-48d from the control circuitry 64 to the light source 60. In the illustrated embodiment, wires extend through the arm 48d into the light assembly 50. A cover 66 (FIG. 5) may be disposed in or over the arm 48d to provide a passage for the wires. The control circuitry 64 is designed to operate the light source 60 with AC or DC power in a desired fashion to produce light of a desired intensity and appearance. The heat exchanger 52 is preferably arranged to eliminate thermal crosstalk between the LEDs and the control circuitry. Preferably, the light source 60 develops light appropriate for general illumination purposes including light similar or identical to that provided by an incandescent, halogen, or other lamp that may be incorporated in a down light, a light that produces a wall washing effect, a task light, a troffer, or the like.

Figure 2:
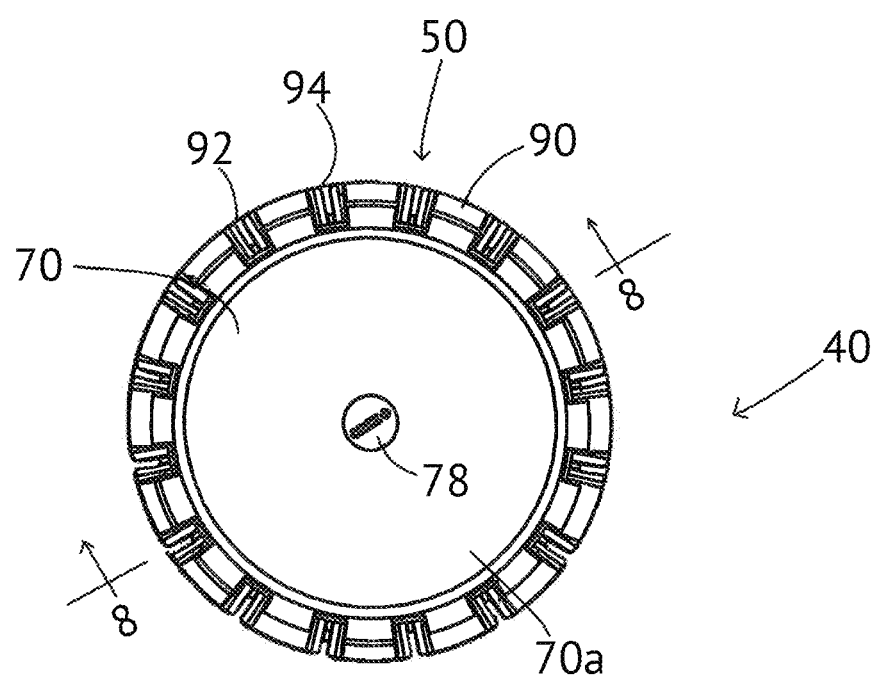
FIG. 2 is a first end elevational view of the lamp of FIG. 1.
Figure 3:
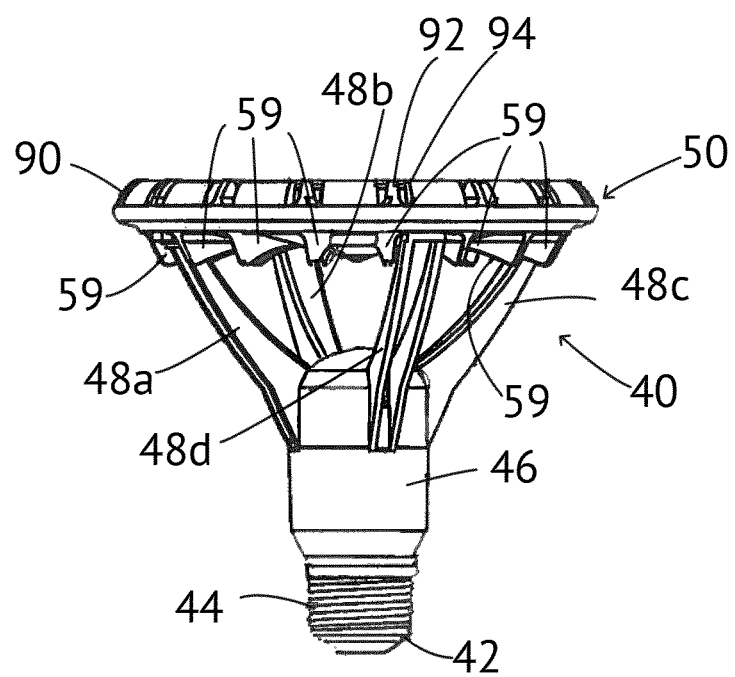
FIG. 3 is a side elevational view of the lamp of FIG. 1.
Figure 4:
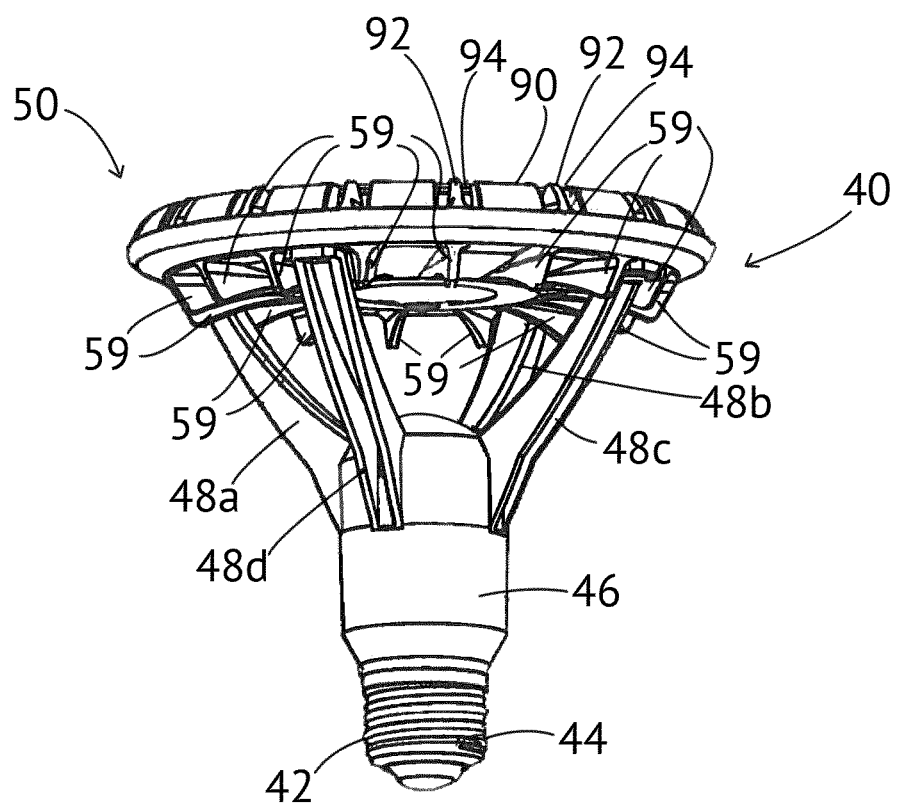
FIG. 4 is an isometric view of a second end of the lamp of FIG. 1.
Figure 5:
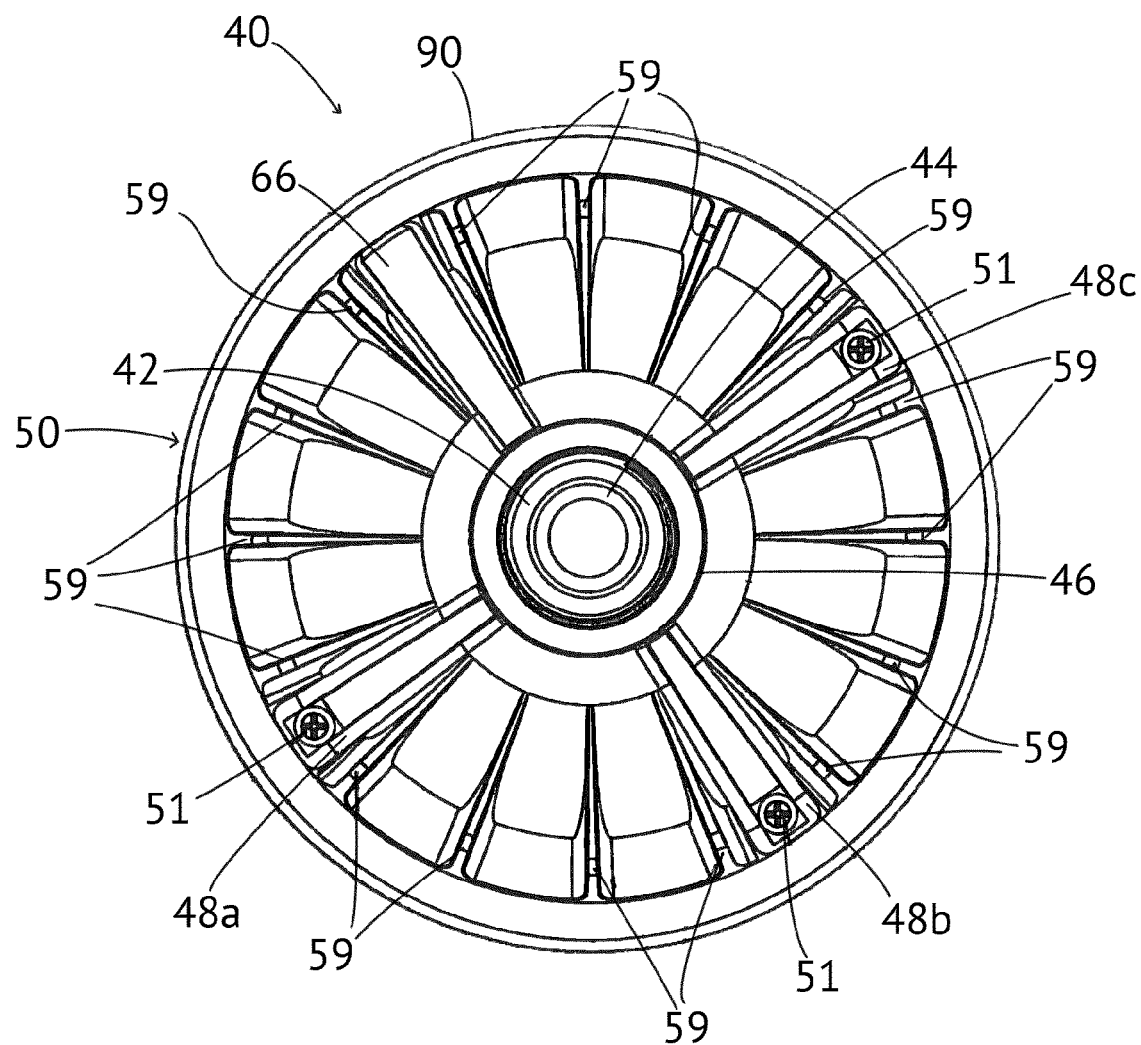
FIG. 5 is a second end elevational view of the lamp of FIG. 1.

A waveguide 70 has a main body of material 71 (FIG. 11) having a width substantially greater than an overall thickness thereof and is substantially or completely circular in a dimension transverse to the width and thickness (FIG. 2). The waveguide 70 is disposed in contact with the base surface 56 and the tapered circumferential wall 58 and is located by four location pins 72a-72d (FIG. 7) that are disposed in corresponding blind bores 74a-74d (only the bores 74b-74d are visible in FIGS. 6 and 8). In the illustrated embodiment, the waveguide 70 includes a first or outer side or surface 70a, a second opposite inner side or surface 70b, and an interior coupling cavity comprising a central bore 76 that in the illustrated embodiment extends fully through the waveguide 70 from the first side to the second side. Also in the illustrated embodiment, the walls defining the central bore 76 are normal to the first and second sides 71a, 71b of the waveguide 70 and the central bore 76 is coaxial with an outer surface of the main body of material 71. In all the embodiments disclosed herein, the central bore is preferably polished and optically smooth. Also preferably, the light source 60 extends into the central bore 76 from the second side thereof. Also in the illustrated embodiment, a light diverter of any suitable shape and design, such as a conical plug member 78 extends into the central bore 76 from the first side thereof. Referring specifically to FIGS. 7 and 8, in the illustrated embodiment, the conical plug member 78 includes a base flange 80 that is secured by any suitable means, such as an adhesive, to an outer surface of the waveguide 70 such that a conical portion 82 extends into the central bore 76. If desired, the base flange 80 may be omitted and the outer diameter of the plug member may be slightly greater than the diameter of the bore 76 whereupon the plug member 78 may be press fitted or friction fitted into the bore 76 and/or secured by adhesive or other means. Still further, if desired, the conical plug member 78 may be integral with the waveguide 70 (see FIG. 47) rather than being separate therefrom. Further, the light source 60 may be integral with the waveguide 70, if desired. In the illustrated embodiment, the plug member 78 may be made of white polycarbonate or any other suitable material, such as acrylic, molded silicone, polytetrafluoroethylene (PTFE), Derlin® acetyl resin, or any suitable metal. The material may be coated with reflective silver or other metal or material using any suitable application methodology, such as a vapor deposition process. The plug member 78 may be any other suitable shape, including a symmetric or asymmetric shape, as desired. For example, the plug member may be non-conical and may have a substantially flat shape, a segmented shape, an inclined shape to direct light out a particular side of the lamp 40, etc.

The waveguide 70 may be secured in any suitable fashion and by any suitable means to the heat exchanger 52. In the illustrated embodiment, a ring member 90 is retained on surfaces of the heat exchanger 52 such that ribs 92 of the heat exchanger 52 are disposed in recesses 94 of the ring member 90. This securement is accomplished by the screws 51, which may extend into threaded bosses (not shown) carried on an inner surface of the ring member 90. In addition the ring member 90 bears against that outer surface of the waveguide 70 so that the waveguide 70 is secured in place.

Figure 11B:
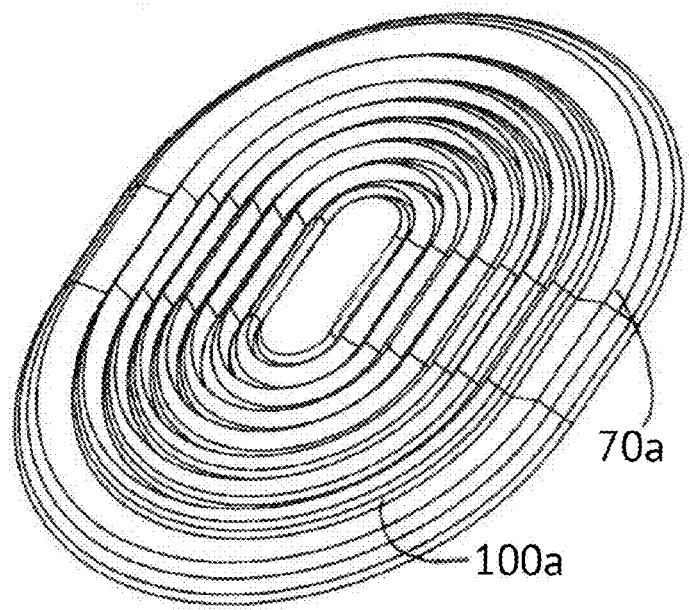
Figure 11:
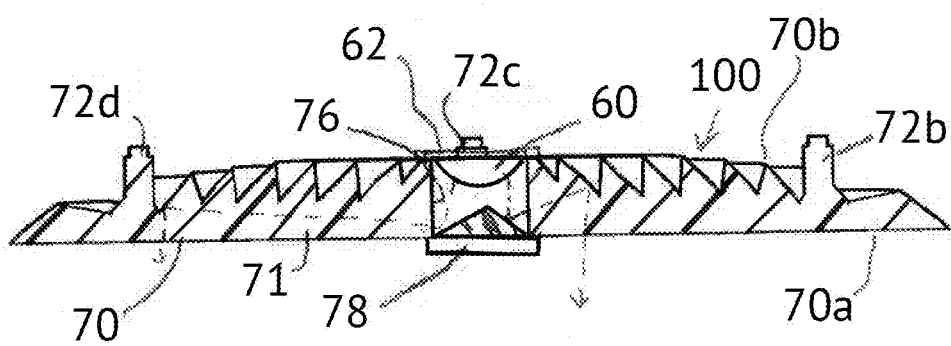
FIG. 11 is a cross sectional view of the waveguide of FIG. 1 taken generally along the lines 11-11 of FIG. 10.

In the illustrated embodiment the lamp 40 has a size and outer envelope equivalent to a PAR 38 lamp, and can be used in any luminaire that can accommodate same. It should be noted that the lamp 40 could be made larger or smaller to fit inside other luminaires and/or to satisfy particular lighting requirements. One example of a luminaire with which the lamp 40 could be used is a downlight mounted, for example, in a ceiling. In such a case, the plug 44 of the lamp 40 is screwed into an Edison-style socket in the luminaire such that the light source 60 points downwardly (i.e., the lamp 40 is oriented opposite to the orientation of FIG. 3 such that the plug 44 is above the waveguide 70.) FIG. 11 illustrates the waveguide 70 in such orientation with the light source 60 disposed above the plug member 78. When the light source 60 is energized, light developed by the source 60 travels within the bore 76 and reflects off the surface of the conical portion 82. Preferably, the conical portion 82 is made of or the surface is coated with a white or specular material that is highly reflective such that the great majority of light incident thereon (preferably, although not necessarily, greater than 95%) is reflected into the waveguide 70 in a generally transverse direction along the width of the body of material 71. Examples of such reflected light rays are shown in FIG. 11. Alternatively, the plug member 78 may be partially or fully transparent or translucent, as desired, to allow at least some light to be transmitted therethrough (for example, at least about 5% of the light may be transmitted through the plug member 78). In any event, the spacing, number, size and geometry of extraction features 100 determine the mixing and distribution of light in the waveguide 70 and light exiting the waveguide 70. In the illustrated embodiment, the extraction features 100 comprise a series of ridges separated by intervening troughs at least some of which define one or more inverted V-shapes. Also in the illustrated embodiment, the extraction features 100 are continuous (i.e., they extend fully in a continuous manner about the central bore 76), are coaxial with the central bore, and therefore symmetric about the central axis of the central bore 76. In addition to the foregoing, the waveguide 70 is tapered from the center of the waveguide to an outside edge in the sense that there is less material at the radially outside edges of the waveguide than at the center. Such tapering may be effectuated by providing extraction features that become deeper and/or are more widely separated with distance from the center of the waveguide, as noted in greater detail hereinafter. The tapering maximizes the possibility that substantially all the light introduced into the waveguide 70 is extracted over a single pass of the light through the waveguide. This results in substantially all of the light striking the radially outward surfaces of the extraction features 100, which are carefully controlled so that the extraction of light is also carefully controlled. The combination of tapering with the arrangement of extraction features and use of efficient coupling components including the plug member 78 disposed in the bore 76 with the light source 60 together result in improved color mixing with minimum waveguide thickness and excellent control over the emitted light.

In the illustrated embodiment, the light emitted out the waveguide 70 is mixed such that point sources of light in the source 60 are not visible to a significant extent and the emitted light is controlled and collimated to a high degree.

Figure 11A:
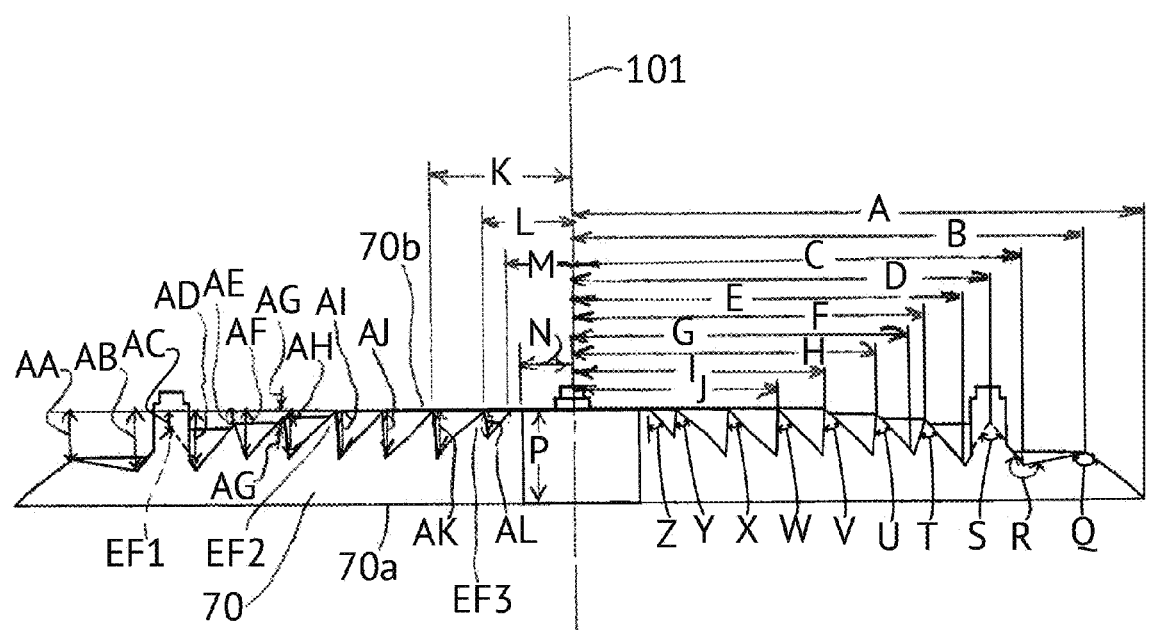
FIG. 11A is a view identical to FIG. 11 identifying sample dimensions of the waveguide of FIG. 1.

In the illustrated embodiment, the waveguide is made of optical grade acrylic, polycarbonate, molded silicone, glass, or any other optical grade material and, in one example, has the dimensions noted in the following table and as seen in FIG. 11A. It should be noted that the dimensions in the following table as exemplary only and not limiting (several of the dimensions are taken with respect to a center line 101 (FIG. 11A) of the waveguide 70):

TABLE 1

| REFERENCE (FIG. 11A) | NOMINAL DIMENSION (Millimeters - unless otherwise specified) |
|---|---|
| A | 48.500 |
| B | 43.600 |
| C | 38.100 |
| D | 35.100 |
| E | 33.100 |
| F | 29.700 |
| G | 28.700 |
| H | 25.500 |
| I | 21.000 |
| J | 17.000 |
| K | 12.700 |
| L | 8.000 |
| M | 6.000 |
| N | 5.000 |
| P | 8.000 |
| Q | 132.8° |
| R | 241.7° |
| S | 70.7° |
| T | 58.8° |
| U | 51.5° |
| V | 50.6° |
| W | 46.4° |
| X | 47.1° |
| Y | 56.2° |
| Z | 42.3° |
| AA | 4.000 |
| AB | 5.000 |
| AC | 1.500 |
| AD | 5.000 |
| AE | 1.000 |
| AF | 4.000 |
| AG | 0.500 |
| AH | 4.000 |
| AI | 4.000 |
| AJ | 4.000 |
| AK | 4.000 |
| AL | 2.000 |

From the foregoing dimensions one can calculate extraction feature aspect ratios as follows:

$$\text{Aspect Ratio} = \text{Width of ridge}/\text{Greatest height extent of ridge} \quad (1)$$

Using the foregoing equation, one can calculate (at least approximately) aspect ratios AR1, AR2, and AR3 of various extraction features EF1, EF2, and EF3 denoted in FIG. 11A as follows:

$$AR1 = (C-E)/(AB-AC) = (38.1-33.1)/(5.0-1.5) = 5.0/3.5 = 1.43 \quad (2)$$

$$AR2 = (H-I)/AI = (25.5-21.0)/4.0 = 4.5/4.0 = 1.125 \quad (3)$$

$$AR3 = (K-L)/AK = (12.7-8.0)/4.0 = 4.7/4 = 1.175 \quad (4)$$

In the illustrated embodiment, the waveguide 70 may be designed to create a beam angle that preferably is between less than about 5 degrees to greater than 60 degrees, and more preferably is between about 5 degrees and about 50 degrees and most preferably between about 6 degrees and about 40 degrees. The beam peak can either be centered in the nadir (as in a PAR application) or off-center (as in an outdoor application). The beam angle and/or peak can be controlled through appropriate design of the waveguide 70. In the illustrated embodiment of FIG. 11A, the beam angle is about 12 degrees.

In any of the embodiment disclosed herein, the extraction features may be similar or identical to one another in shape, size, and/or pitch, or may be different from one another in any one or more of these parameters, as desired.

If desired, the extraction features 100 may be other than circular, asymmetric and/or discontinuous. FIG. 11B illustrates a racetrack-shaped waveguide 70a with racetrack-shaped extraction features 100a. FIG. 11C shows a circular waveguide 70b with asymmetric and discontinuous extraction features 100b. An asymmetric plug member 78a that may be used with the waveguide 70b is illustrated in FIG. 11C. Asymmetric extraction features may be used with or without an asymmetric plug member to obtain multiple beam distributions. For example, as seen in FIG. 11D, a first set of discrete extraction features 100b disposed in discrete boundaries 100b-1 through 100b-6 may direct light toward a first direction and at least a second set of extraction features 100c disposed in discrete boundaries 100c-1 through 100c-8 may direct light toward at least a second direction with each of the at least two directed beams having substantially identical or different beam widths and/or intensities. FIGS. 11E and 11F illustrate different extraction features that may accomplish this result. In a still further example seen in FIGS. 36-38, the extraction features 100 may comprise a plurality of discrete prisms 102 formed in a lower surface (as seen in FIGS. 33-39) of a waveguide main body 103 and arranged in concentric rings. As in the previous embodiment, the light source 60 and the plug member 78 extend into a central bore 76. The waveguide main body 103 is disposed on a substrate 104 that may have a reflective coating thereon and light developed by the light source 60 is diverted transversely into the main body 103 and is emitted out a surface 105 by the prisms 102. The prisms may be identical or not identical to one another. Preferably, the prisms face the coupling cavity comprising the central bore 76.

Figure 39:
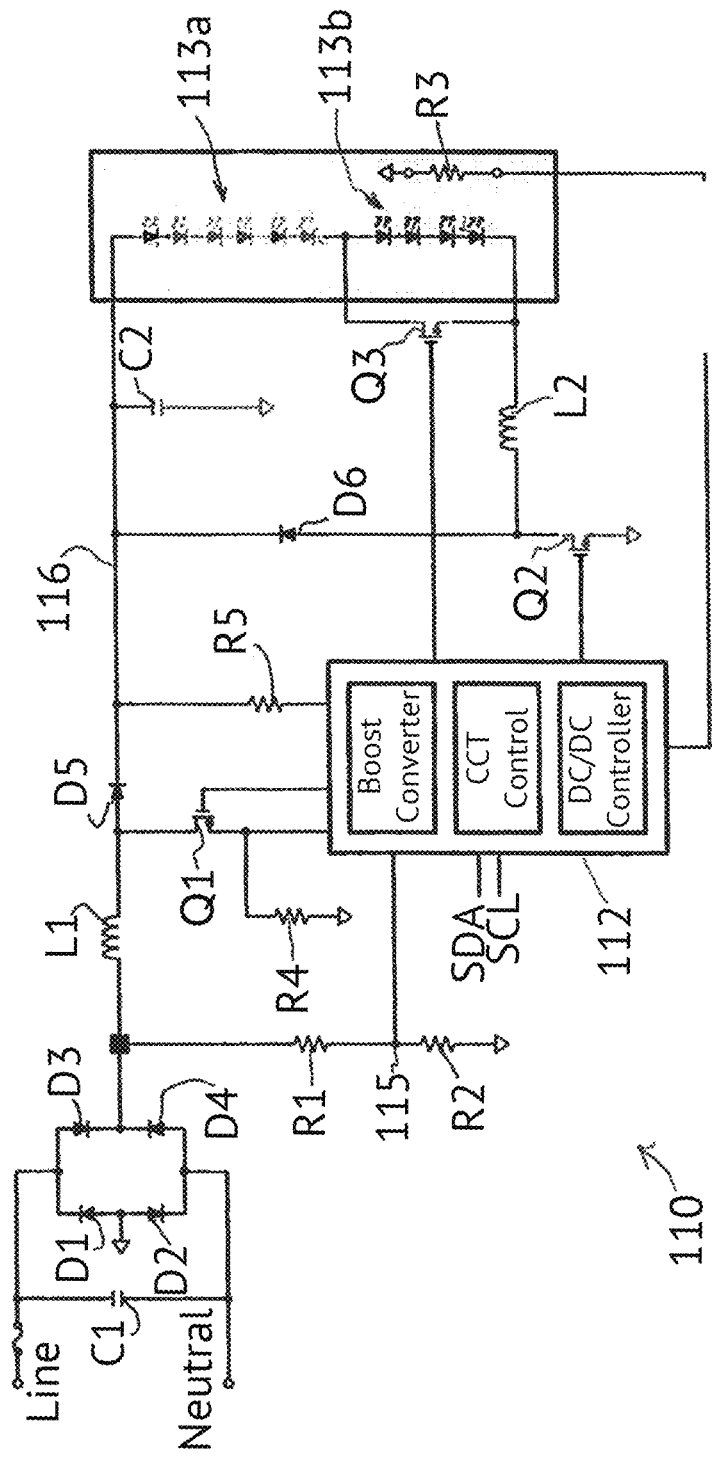
FIG. 39 is a schematic diagram of a driver circuit suitable for developing power for the LED(s) of FIGS. 1-8.

FIG. 39 is a schematic diagram of a driver circuit 110 suitable for developing power for the LED(s) and which may be used as the circuitry 64. The driver circuit 110 is an I²C control that includes an integrated circuit IC 112. The IC 112 and other circuitry operate as a constant current source. The circuit 110 further includes a full-wave rectifier circuit including diodes D1-D4 coupled to a capacitor C1 and filter elements comprising inductors L1 and L2 and a capacitor C2. A diode D5 effectuates unidirectional charging of the capacitor C. The circuit 110 operates as a two-stage regulation circuit that is capable of operating two sets of LEDs 113a, 113b in a controllable dimming fashion in response to a dimming command signal SDA delivered to an input of the IC 112 by a dimmer (not shown). In the illustrated embodiment, each of the LEDs 113a is capable of developing white light, and each of the LEDs 113b is capable of producing temperature-compensated red light that adds warmth to the white light developed by the LEDs 113a. The two sets of LEDs 113a, 113b may be disposed on a single substrate or may be disposed on multiple substrates, as desired.

Two transistors Q1 and Q2 implement the two stage regulation circuit and are operated together with a third transistor Q3 to control the current through the LEDs 113. A diode D6 isolates the transistors Q1 and Q2 from one another. The IC 112 is also responsive to a signal SCL that is factory set and commands a specific maximum constant current magnitude for the LEDs 113. The IC 112 implements a soft-switching controllable boost and buck converter for dimming of the LED(s) 113 that produces low electromagnetic interference (EMI) and no 120 Hz. AC component in the DC power that is supplied to the LEDs 113.

The balance of the circuit 110 includes a voltage divider including resistors R1 and R2 wherein a junction between the resistors R1 and R2 is coupled to an input of the IC 112. A thermistor R3 is disposed in heat transfer relationship with the LEDs 113b and provides a thermal sensing signal that is fed back to an input of the IC 112 whereby the IC 112 regulates the power delivered to the LEDs 113b in dependence upon the sensed temperature to effectuate the temperature compensation of the LEDs 113b. In addition a resistor R4 pulls an input of the IC 112 down when the transistor Q1 is off and a resistor R5 couples a Power_In input of the IC 112 to a DC bus 116. In the illustrated embodiment, the driver circuit 110 is mounted on a single circuit board and is compatible with a wide range of dimmers.

Any other suitable driver circuit may be used as the circuitry 64.

Referring next to FIGS. 12-18, a second embodiment of a lamp 140 is shown. The lamp 140 is intended for use in luminaires that can accommodate PAR 30 bulbs. The lamp 140 includes a base 142 at which an Edison-style plug 144 is disposed. Extending away from the base 142 is a cap 145 (FIG. 18) and a central body 146. The cap 145 is secured in any suitable fashion to the central body 146, such as by ultrasonic welding. Four arms 148a-148d extend away from the central body 146. A light assembly 150 is disposed on ends of the arms 148a-148d and is secured thereto by any suitable means, such as four threaded fasteners 151a-151d that extend through associated bores in associated tabs 153a-153d carried by the central body 146 and into threaded bores (not seen in the FIGS.) of the light assembly 150.

As seen in FIG. 18, the light assembly 150 includes a base element in the form of a heat exchanger 152 having a central recess 154 defined by a base surface 156 and a tapered circumferential wall 158. The heat exchanger 152 is made of any suitable heat conductive material, such as aluminum, and includes a plurality of heat exchanger fins 159 on a side thereof opposite the central recess 154. Further, if desired, and as in the embodiment of FIGS. 1-8, the base surface 156 and/or the tapered circumferential wall 158 may be covered or coated by a reflective material, which may be a white material or a material that exhibits specular reflective characteristics. A light source comprising one or more light emitting diodes (LEDs) 160 that is identical or similar to the light source 60 seen in FIG. 8 is mounted on a support member (not seen, but which may be identical or similar to the member 62 described above comprising a heat conductive substrate, such as a metal circuit board), and extends beyond the base surface 156.

The light source 160 is operated by control circuitry (not shown, but which may be identical or similar to the circuitry 64 described above) disposed in the central body 146 that receives AC power via the Edison-style plug. As in the previous embodiment, the control circuitry may be potted in the central body 146. Wires or conductors extend through one or more of the arms 148a-148d from the control circuitry to the light source 160. As in the previous embodiment, preferably, the light source 160 develops light appropriate for general illumination purposes.

A waveguide 170 is disposed in contact with the base surface 156 and the tapered circumferential wall 158 and is located by four location pins 172 that are disposed in corresponding blind bores 174 (the pins and the bores are identical or similar to the pins 72 and bores of FIGS. 6 and 8). In the illustrated embodiment, the waveguide 170 is similar or identical to the waveguide 70 or any other waveguide disclosed herein, it being understood that the waveguide may alternatively be modified in accordance with the design details of the present invention. As in the previous embodiment, the light source 160 extends into a central bore 176 of the waveguide 170 from a second side thereof. Also in the illustrated embodiment, a conical plug member 178 is secured to the waveguide 170 by any suitable means, such as a press fit, friction fit, and/or adhesive, and extends into the central bore 176 from the first side thereof, as in the embodiment of FIGS. 1-8. Also as noted above, the conical plug member 178 may be integral with the waveguide 170 rather than being separate therefrom. (For example, see FIG. 47, which illustrates that the plug member may be disposed completely within the central bore.) Further, the light source 160 may be integral with the waveguide 170, if desired.

The waveguide 170 may be secured in any suitable fashion and by any suitable means to the heat exchanger 152. In the illustrated embodiment, a ring member 190 similar or identical to the ring member 90 is secured to surfaces of the heat exchanger 152 and is retained thereon such that ribs 192 of the heat exchanger 152 are disposed in recesses 194 of the ring member 190 (FIG. 18). In addition the ring member 190 bears against that outer surface of the waveguide 170 so that the waveguide 170 is secured in place.

As in the previous embodiment, the lamp 140 can be used for general illumination, such as in a downlight or other luminaire, and achieves the advantages noted with respect to the previous embodiment.

Figure 18A:
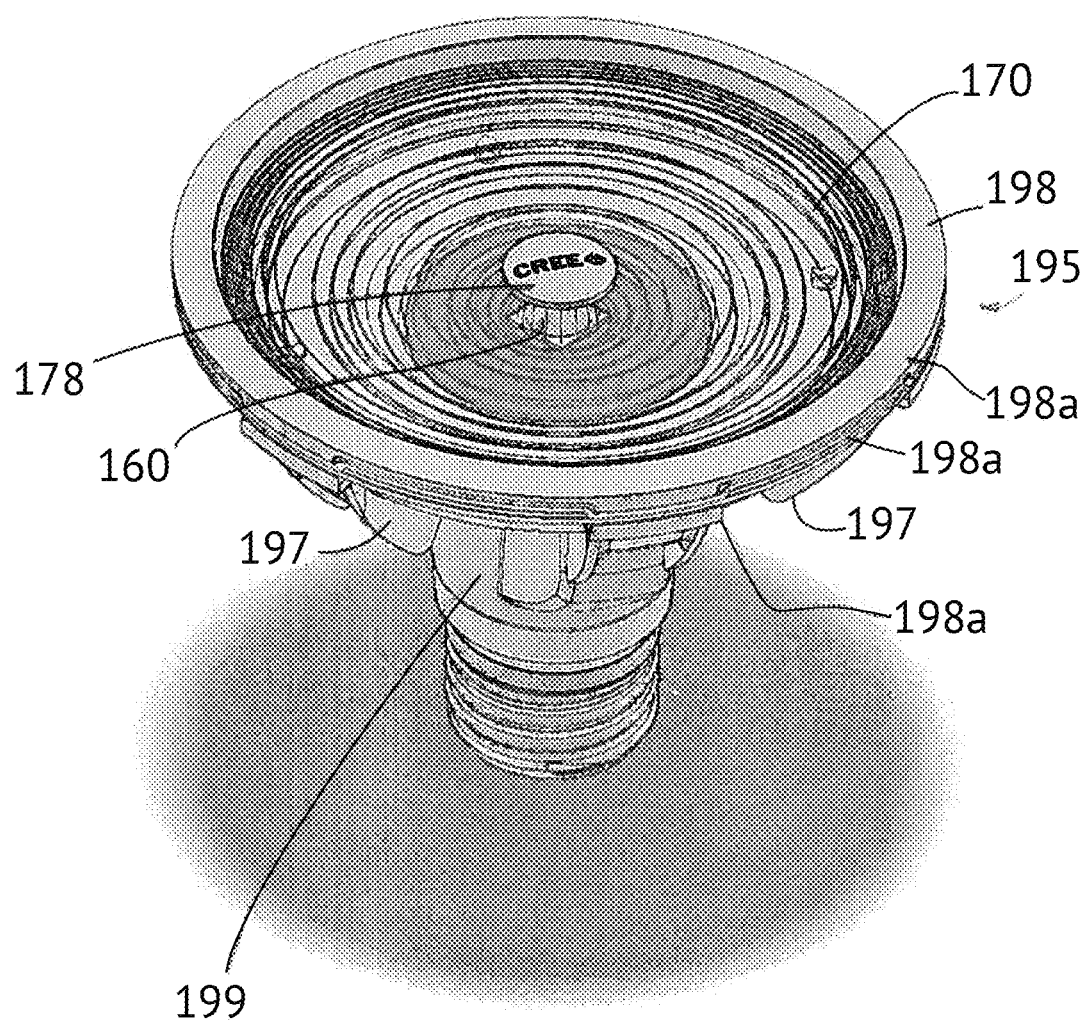
FIGS. 18A and 18B are isometric views of a further lamp.
Figure 18B:
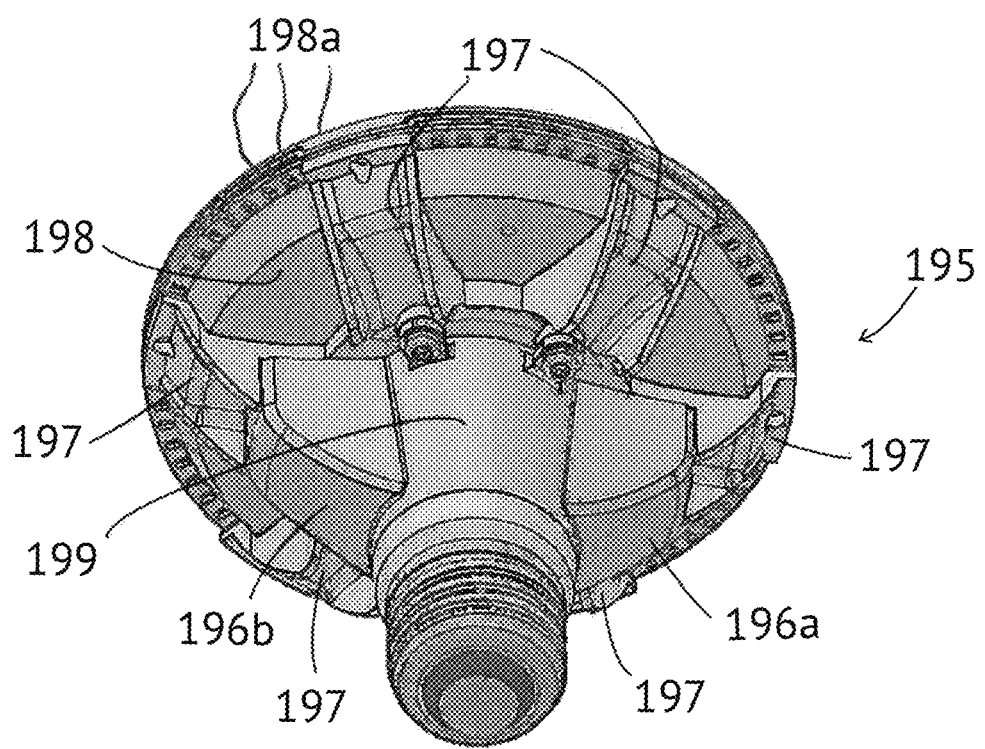

FIGS. 18A and 18B show yet another lamp 195 suitable for general illumination purposes. The lamp 195 may be of a size suitable for use as a PAR 30 lamp. The lamp 195 is substantially similar to the lamp 140 and includes two main arms 196a, 196b secured to a heat exchanger assembly including open fin structures 197 secured to a lower surface of a light assembly 198. The light assembly 198 includes the waveguide 170, or any other suitable waveguide, the light source 160, and the plug member 178 (or any other suitable light source and/or plug assembly). The light source 160 is mounted on a circuit board substrate that is intimately thermally coupled to the heat exchanger assembly by one or more rings 198a. Control circuitry (not shown) is disposed within a central body 199 and is connected to control the light source 160 by one or more wires that extend though one or both of the arms 196a, 196b. The open fin arrangement of the heat exchanger assembly and the intimate thermal coupling of the light source 160 to the heat exchanger assembly may allow improved thermal management such that the lamp 195 might be usable in enclosed installations.

FIGS. 18C-18G show a still further lamp 195a suitable for general illumination purposes. The lamp 195a may be of a size suitable for use as a PAR 30 lamp. The lamp 195a is substantially similar to the lamp 140 and includes three main arms 196c, 196d, 196e carried by a cup-shaped member 196f and secured to a heat exchanger assembly including open fin structures 197a secured to a lower surface of a light assembly 198a. The light assembly 198a includes the waveguide 170, or any other suitable waveguide, the light source 160, and the plug member 178 (or any other suitable light source and/or plug assembly). The light source 160 is mounted on a circuit board substrate that is intimately thermally coupled to the heat exchanger assembly by one or more rings 198b. Control circuitry (not shown) is disposed within a central body 199a and is connected to control the light source 160 by one or more wires that extend though one or more of the arms 196c-196e. The open fin arrangement of the heat exchanger assembly and the intimate thermal coupling of the light source 160 to the heat exchanger assembly may allow improved thermal management such that the lamp 195a might also be usable in enclosed installations.

Figure 19:
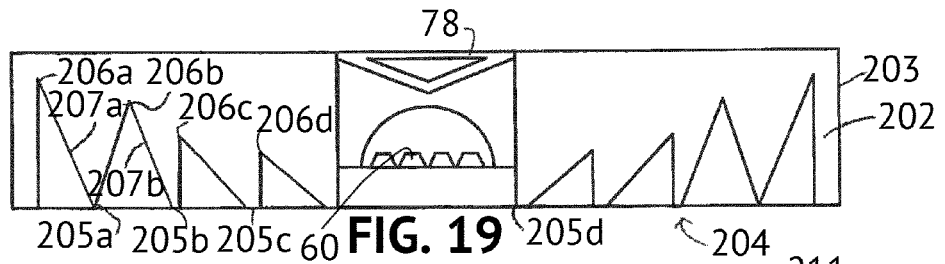
FIGS. 19, 19A and 20-25 are cross sectional views similar to FIG. 11 of further embodiments of waveguides according to the present invention.

Referring next to FIGS. 19-25, the waveguide can be modified to achieve other visual and/or optical characteristics. Specifically, the size, shape, other geometry, spacing, number, symmetry, and/or other physical characteristic(s) of the waveguide generally and/or the extraction features can be varied, as desired. Thus, FIG. 19 illustrates a waveguide 202 having an axial outer wall 203 and extraction features 204 comprising a plurality of ridges and troughs 205, 206. In this embodiment, the ridges 205 are unequally spaced, for example, the ridge 205a is spaced a first distance from an adjacent ridge 205b, the ridge 205b is spaced a second, different distance from an adjacent ridge 205c, and the ridge 205c is spaced a third distance from an adjacent ridge 205d. Further, the depths of the troughs 206 are different. Specifically, a depth of a trough 206a is different than the depths of troughs 206b, 206c and 206d. The shapes of one or more of the ridges 205a, 205b, 205c, and 205d can be different than other ridges. Also, a tapered surface 207a may be disposed at a first angle and a tapered surface 207b may be disposed at a second angle different than the first angle with respect to the first side of the waveguide. Alternatively, the pitch or spacings between troughs 205, the depths of the troughs 206, the angles of tapered surfaces 207, and the widths and shapes of the troughs 206 and/or the ridges 205 may be the same or different, as desired (compare FIG. 19 to subsequent FIGS.).

Figure 19A:
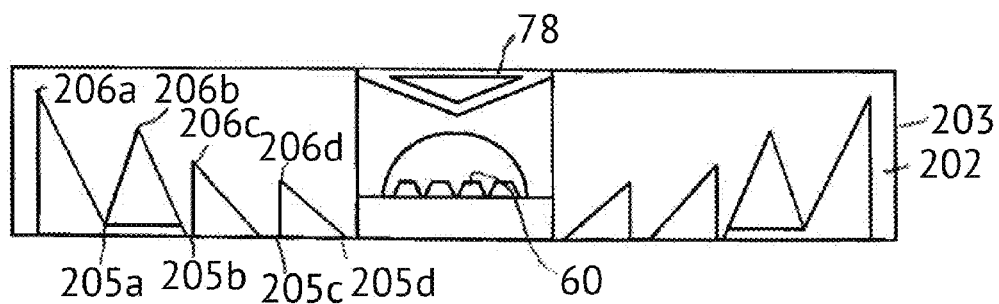

It should be also noted that less than all of the ridges 205 may be coterminous. Thus, for example, as seen in FIG. 19A, a ridge 205a may be disposed at a different elevation (i.e., distance from the first side of the waveguide) than remaining ridges 205b, 205c and/or 205d, which are coterminous.

Figure 20:
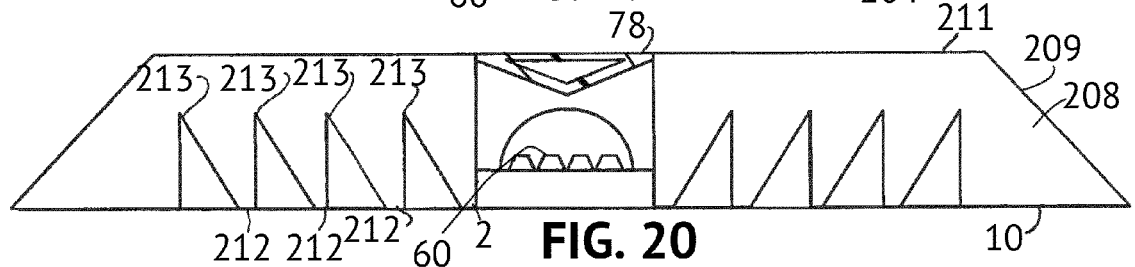
Figure 21:
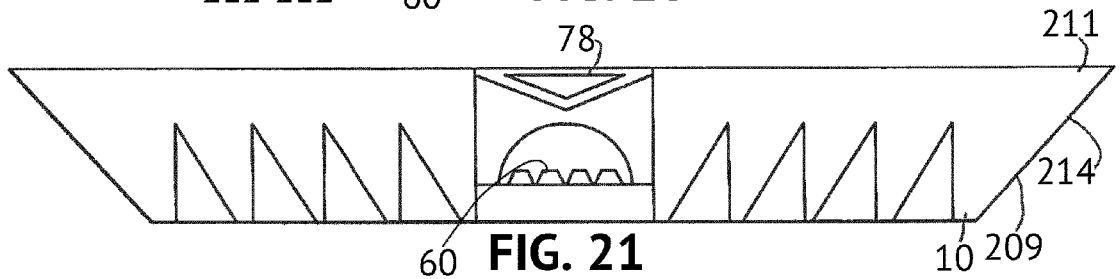

FIG. 20 illustrates a waveguide 208 having an inclined outer surface 209 wherein the surface 209 linearly tapers from a second side or surface 210 to a first side or surface 211. Extraction features comprising a plurality of ridges 212 and troughs 213 are equally sized and spaced in a symmetric pattern about a central axis of the waveguide 208. FIG. 21 illustrates a waveguide 214 substantially or completely identical to the waveguide 208, with the exception that the outer surface 209 linearly tapers from the surface 211 to the surface 210. As should be evident from an inspection of FIGS. 20 and 21, the outer surface may be disposed at an acute angle with respect to one of the first and second sides of the waveguide and may be disposed at an obtuse angle with respect to another of the first and second sides.

Figure 22:
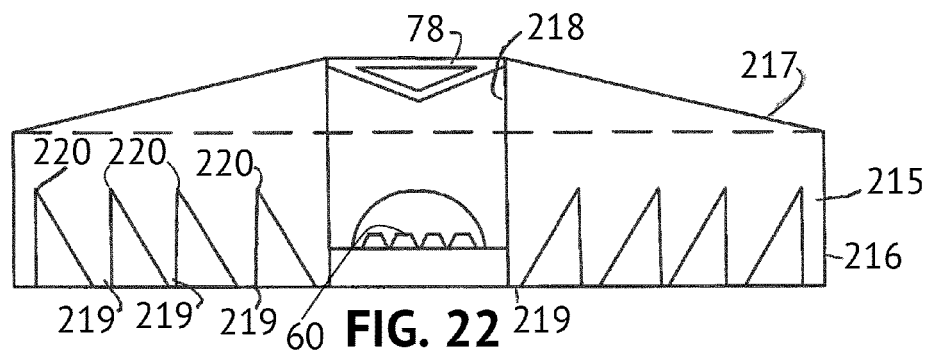
Figure 23:
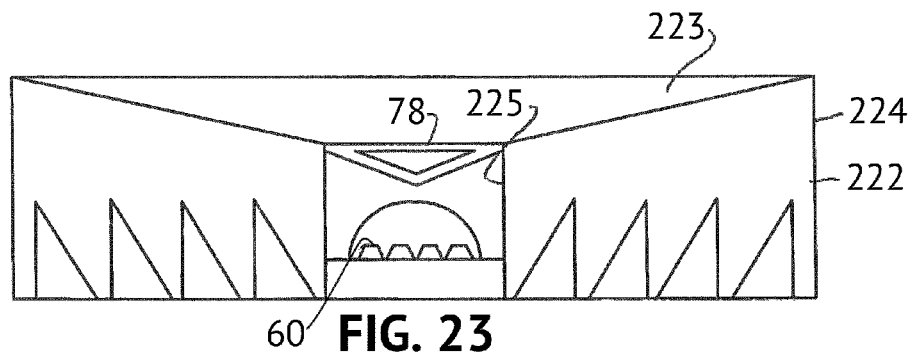

FIG. 22 illustrates a waveguide 215 having a frustoconically-shaped first side including a first surface 217 that is tapered from a central bore 218 to the outer surface 216. The waveguide 215 includes equally spaced and equally sized ridges 219 and troughs 220 and an outer surface 216 that extends in an axial direction. A waveguide 222 shown in FIG. 23 is substantially or completely identical to the waveguide 215, with the exception that the waveguide 223 is substantially or completely inverted frustoconically shaped in that the first surface 223 is inversely linearly tapered from an outer surface 224 to a central bore 225 as compared to the embodiment of FIG. 22. Thus, the first side of the waveguide may be convex (as in FIG. 22) or concave (as in FIG. 23) at least in part.

Figure 24:
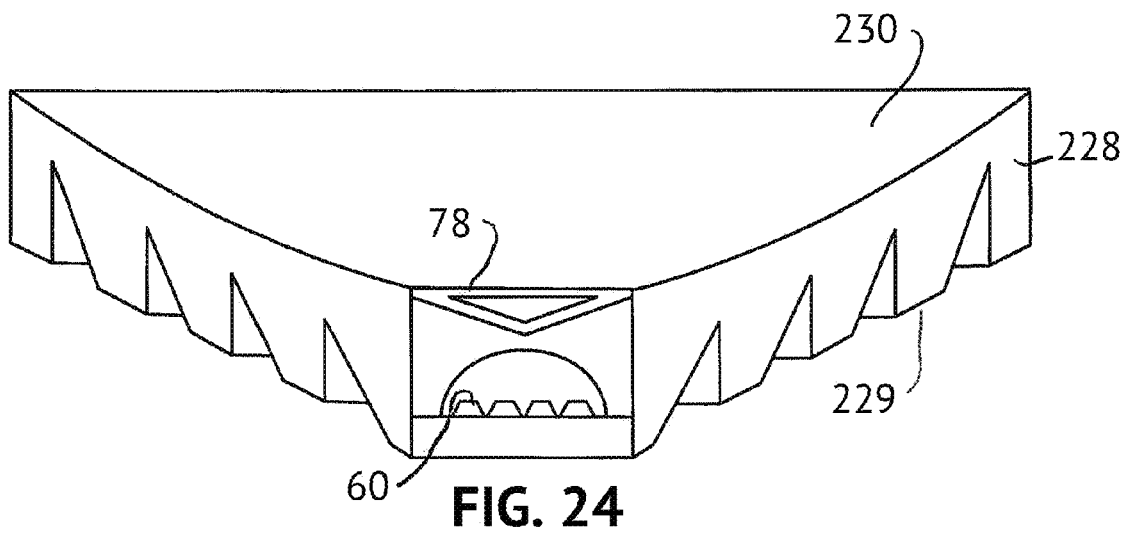

FIG. 24 illustrates a waveguide 228 having a concave first surface at least in part and which is identical or similar to FIG. 23, with the exception that first and second sides or surfaces 229, 230 are curved. In the illustrated embodiment, the sides or surfaces 229, 230 converge with radial distance from a centerline of the waveguide 228 resulting in a tapered waveguide, although these surfaces may alternatively diverge or be equally spaced over the radial dimension thereof.

Figure 25:
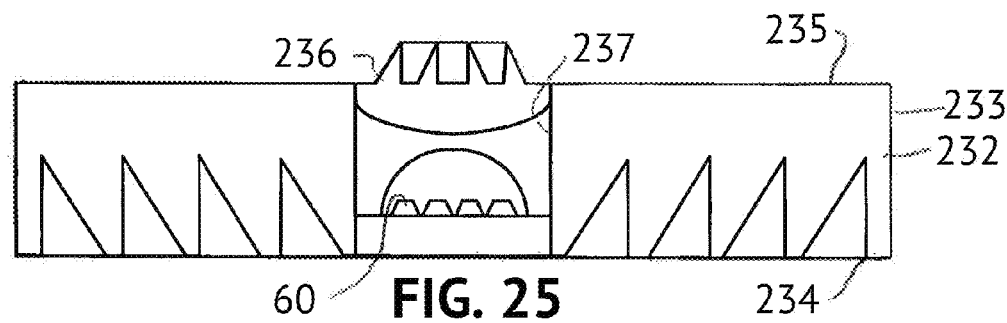

FIG. 25 illustrates a waveguide 232 having an axial outer surface 233, a first surface 234 and a second surface 235 that is generally parallel to the first surface 234. However, in the illustrated embodiment of FIG. 25, the plug member 78 is replaced by a total internal reflectance optical member 236 that is disposed within a central bore 237. The optical member 236 permits some light to pass from the light source 60 axially outwardly therethrough, and further reflects remaining light off of one or more surfaces of the optical member 236 into the waveguide in a transverse direction, as with the previous embodiments. While the embodiment of FIG. 25 may result in better efficiency, and may permit use of a smaller diameter waveguide, color mixing of light developed by the light source 60 may be adversely affected, and hence, the embodiment of FIG. 25 is preferably used with a single color light source 60 rather than one that attempts to duplicate a true-white appearance. Also, the embodiment of FIG. 25 may develop enough intensity to obtain a beam angle greater than or equal to 25° and may render the entire lamp simpler and cheaper. However, it may be that the intensity performance of the embodiment of FIG. 25 may be insufficient to permit development of an acceptable beam angle of less than 10°.

Figure 26:
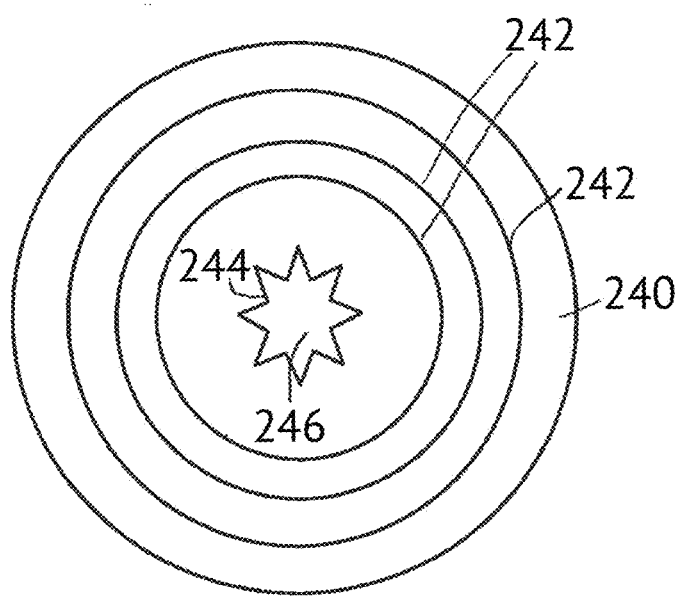
FIGS. 26-29 are elevational views of still further embodiments of waveguides according to the present invention.

Still further alternate configurations of the waveguide are illustrated in FIGS. 26-29. FIG. 26 shows a waveguide 240 having an overall circular configuration having a plurality of extraction elements 242 and a star-shaped central bore 244 that may be substituted for the circular cylindrical bore of the waveguide 70. A complementarily-shaped plug member 246, which may also have a star shape, may be inserted into and retained within the star-shaped central bore 244. The plug number 246 may have a star-shaped tapered (i.e., conical) member that reflects light generated by a light source 60, or may have a circular conical reflective surface, or any other shaped reflective surface, as desired.

Figure 27:
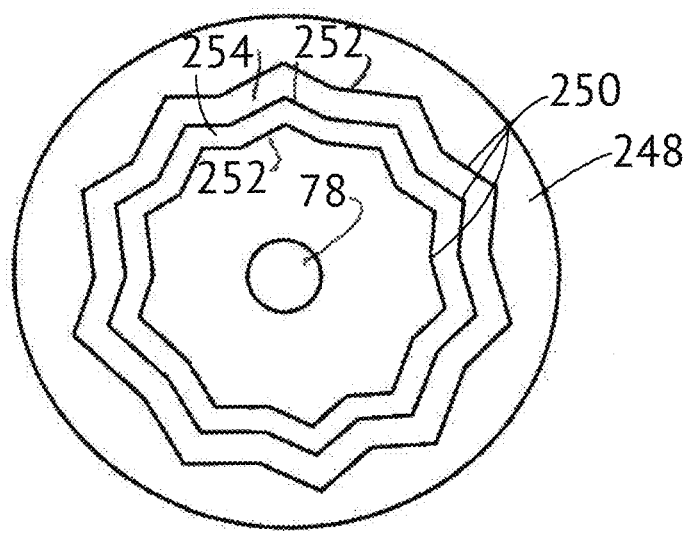

FIG. 27 illustrates an embodiment wherein a generally circular waveguide 248 includes a plurality of waveguide features 250 that surround a central axial bore 252 of circular cylindrical shape. The extraction features 250 may comprise a series of ridges 252 and troughs 254 wherein the ridges and troughs 252, 254 are approximately or substantially flower-shaped or comprise some other shape. The waveguide 248 may be used with the plug member 78, or another plug member as desired.

Figure 28:
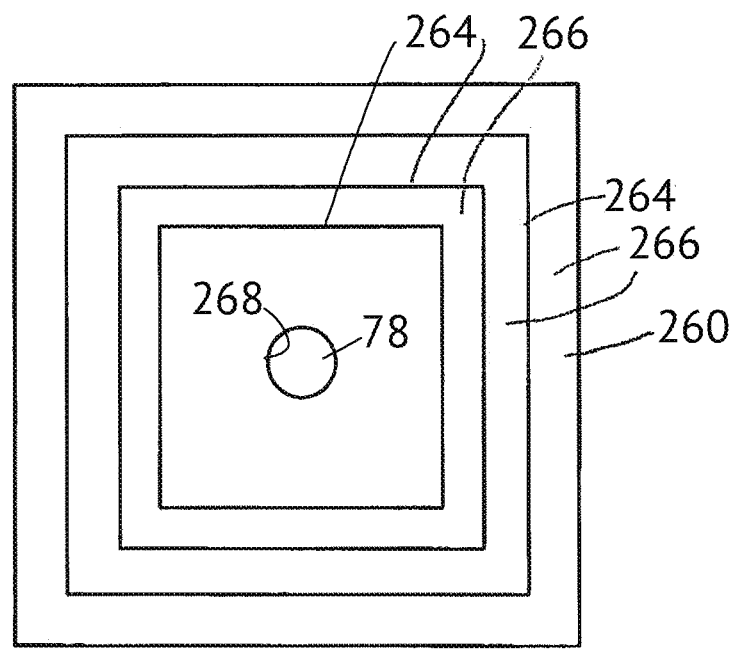
Figure 29:
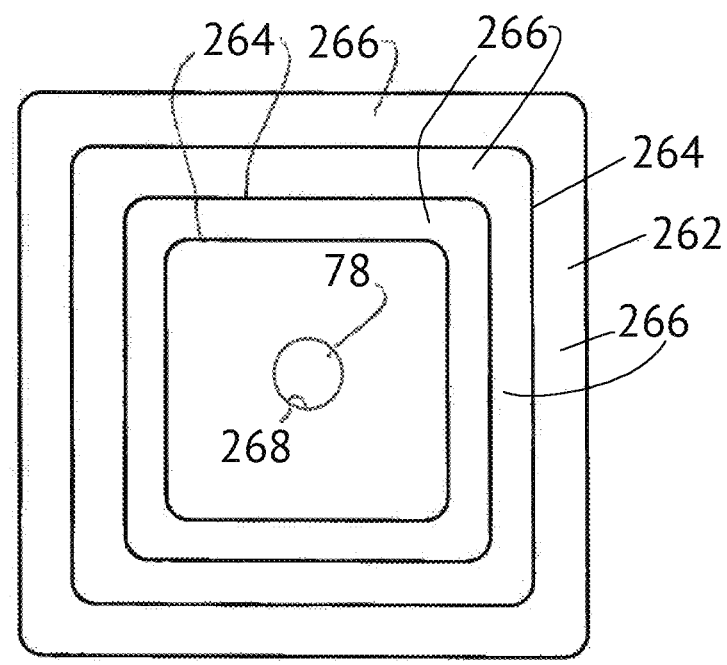

FIGS. 28 and 29 illustrate waveguides 260, 262, respectively, which are approximately or substantially rectangular or square. In the case of the waveguide 260 the extraction features 264 comprise ridges separated by intervening troughs 266 and the ridges and troughs are rectangular or square. Also in the illustrated embodiment of FIG. 28, corners between the sections of the ridges and troughs are sharp and the ridges and troughs surround a circular cylindrical central bore 268. The plug member 78 may be used with the embodiment of FIG. 28, if desired.

FIG. 29 illustrates an embodiment identical to FIG. 28, with the exception that the corners between adjacent sections of the ridges and troughs 264, 266 are rounded. Again, a circular cylindrical central bore may be provided and the plug number 78 may be used with the embodiment of FIG. 29.

Figure 30:
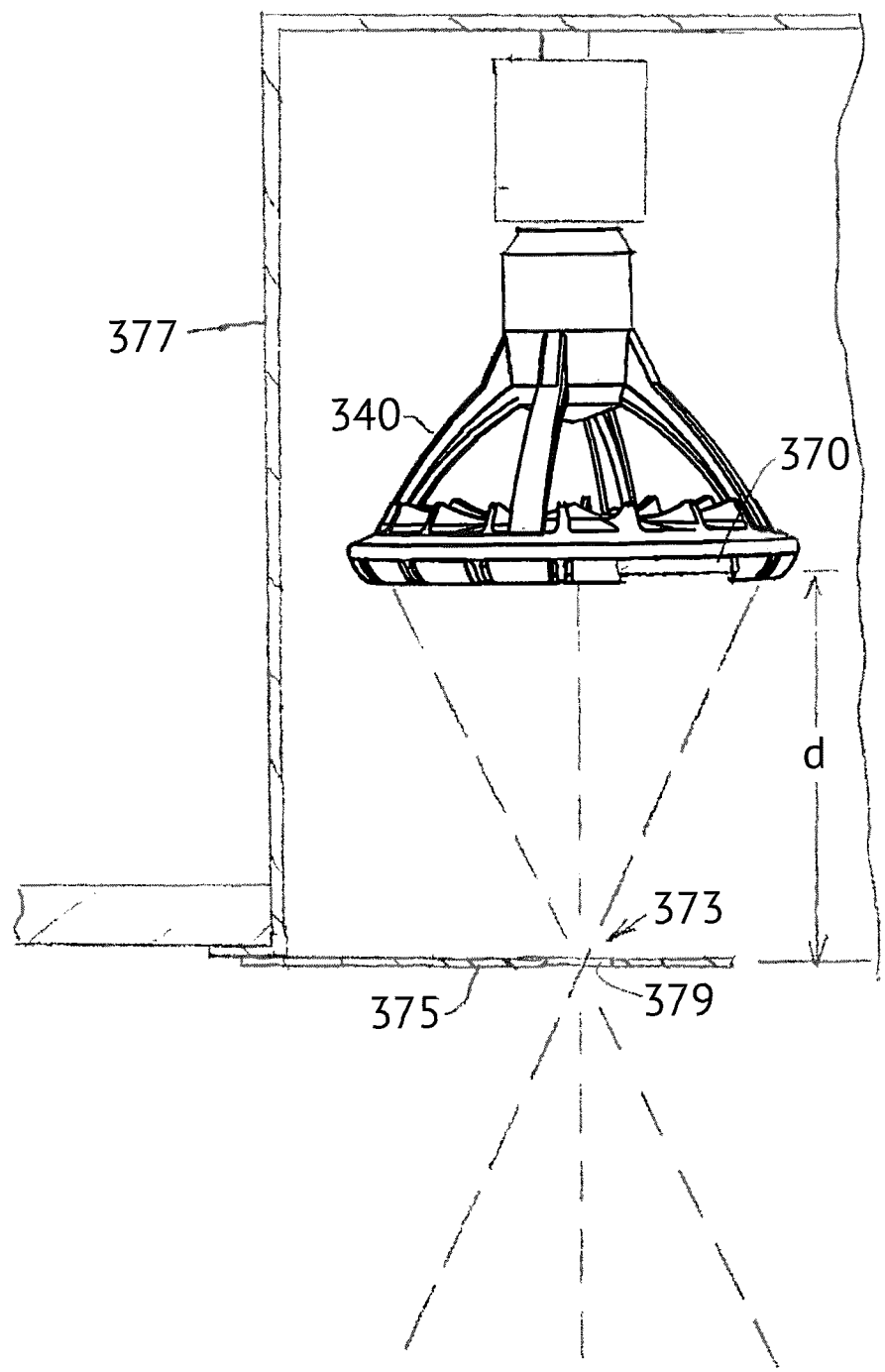
FIG. 30 is a side elevational view, partly in section, of yet another embodiment of a luminaire including a waveguide according to the present invention.
Figure 31:
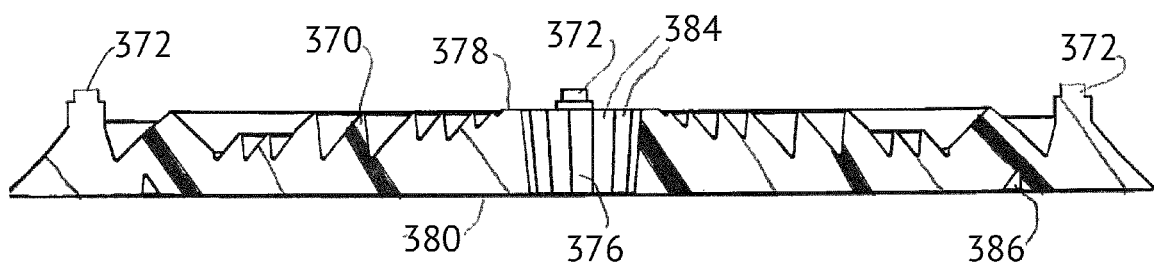
FIG. 31 is a view identical to FIG. 11 of a further waveguide according to the present invention.

It should be noted that, in an alternative embodiment, the waveguide can be designed to provide a beam angle that has a minimum transverse spread at a particular distance from the waveguide and larger transverse spreads at lesser and greater distances from the waveguide. More particularly, referring to FIG. 30, a lamp 340 identical to the lamp 40 and having a waveguide 370, which may be similar or identical to any of the waveguides described hereinabove in terms of material composition and overall geometry, may be designed to include extraction features that are preferably, although not necessarily, symmetric about a central axis of the waveguide. The extraction features may be different than the extraction features described above such that light rays emitted at radially outward portions of the waveguide 370 are directed axially inwardly and downwardly (as seen in FIG. 30), with the magnitude of the angle of inward direction being roughly or substantially proportional to the radial distance of emission of the light ray from the center of the waveguide 370. The resulting beam shape is such that a convergence region 373 is formed at a distance d from the outer surface of the waveguide. Light rays diverge at distances greater than d from the waveguide 370. This beam shape permits a trim ring 375 of an associated luminaire 377 to have a relatively small diameter aperture 379 but still have a significantly large illumination area beyond the distance d. The result is a reduction in visible glare because of the shielding effect provided by the trim ring 375 and a pleasing aesthetic appearance. In general, the size of the aperture 379 is preferably equal to or smaller than the size of the waveguide of the lamp 340, and, more preferably, the cross sectional size of the aperture 379 relative to the cross sectional size of the waveguide is between about 1:2 to about 1:4. The design of a waveguide that effectuates the foregoing is within the abilities of one of ordinary skill in the art given the disclosure herein.

FIGS. 31-35 illustrate yet another embodiment of a waveguide 370 in accordance with the present invention. The waveguide 370 may be used in place of any of the waveguides disclosed herein, such as the waveguide 170. The waveguide 370 includes four location pins 372 that are identical to the pins 72. In the illustrated embodiment, the light source 60 extends into a central bore 376 of the waveguide 370 from a second side 378 thereof. Also in the illustrated embodiment, a conical plug member (such as the plug member 78) is secured to the waveguide 370 by any suitable means, such as adhesive, and extends into the central bore 376 from a first side 380 thereof, as in the embodiment of FIGS. 1-8. Also as noted above, the conical plug member 78 may be integral with the waveguide 370 rather than being separate therefrom. Further, the light source 60 may be integral with the waveguide 370, if desired.

Figure 32:
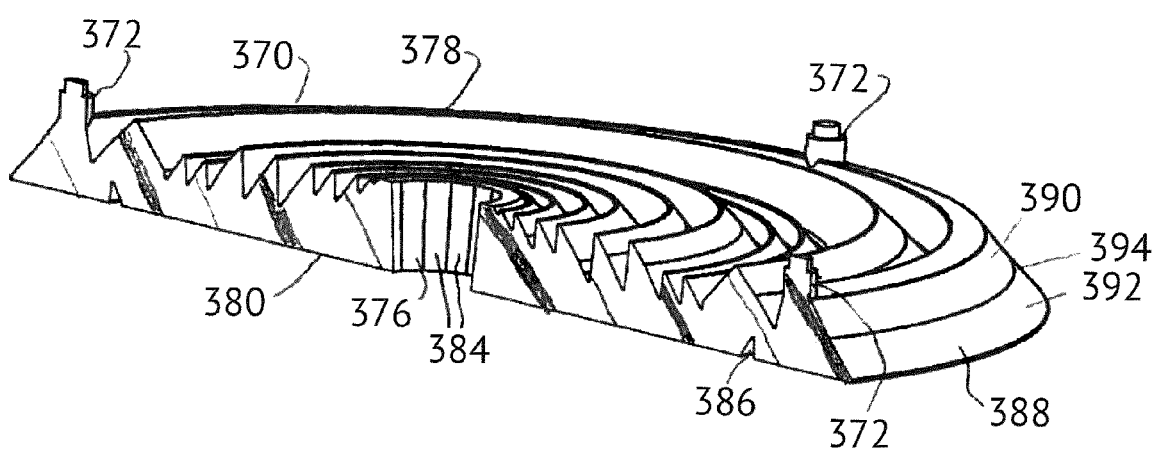
FIG. 32 is a sectional and first side isometric view of the waveguide of FIG. 31.
Figure 33:
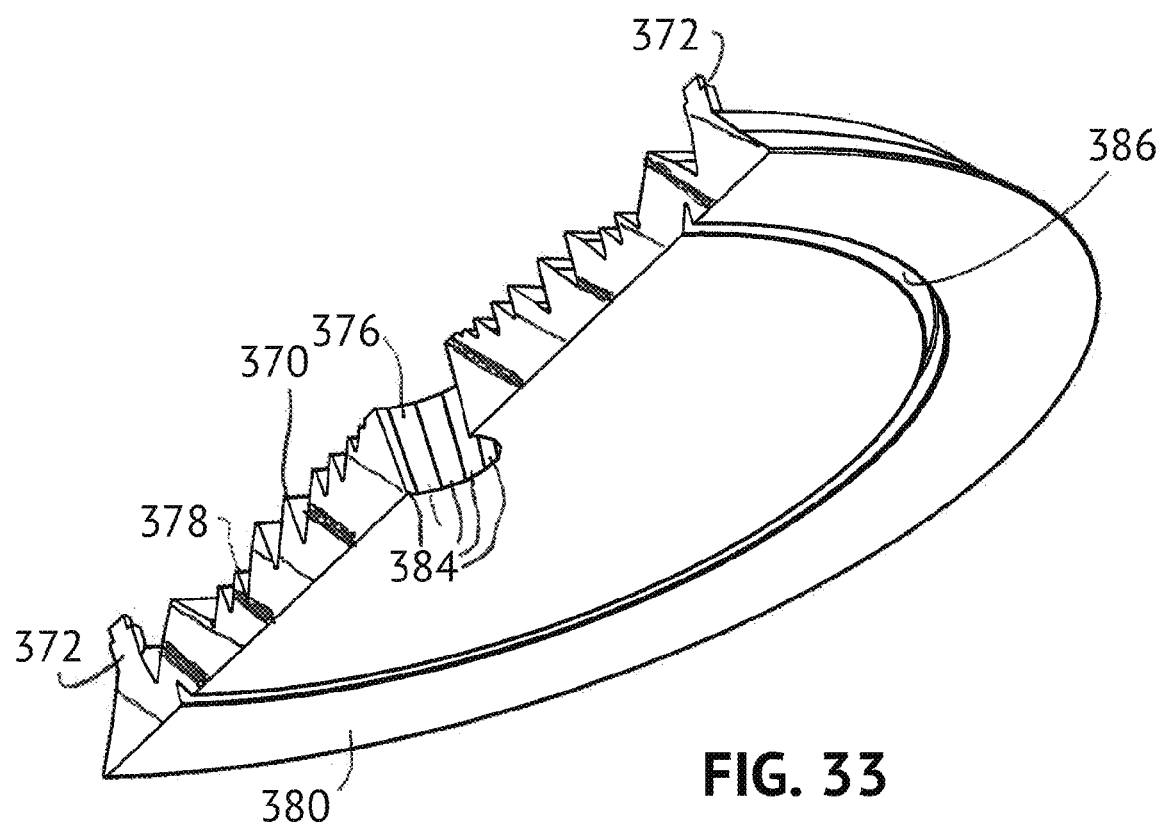
FIG. 33 is a sectional and second side isometric view of the waveguide of FIG. 31.
Figure 34:
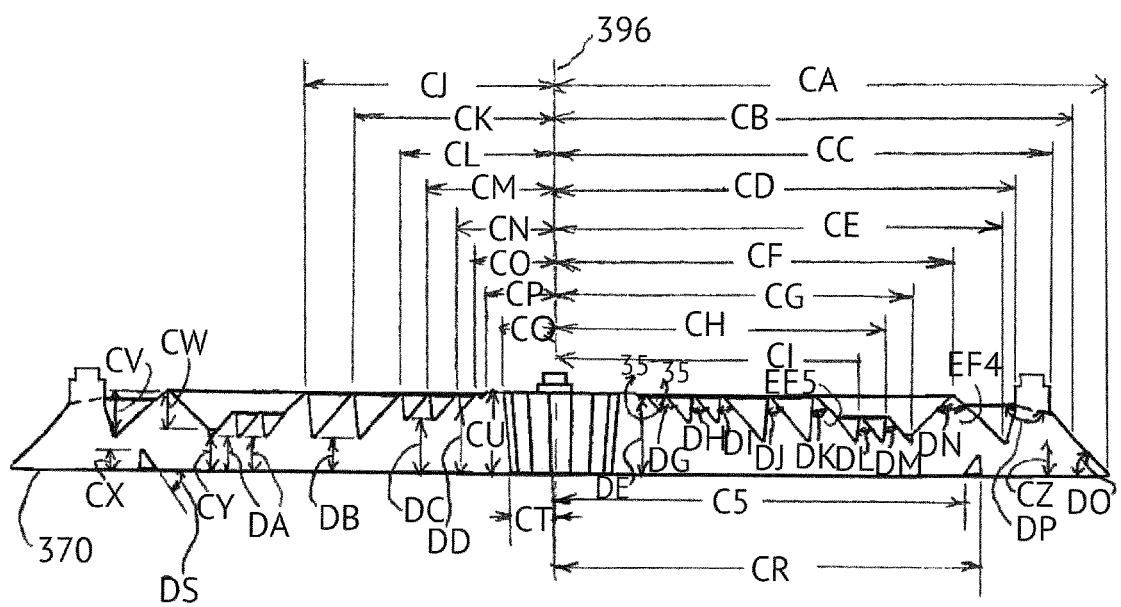
FIG. 34 is a sectional view identical to FIG. 31 identifying sample dimensions of the waveguide thereof.

Also in the illustrated embodiment, the central bore 376 is not cylindrical, but instead comprises a tapered bore defined by twelve equally-sized facets 384. In the illustrated embodiment in which the waveguide 370 is made of an acrylic, the taper may be at an angle between about zero degrees and about 8 degrees. In other embodiments in which the waveguide is made of another material, such as polycarbonate or glass, the taper angle maximum may be other than 8 degrees without significantly adversely affecting efficiency. An extraction feature in the form of a groove 386 extends into the waveguide 370 from the first side 380. An outer tapered portion 388 includes first and second sections 390, 392 that meet at a junction 394 (FIG. 32). As in the previous embodiments, the waveguide 370 is made of optical grade acrylic and/or silicone and, in one example, has the dimensions noted in the following table and as seen in FIG. 34. It should be noted that the dimensions in the following table as exemplary only and not limiting (the dimension CB is the distance of the junction 394 from the center line 396 (FIG. 34) of the waveguide 370):

TABLE 2

| REFERENCE (FIG. 34) | NOMINAL DIMENSION (Millimeters - unless otherwise specified) |
|---|---|
| CA | 47.431 |
| CB | 44.789 |
| CC | 42.500 |
| CD | 39.500 |
| CE | 38.763 |
| CF | 34.105 |
| CG | 30.547 |
| CH | 28.475 |
| CI | 26.155 |
| CJ | 22.171 |
| CK | 18.203 |
| CL | 14.042 |
| CM | 11.658 |
| CN | 9.032 |
| CO | 7.348 |
| CP | 6.5000 |
| CQ | 5.000 |
| CR | 36.648 |
| CS | 34.922 |
| CT | 4.388 |
| CU | 7.000 |
| CV | 4.018 |
| CW | 3.365 |
| CX | 1.707 |
| CY | 2.926 |
| CZ | 3.000 |
| DA | 2.926 |
| DB | 2.926 |
| DC | 4.582 |
| DD | 5.525 |
| DE | 6.500 |
| DF | 47.4° |
| DG | 45° |
| DH | 45° |
| DI | 47.3° |
| DJ | 45.7° |
| DK | 51.3° |
| DL | 43.9° |
| DM | 45.6° |
| DN | 95° |
| DO | 45° |
| DP | 55.8° |
| DQ | 134.1° |
| DR | 49° |
| DS | 55° |

Figure 35:
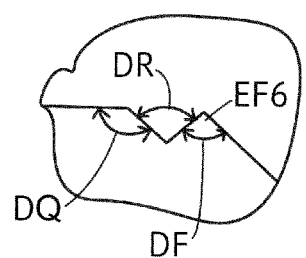
FIG. 35 is an enlarged fragmentary view of a portion of the waveguide of FIG. 34 seen generally at the lines 35-35 of FIG. 34.
Figure 36:
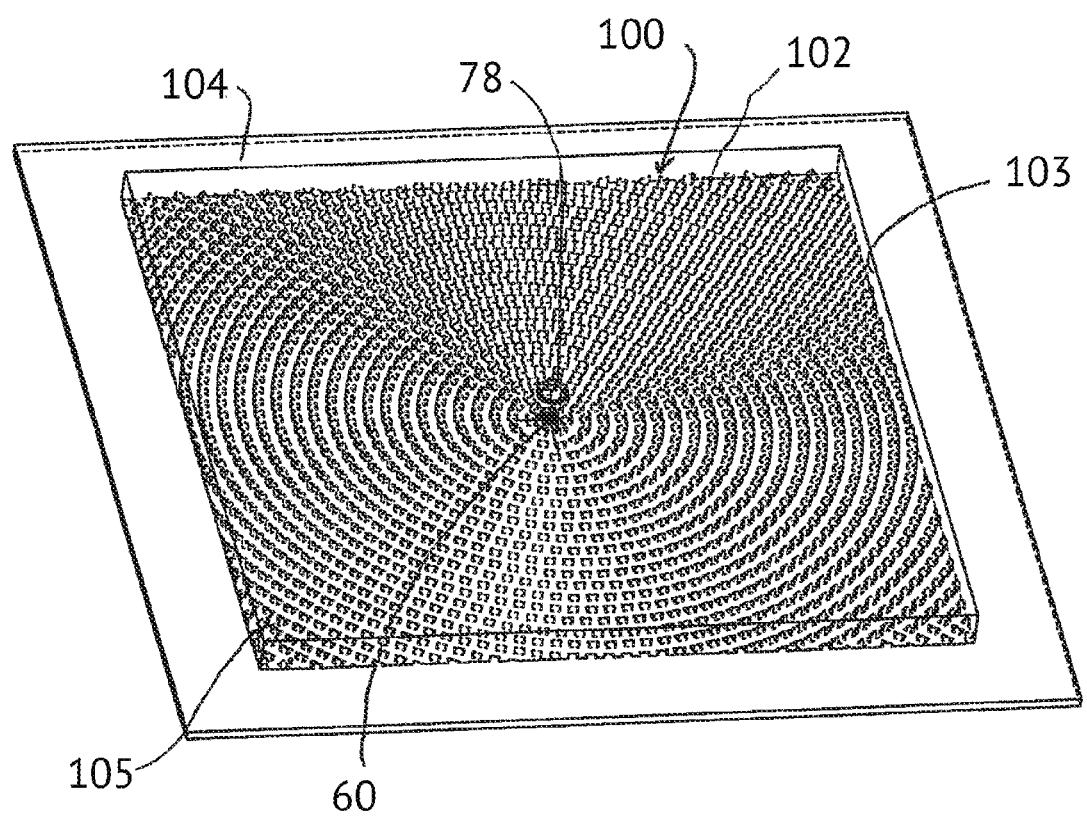
FIGS. 36-38 are isometric, plan and sectional views, respectively, of a further embodiment of an optical waveguide.
Figure 37:
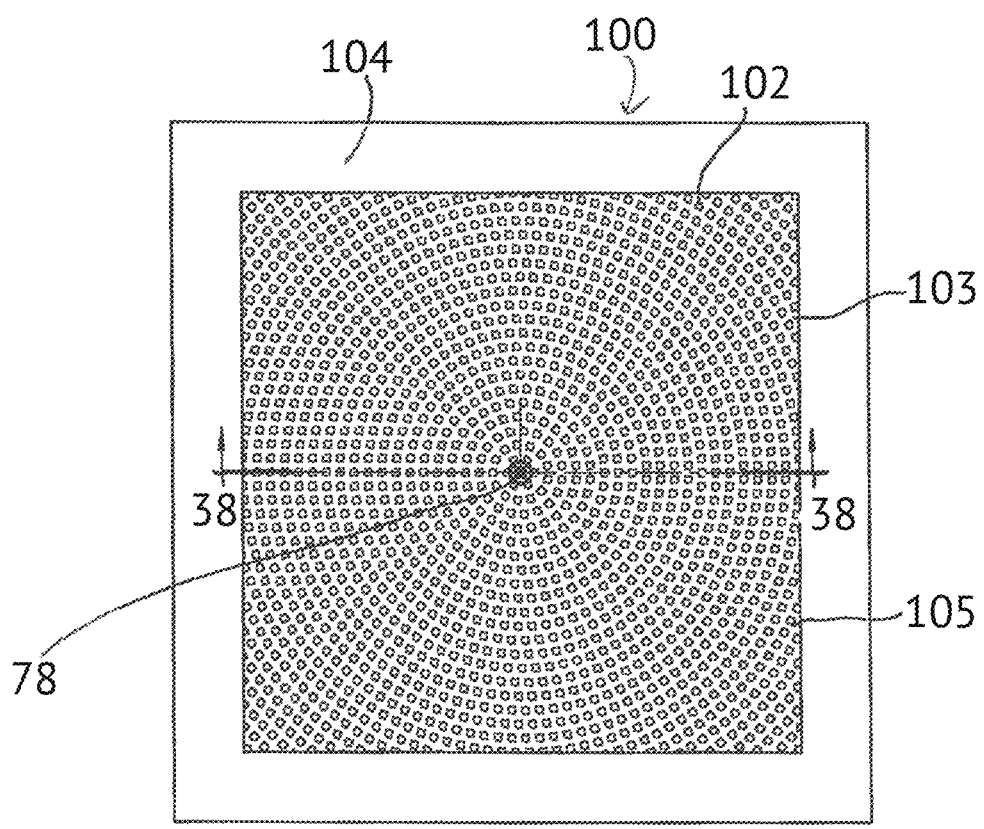
Figure 38:
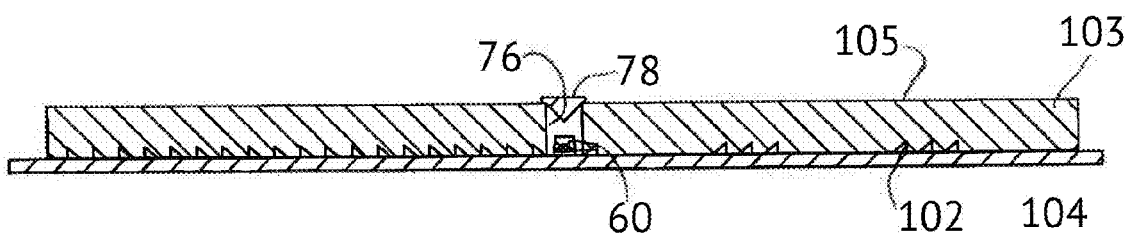

From the foregoing dimensions one can calculate extraction feature aspect ratios AR4, AR5, and AR6 at least approximately using the same equation (1) above for extraction features EF4, EF5, and EF6 in FIGS. 34 and 35 as follows:

$$AR4=(CE-CG)/(CU-CY)=(38.763-30.547)/(7.000-2.926)=8.216/4.074=2.02 \quad (5)$$

$$AR5=(CI-CJ)/(CU-DB)=(26.155-22.171)/(7.000-2.926)=3.984/4.074=0.98 \quad (6)$$

$$AR6=(CN-CP)/(CU-DE)=(9.032-6.500)/(7.000-6.500)=2.532/0.500=5.064 \quad (7)$$

As seen in the FIGS. and as calculated above in the equations (2)-(7), the extraction features EF1-EF6 range between aspect ratios of about 0.98 to about 5.064. Preferably, although not necessarily, the present invention contemplates the use of extraction features having aspect ratios that vary between about 0.25 and about 20, and more preferably between about 0.5 and about 10, and most preferably between about 0.75 and about 7.5.

An inspection of tables 1 and 2 above also indicates that, overall, the waveguides include extraction features that are deeper with distance from the center line of the waveguide. Thus, for example, as seen in FIG. 11A, the extraction feature dimension A1 is less than the dimensions AK–AF, and the latter dimensions are less than the dimensions AE and AB. The same holds true for the extraction features of FIG. 34. In the illustrated embodiments, the depth of the extraction features varies between a minimum in FIG. 34 of 0.5 mm to a maximum in FIG. 11A of 5 mm. Extraction feature depths are preferably expressed as a percentage of overall thickness because, in general, the maximum depth of the extraction features is only limited by the structural integrity of the remaining material. Each extraction feature preferably has a depth between about 5% to about 75% of the overall thickness of the waveguide 70 (the overall thickness is the top to bottom dimension as seen in FIGS. 11A and 34 at the wall defining the central bore) and, more preferably, a depth between about 7% and 67% of the overall thickness of the waveguide. Greater extraction feature depths might be achievable using stronger material(s) for the waveguide.

Still further, the spacings (i.e., pitch) between adjacent extraction features overall increases with distance from the center line (although not necessarily in every circumstance between adjacent extraction features having small or approximately equal aspect ratios). For example, the distances between ridges of the extraction features of FIGS. 11A and 34 are as follows:

TABLE 3

| REFERENCE (FIG. 11A) | NOMINAL DIMENSION (Millimeters) |
|---|---|
| L-M | 2.000 |
| K-L | 4.700 |
| J-K | 4.300 |
| I-J | 4.000 |
| H-I | 4.500 |
| F-H | 4.200 |
| D-F | 5.400 |
| B-D | 8.500 |

TABLE 4

| REFERENCE (FIG. 34) | NOMINAL DIMENSION (Millimeters) |
|---|---|
| CO-CP | 0.848 |
| CN-CO | 1.684 |
| CM-CN | 2.626 |
| CL-CM | 2.384 |
| CK-CL | 4.161 |
| CJ-CK | 3.968 |
| CI-CJ | 3.984 |
| CH-CI | 2.320 |
| CF-CH | 5.630 |
| CD-CF | 5.395 |

The spacing between adjacent extraction features may be as small as about 0.7 mm (or less) near the center line of the waveguide and may be 9 mm (or more) at the outer edges of the waveguide.

Figure 9:
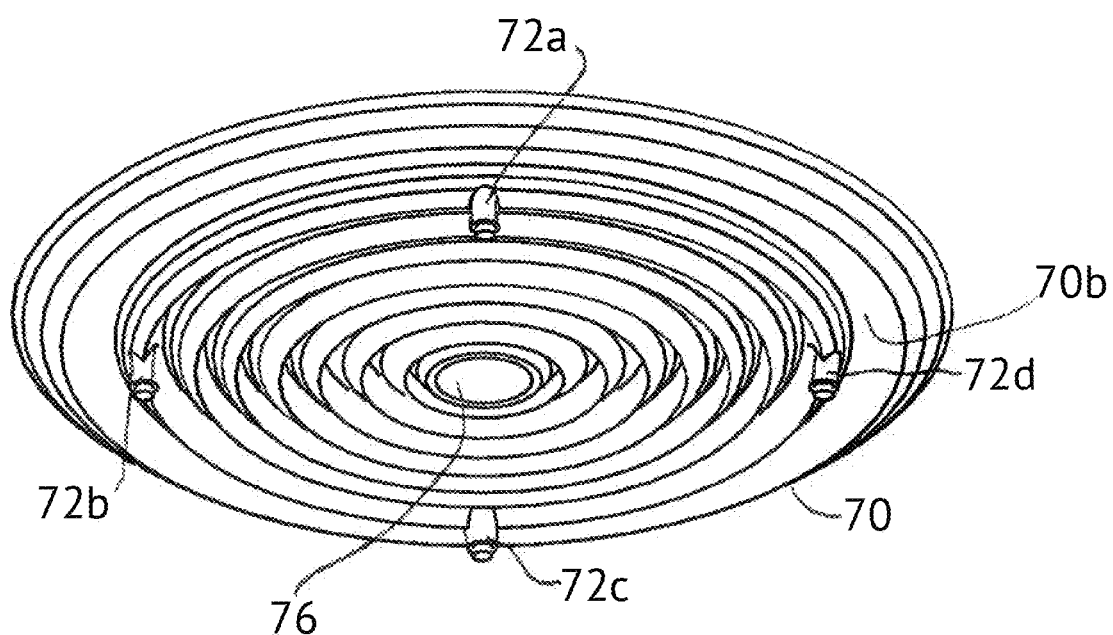
FIG. 9 is an interior isometric view of the waveguide of FIG. 1.
Figure 10:
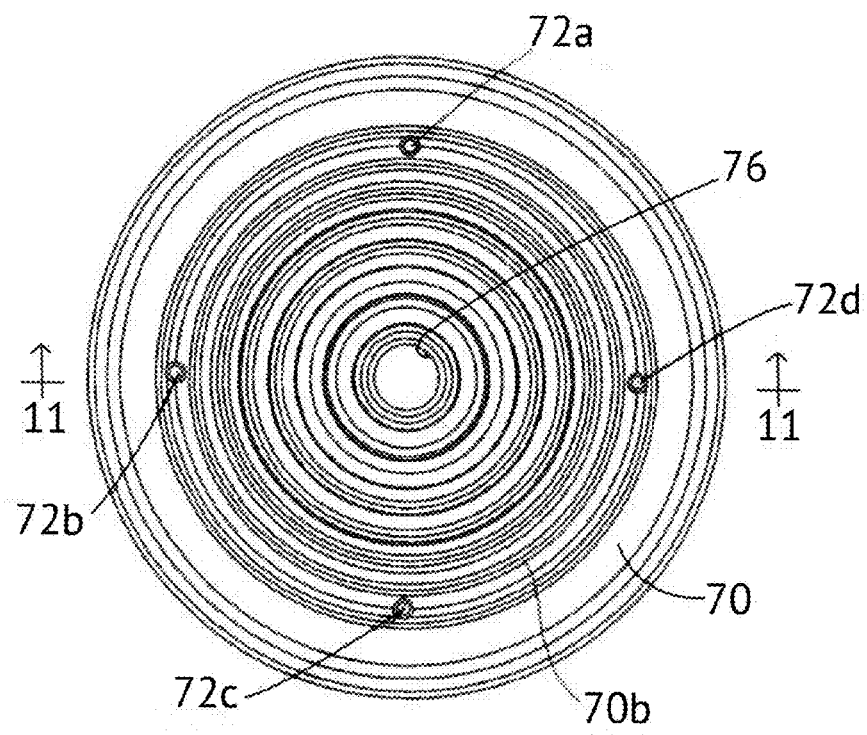
FIG. 10 is an interior elevational view of the waveguide of FIG. 1.

As in the embodiment of the waveguide shown in FIGS. 9-11, the waveguide 370 of FIG. 34 tapers from the center thereof to the edges in the sense that less material is disposed at the edges of the waveguide 70 than at the center. This fact, in combination with the particular design of the extraction features and the efficient coupling of light into the waveguide result in the improved color mixing, minimized thickness, and excellent control advantages noted above.

Figure 40:
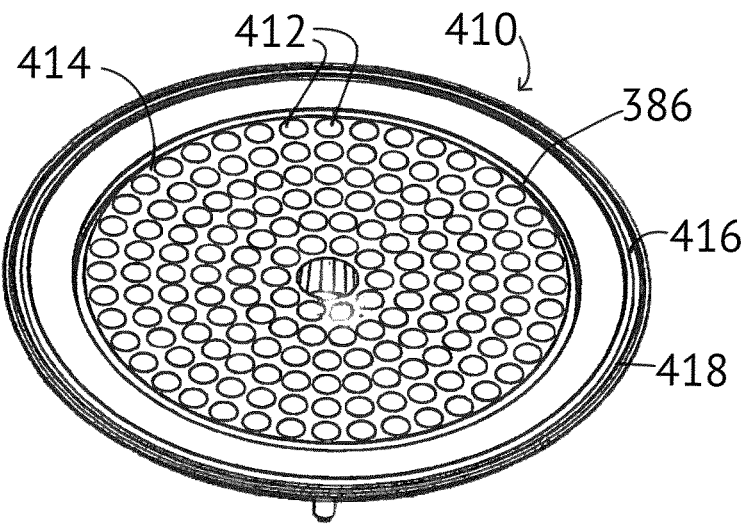
FIGS. 40-42 are isometric, plan, and fragmentary sectional views, respectively, of yet another optical waveguide.
Figure 41:
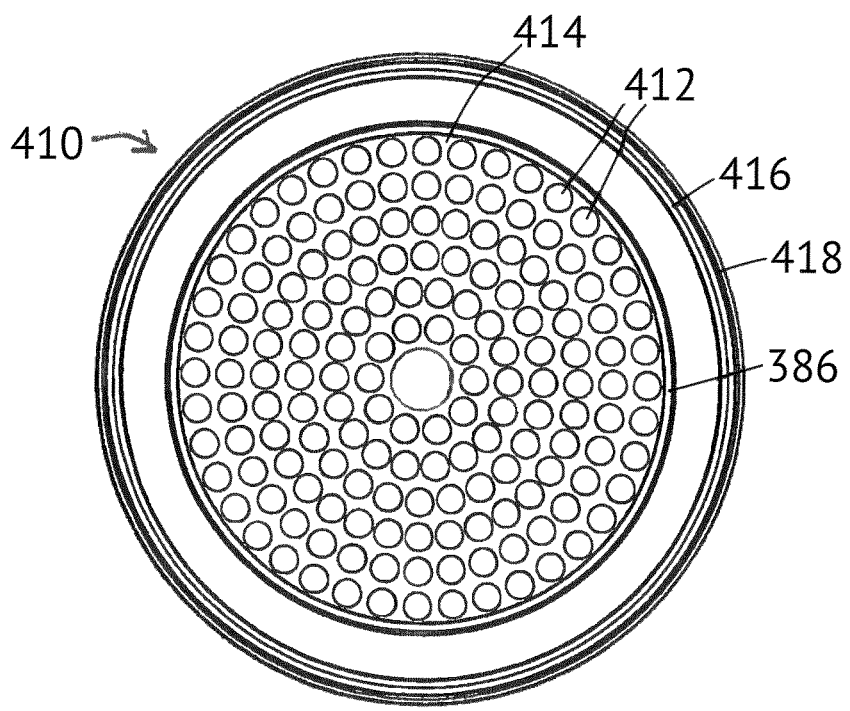
Figure 42:
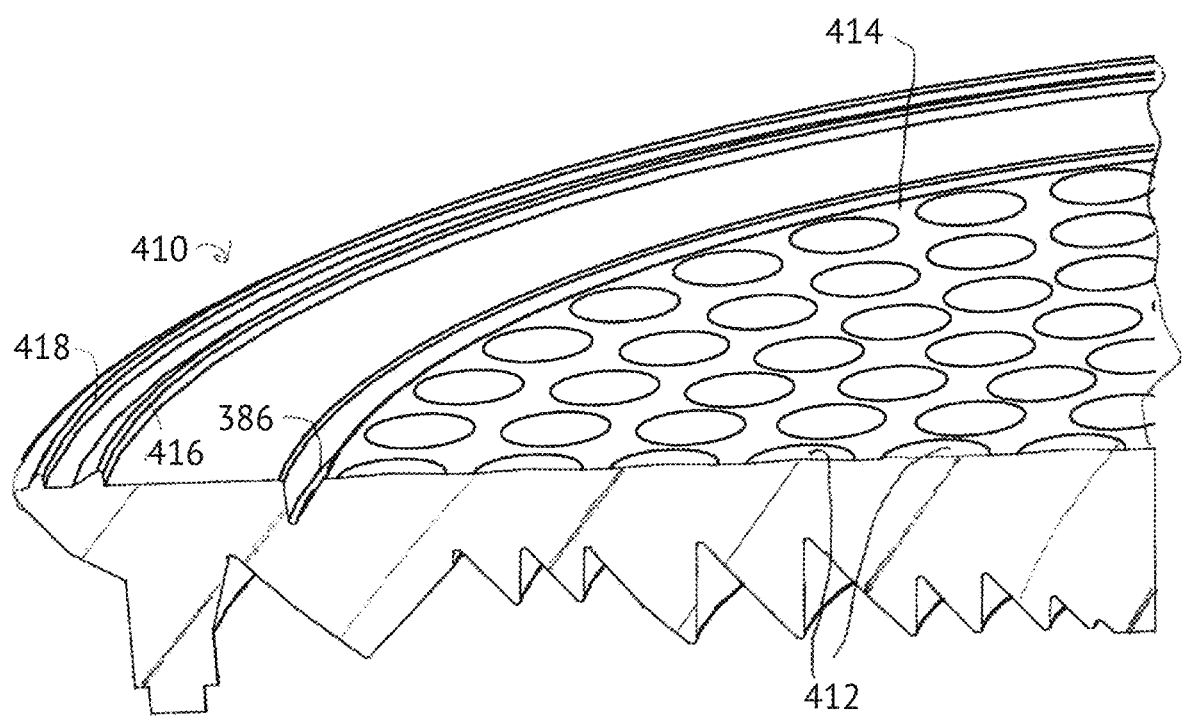

Referring next to FIGS. 40-42, a waveguide 410 is identical to the waveguide 370 with the following exceptions. Multiple lenslets 412 are arrayed across a surface 414. The lenslets 412 are identical in size and shape and are substantially equally spaced across the surface 414 inside the extraction feature 386, although this not need to be the case. Specifically, the lenslets could be unequally sized and/or spaced and/or shaped. In the illustrated embodiment, the lenslets 412 are circular in shape (although other shapes could be used, such as a polygonal shape) and convex (as seen in FIG. 41). Some or all of the lenslets 412 may be concave, if desired. In the preferred embodiment, each lenslet has a preferred range of aspect ratio of diameter to height of at least about 5:1 to about 60:1. In the illustrated embodiment, each lenslet is 0.1 mm in height and 4 mm in diameter and has a smooth exterior surface. In addition, two additional extraction features 416, 418 are provided radially outside the extraction feature 386. In the illustrated embodiment, the extraction features 416, 418 extend fully and continuously about the waveguide 410 and comprise upstanding annular ribs having smooth outer surfaces. The lenslets 412 and the extraction features 416, 418 contribute to desirable mixing of light and control over the emitted light while not contributing substantially to waveguide thickness.

Figure 43:
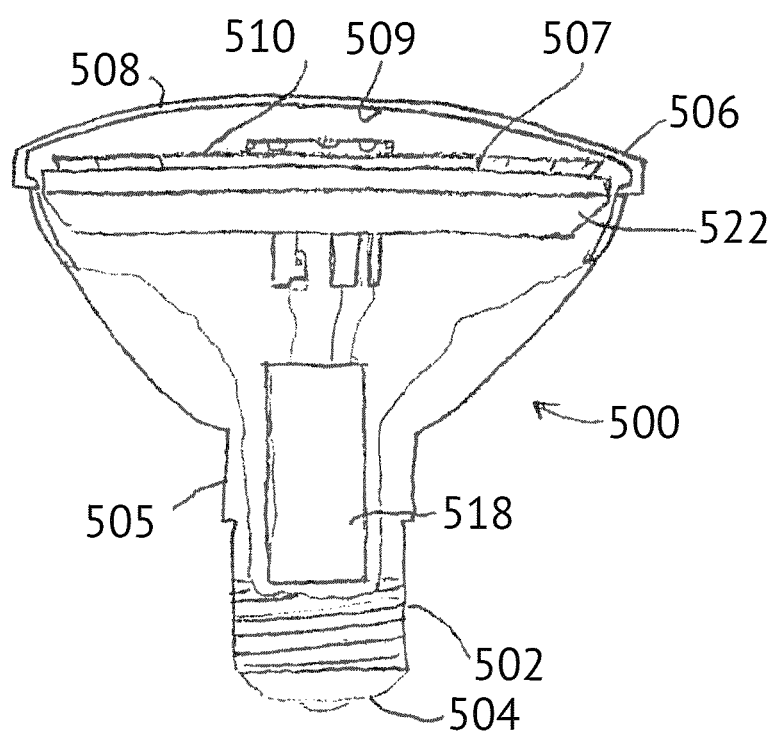
FIG. 43 is a side elevational view with portions broken away of a lamp incorporating a waveguide.
Figure 44A:
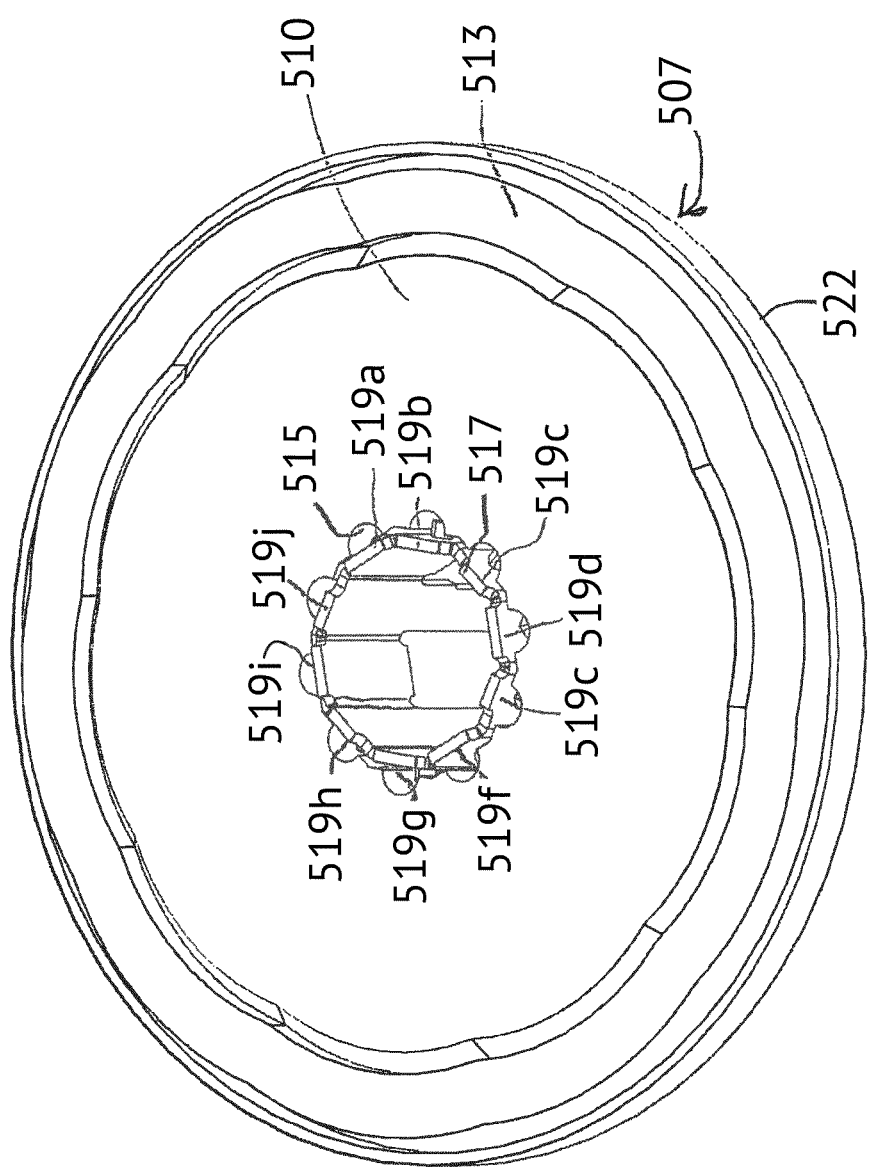
FIGS. 44A-44D are a top isometric view, a bottom isometric view, a side elevational view, and a plan view, respectively, of the light assembly of FIG. 43.
Figure 44B:
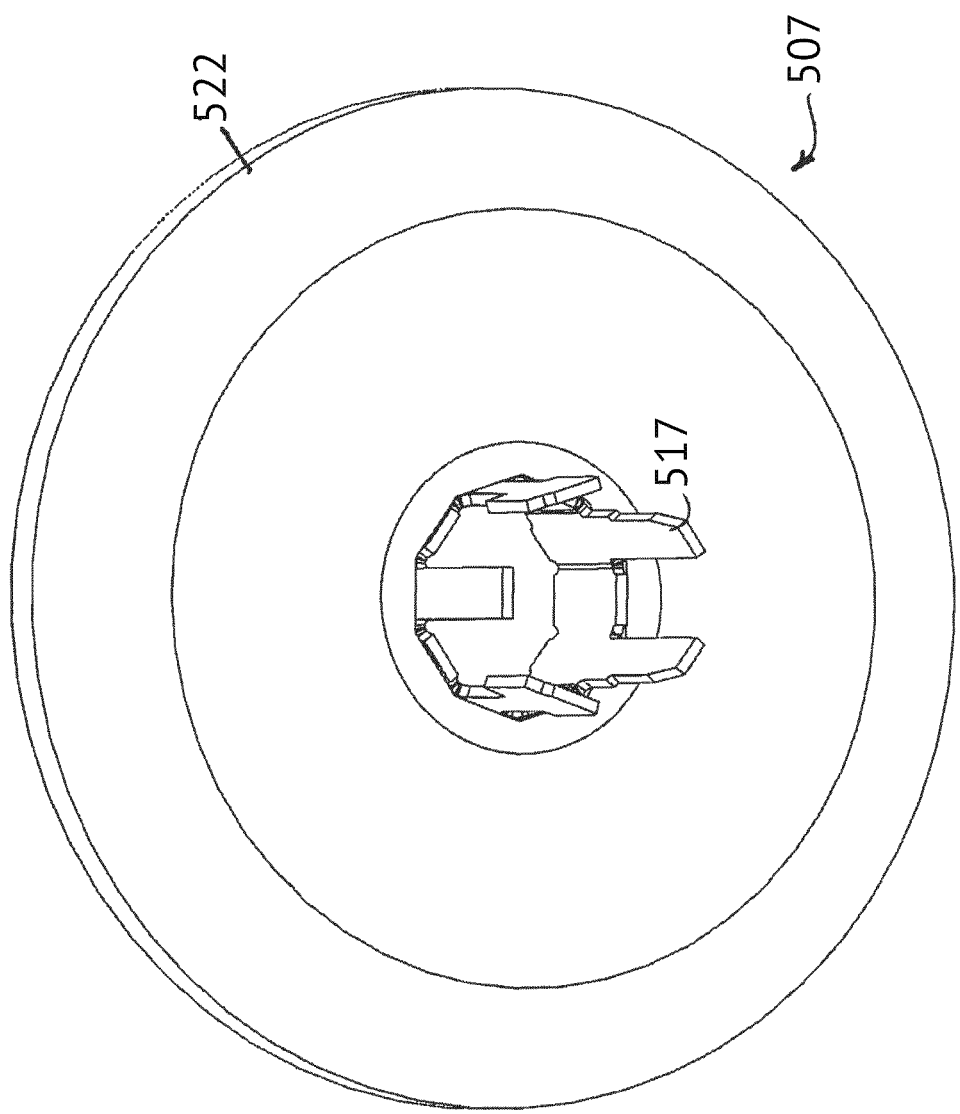
Figure 44C:
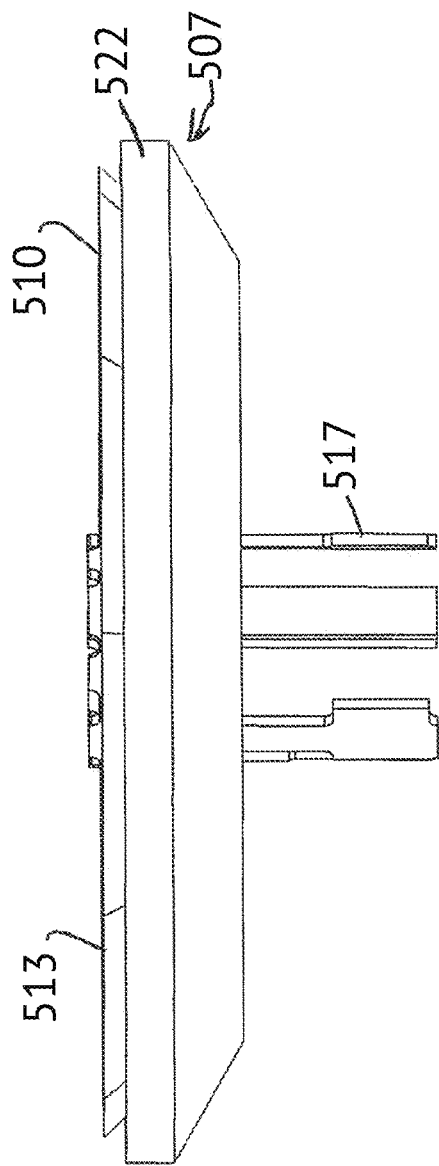
Figure 44D:
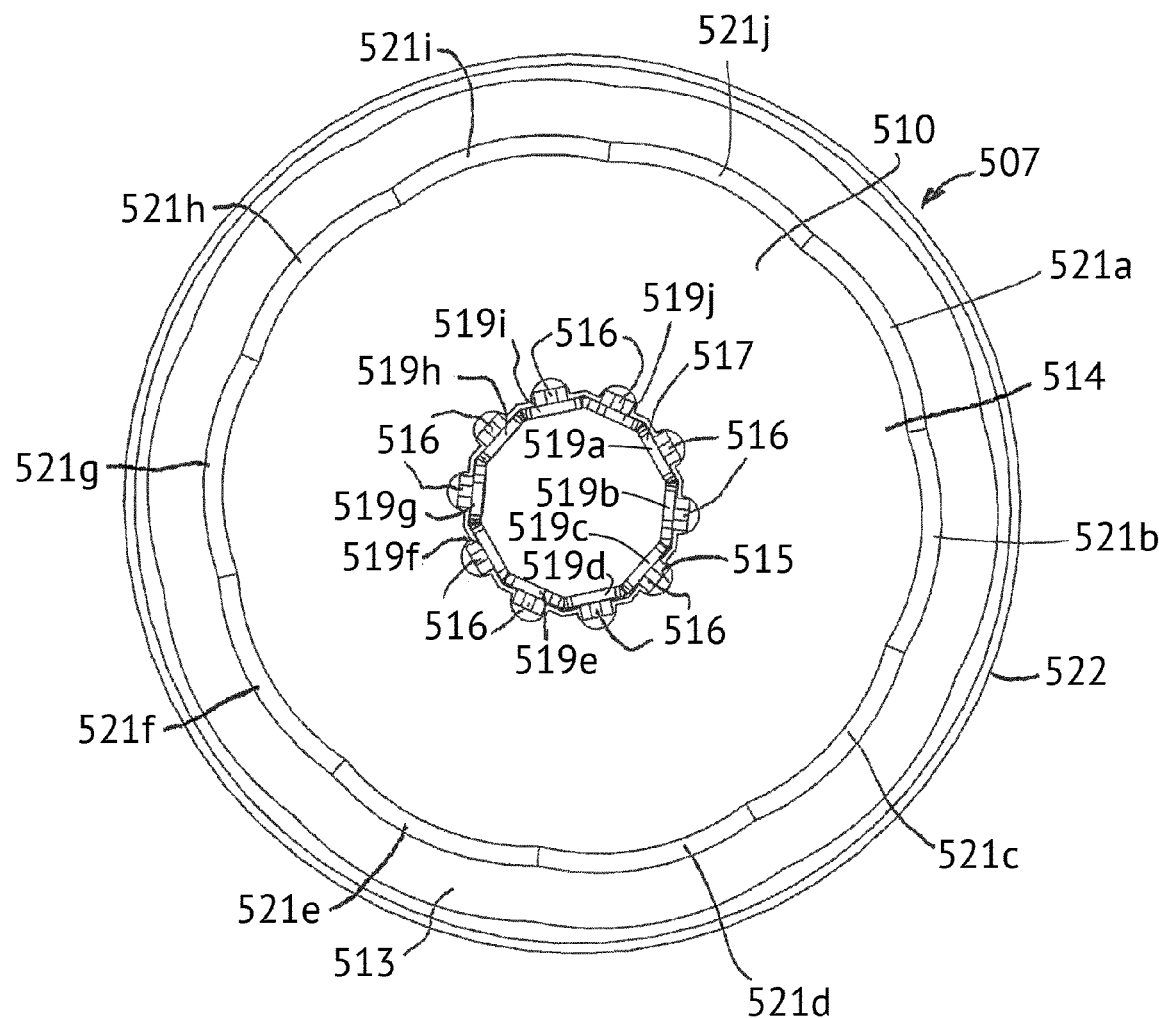
Figure 45B:
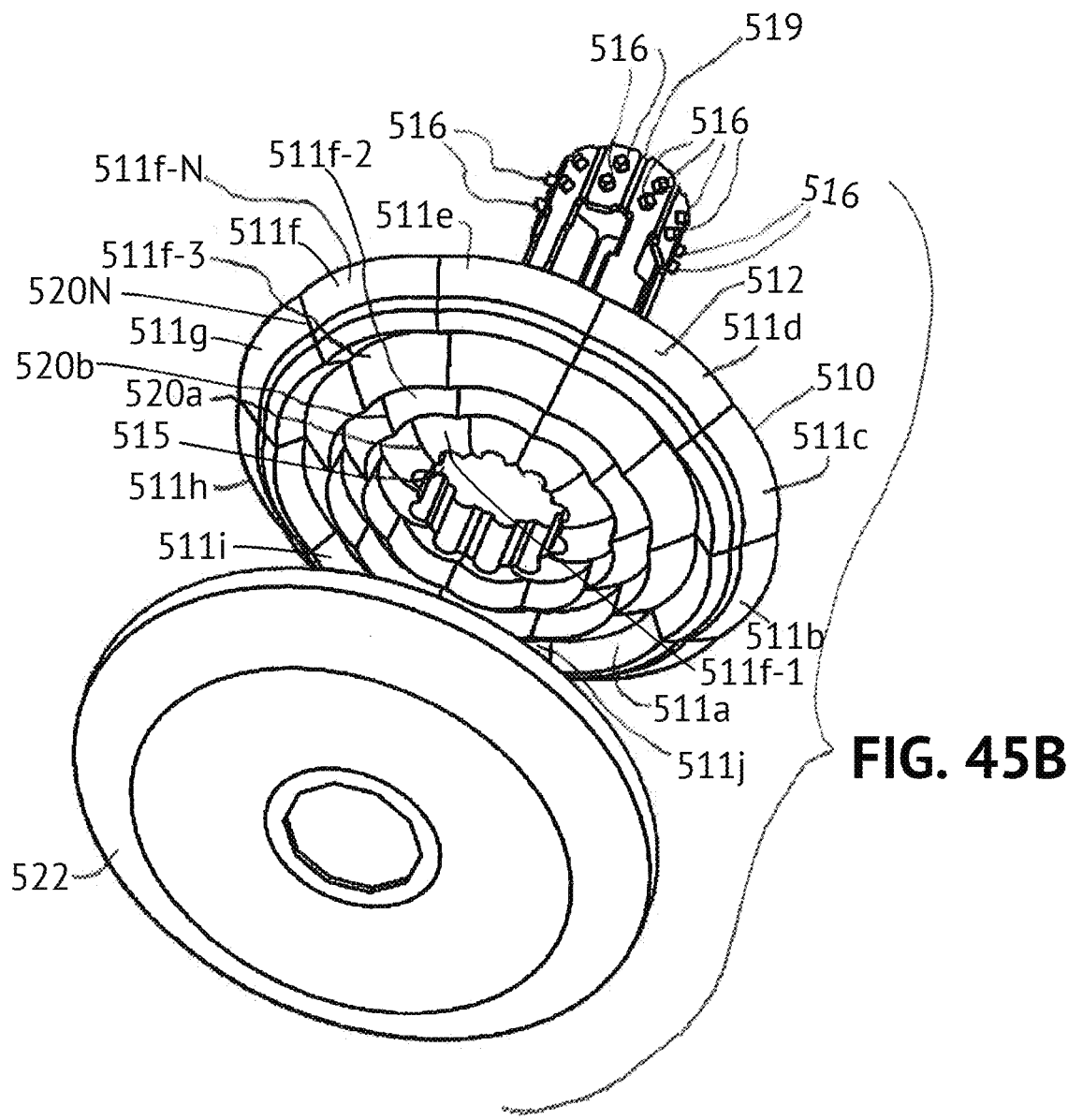
Figure 45C:
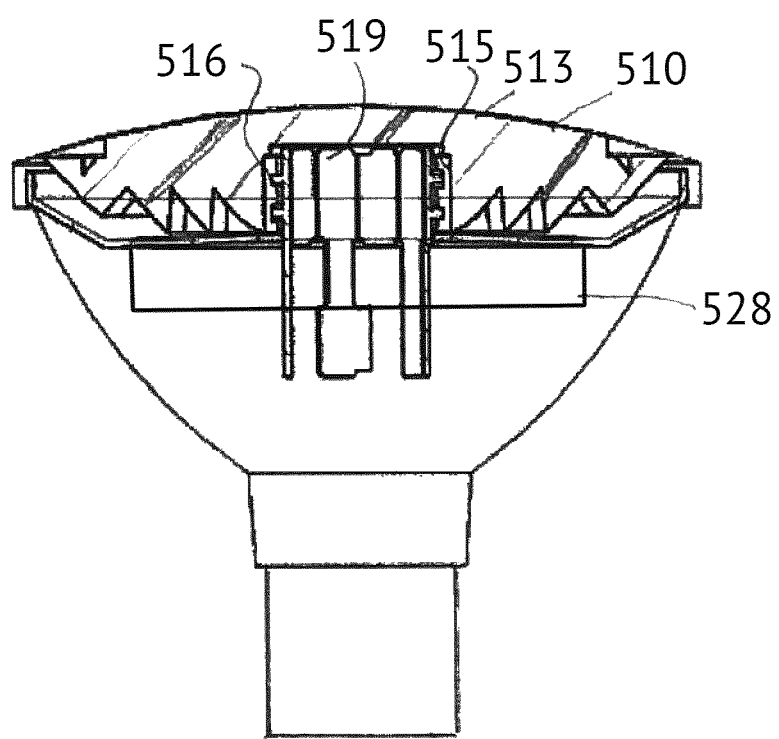
FIG. 45C is a view similar to FIG. 43 illustrating an alternative lamp incorporating a waveguide.

A further lamp 500 that is shaped externally similar to a standard incandescent PAR 30 spotlight is illustrated in FIGS. 43-45. As seen in FIG. 43, the lamp 500 includes a base 502 including an Edison-style plug 504, a central body 505, and a cap member 506 made of light transmissive material, such as optical grade acrylic, polycarbonate, or silicone. A light assembly 507 is mounted in any suitable fashion within the central body 505 and is covered by the cap member 506. The cap member 506 is secured to the central body 505 in any suitable manner, such as adhesive, ultrasonic welding, or the like. The cap member 506 includes a smooth, curved outer surface 508. The outer surface 508 and/or an inner surface 509 of the cap member 506 are preferably, although not necessarily, coated with a material that diffuses light. Referring also to FIGS. 44A-44D, 45A, and 45B, the light assembly 507 includes a waveguide body 510 having extraction features 511 formed in one or both of inner and outer surfaces 512, 513, respectively, to obtain a waveguide 514, as in the previous embodiments. The inner surface 510 further includes an interior coupling cavity 515. Multiple light sources, such as multiple LEDs 516, are arranged on a cylindrical carrier 517 and are inserted into the coupling cavity 515. The LEDs receive power via the Edison-style plug 504 and a driver circuit mounted on one or more circuit boards 518 disposed in the central body 505 such that the LEDs 516 develop light that is directed radially outwardly into the waveguide body 510. Because the light developed by the LEDs is directed outwardly in the first instance, there is no need for a light diverter. Further, as seen in FIG. 45C, the waveguide body 510 may have a curved outer surface 513, if desired, to further mimic a conventional incandescent spotlight. The curved outer surface may be coated with a light-diffusing material, although this need not be the case. As also seen in FIG. 45C, the carrier 519 and the LEDs 516 may be disposed in a blind bore comprising the coupling cavity 515 in the waveguide body 510, as opposed to the through bore comprising the coupling cavity 515 of FIGS. 43-45B.

Referring again to FIGS. 44A-44D, 45A, and 45B, the lamp 500 advantageously utilizes the waveguide 514 to obtain a beam spread of a desired magnitude, for example, 10 degrees to mimic a narrow-beam incandescent spotlight, if desired. Specifically, the cylindrical carrier 517 includes multiple (in the illustrated embodiment ten) facets 519a-519j (FIGS. 44A and 44D) wherein two or another number of LEDs are mounted in each of the facets 519. The extraction features 511 in the inner surface 512 of the waveguide body 510 arrayed in an overall flower-shaped pattern including multiple sections 511a-511j each associated with one of the facets 519a-519j, respectively. Each section 511a-511j is disposed outside of the associated facet 519a-519j and includes nested curved extraction subsections (see, for example, subsections 551f-1, 511fa-2, . . . 511f-N in FIG. 45B). The extraction subsections meet adjacent extraction subsections at inflection regions (see, e.g., inflection regions 520a, 520b, . . . , 520N in FIG. 45B). Also in the illustrated embodiment, a light extraction feature 521 comprising groove sections 521a-521j (FIG. 44D) are disposed in the outer surface 513. In the illustrated embodiment, each extraction subsection of each section 511 is coaxial with the LEDs carried by the associated facet 519. Light is extracted efficiently out of the waveguide body 510 by the curved subsections and the groove sections.

The waveguide body 510 and the carrier 517 with LEDs 516 are disposed within a reflecting backplane member 522 having a tapered surface 524 and a planar base surface 526. One or both of the interior surfaces are coated/covered with a reflective material, such as a specular reflective material or film or a white material or film. Light that escapes the inner surface 511 of the waveguide body 510 is thus reflected back into the waveguide body so that light is efficiently extracted out the outer surface 513. By suitably designing the extraction features that results in a tapered waveguide body 510 similar to the previous embodiments, one can obtain color mixing and light emission control as in the previous embodiments without utilizing a light diverter, such as the plug member 78.

It should be noted that any of the embodiments disclosed herein may utilize a reflective backplane member like the member 522, if desired. Also, the backplane 522 may have other than a planar base surface 526, such as a curved surface.

As seen in FIG. 45C, a heat exchanger 528 (diagrammatically shown) may be provided in thermal contact with the LEDs and may be disposed immediately below the backplane 522. The heat exchanger 528 can be arranged to eliminate thermal crosstalk between the LEDs and the driver circuit.

If desired, the waveguide body 510 can be modified to obtain a different beam spread, such as greater than 10 degrees. For example, the lamp may achieve a beam spread of 15 degrees, 25 degrees, or even up to 60 degrees, or any value in between.

Figure 46:
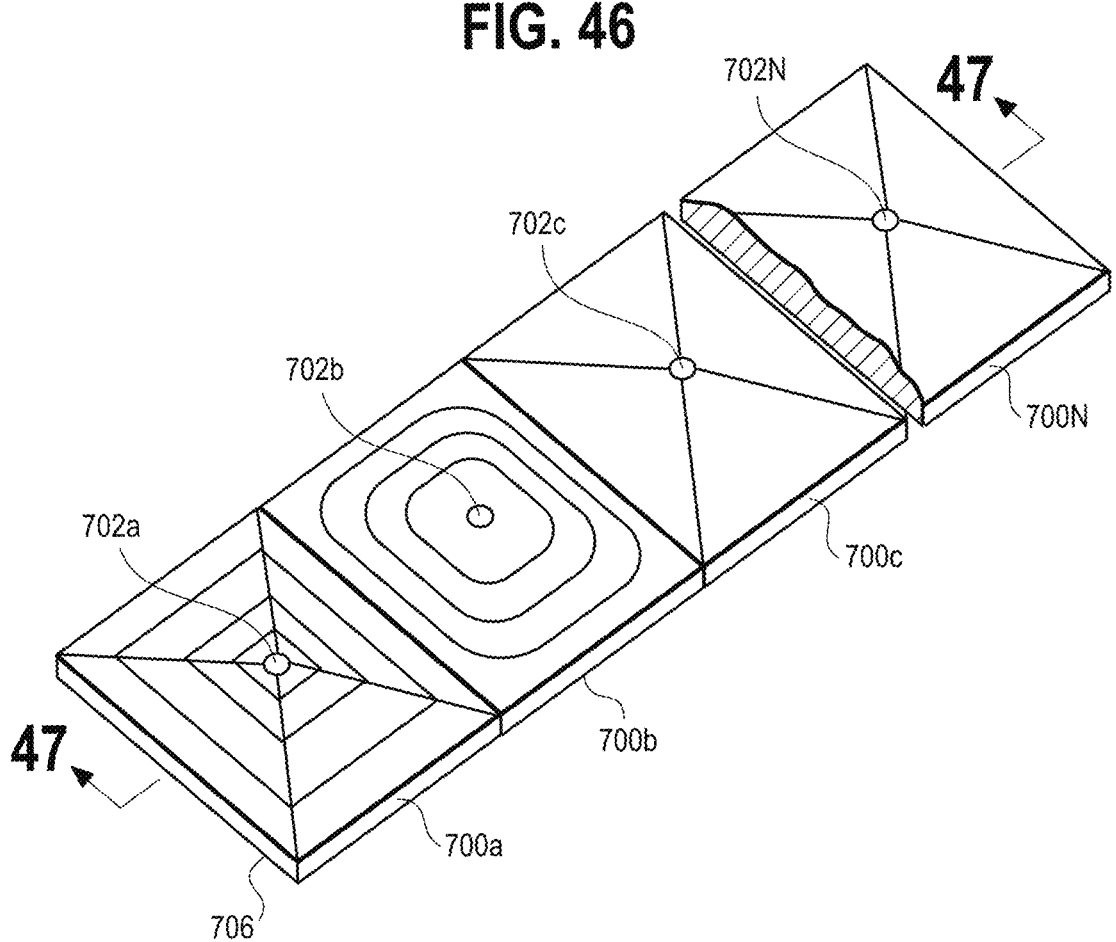
FIG. 46 is a diagrammatic isometric view of an optical waveguide arrangement.
Figure 47A:
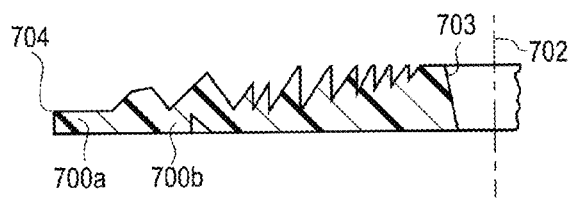
FIG. 47A is an enlarged, sectional view illustrating the extraction features of one the waveguides of FIG. 47.
Figure 47:
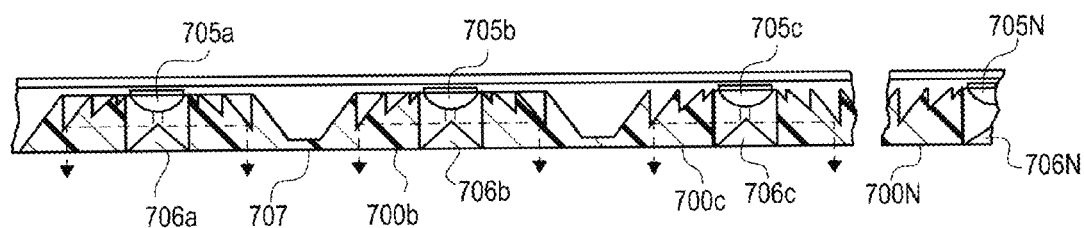
FIG. 47 is a diagrammatic sectional view taken generally along the lines 47-47 of FIG. 46.

Referring next to FIGS. 46 and 47, multiple waveguide bodies 700a, 700b, 700c, . . . , 700N are disposed in a linear array arrangement. The waveguide bodies 700a-700N may be identical to one another and may be integral with or joined to one another. Each of the waveguide bodies 700 may be similar or identical to any of the waveguide bodies described herein. Specifically, the waveguide bodies 700 may be square, rectangular, or another overall shape (such as circular, oval, racetrack shaped, etc.) and, as seen in FIG. 47A, each includes extraction features 701 that preferably extend fully about and are symmetric with respect to a center line 702, although the extraction features may be discontinuous and/or may be asymmetric. The profiles (i.e., the cross sectional shapes and sizes) and arrangement of the extraction features 701 may be similar or identical to the extraction features of FIG. 11A or 34 (the extraction features of FIG. 34 are shown in FIG. 47A). As seen in FIG. 46 the extraction features of each waveguide body may meet at square corners (like the extraction features of the waveguide body 700a) or may meet at rounded corners (as in the extraction features of the waveguide body 700b). As described previously, the extraction features 701 may result in each of the waveguide bodies 700 generally tapering from a central bore 703 to an outside edge surface 704 and the extraction features are diagrammatically shown in FIGS. 46, 47, and 48-55 for the sake of simplicity. Light developed by LEDs 705a-705N is diverted by plug members 706a-706N and into the waveguide bodies 700a-700N, respectively, and such light is directed out a face 707.

As in the previous embodiments, substantially all of the light developed by each of the LEDs 702 is preferably extracted in a single pass through the each of the associated waveguide bodies 700.

Figure 48:
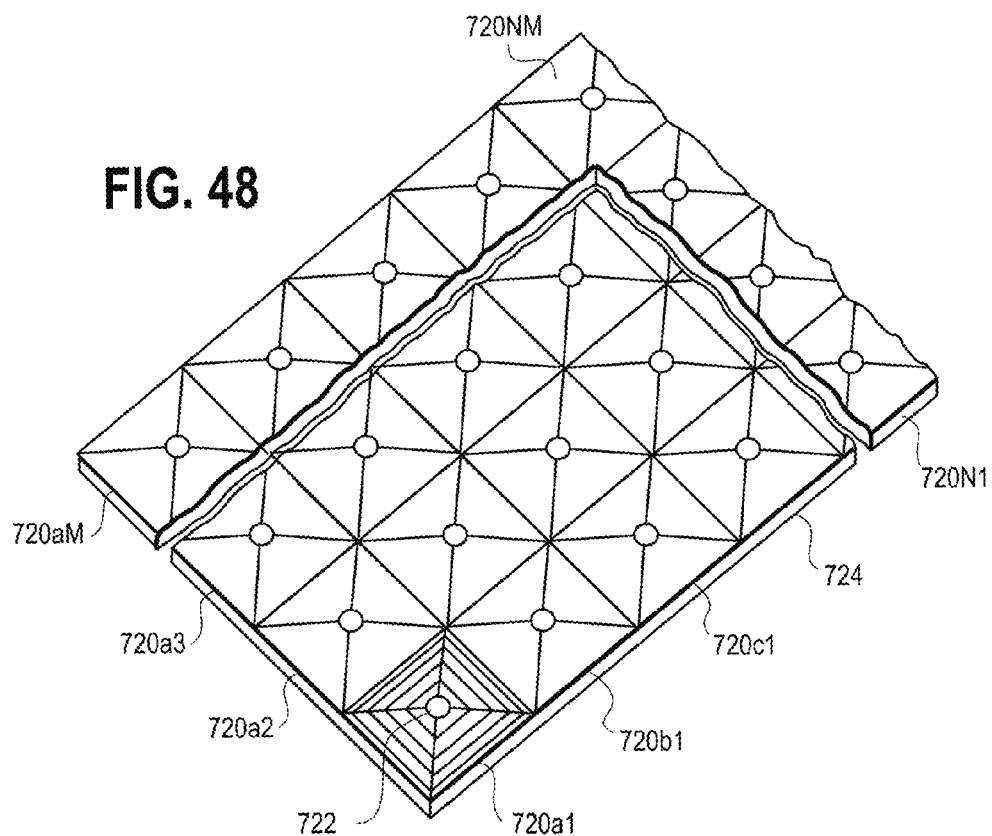
FIG. 48 is a diagrammatic isometric view of a further waveguide arrangement.
Figure 61:
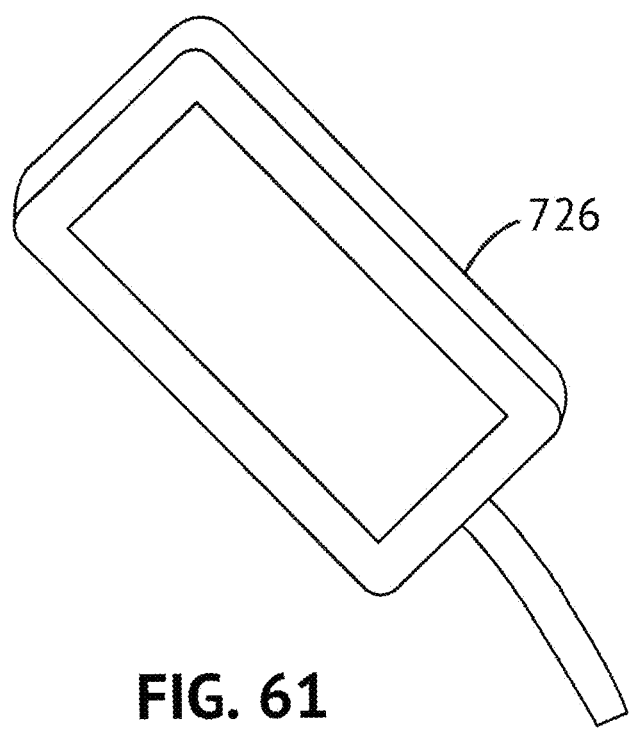
FIGS. 61 and 62 are isometric views of a streetlight and a high bay luminaire, respectively, in which any of the embodiments disclosed herein may be used.
Figure 62:
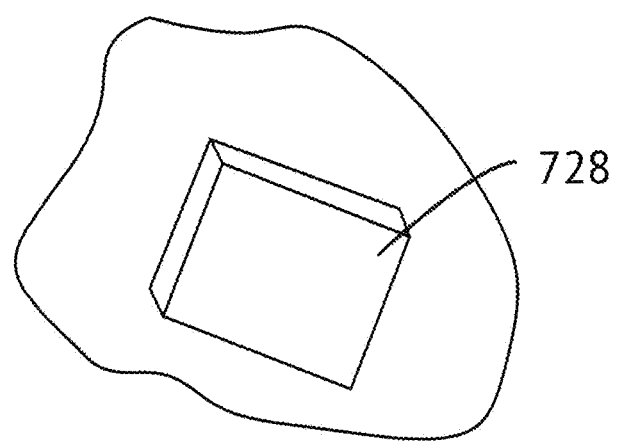

FIG. 48 illustrates an embodiment identical to FIGS. 46 and 47, with the exception that waveguide bodies 720a1-720NM are disposed in a two-dimensional N×M array arrangement. As in the linear embodiment of FIGS. 46 and 47, each of the waveguide bodies 720 tapers from a central bore to outer edges thereof wherein such tapering is afforded by one or more extraction features (such as any of the extraction feature arrangements disclosed herein). The extraction features are shown in connection with the waveguide body 720a-1 only in FIG. 48, it being understood that the remaining waveguide bodies 720 have like extraction features as well. Light developed by LEDs, for example the LED 722, is deflected into the associated waveguide body 720a1 by a reflective conical plug member (not shown, but which may be identical to any of the plug members disclosed herein) and is extracted out a surface 724. The embodiments of FIGS. 46-48 are suitable for use in applications where high illumination levels are to be produced, such as a streetlight 726 (FIG. 61), a high bay luminaire 728 (for example, in a gasoline retail or distribution facility, such as seen in FIG. 62), interior commercial lighting, retail lighting, or the like. Preferably, the embodiments of FIGS. 46-48 (as well as other embodiments disclosed herein) are adapted for use in illumination applications where illumination levels of greater than about 1000 lumens are to be produced, and more preferably where illumination levels between about 1000 and about 50,000 lumens are to be produced. More particularly, the embodiments disclosed herein in FIG. 46 et seq. may be employed in the following applications:

1) In a high bay or similar application where the luminaire is greater than about twenty feet above the surface to be illuminated and where 20,000-50,000 lumens are to be developed;
2) In a low bay or similar application where the luminaire is less than about 20 feet above the surface to be illuminated and where 5000-20,000 lumens are to be developed;
3) Area or recessed down lights, for example, intended to be about 8-14 feet above the surface to be illuminated and emitting between about 2000 and 8000 lumens; and
4) Other applications, such as narrow beam or directional lights developing about 1000-3000 lumens, such as spotlights or lamps.

Figure 49:
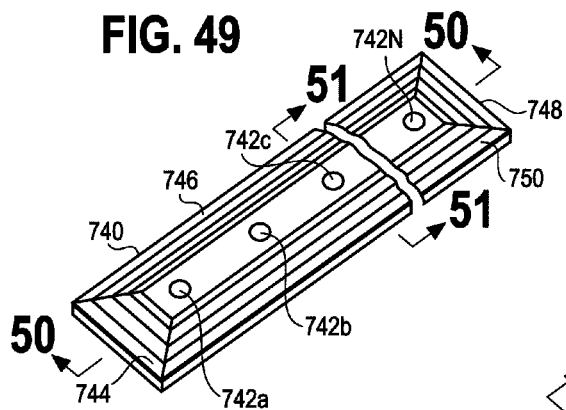
FIG. 49 is a diagrammatic isometric view of another embodiment of an optical waveguide.
Figure 50:
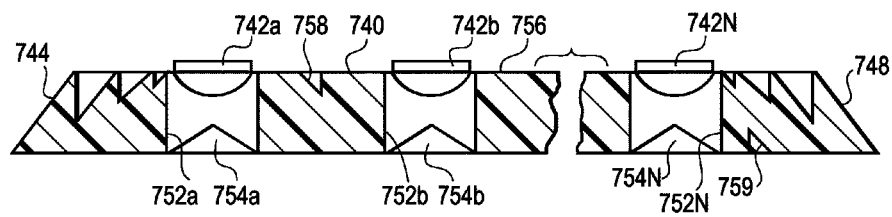
FIGS. 50 and 51 are sectional views taken generally along the lines 50-50 and 51-51, respectively, of FIG. 49.
Figure 51:
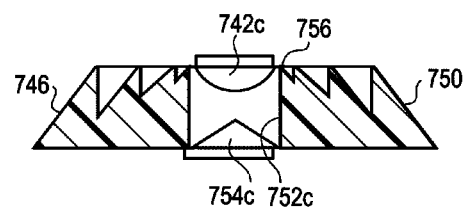

FIGS. 49-51 illustrate an embodiment of a waveguide 740 that is used in combination with a linear array of LEDs 742a, 742b, 742c, . . . , 742N. The waveguide 740 may include one or more of any of the extraction features disclosed herein similar or identical to the waveguides described previously, wherein the extraction features form tapered outer walls 744, 746, 748, 750. The LEDs 742 are disposed in bores 752a, 752b, . . . , 752N, respectively, as are conical plug members 754a, 754b, . . . 754N. The bores 752 are disposed in a central planar section 756 of the waveguide 740. If necessary or desirable, one or more extraction features may also be located in central section 756 for example, as illustrated by the extraction feature 758 of FIG. 50. Still further, one or more extraction features 759 may be disposed in a lower surface, if desired. Still further, the waveguide 740 may be combined with other identical waveguides 740 in a single light fixture to obtain high illumination levels.

Figure 53:
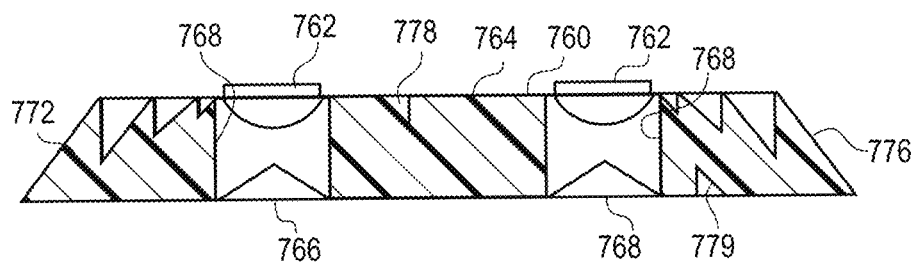
FIG. 53 is a sectional view taken generally along the lines 53-53 of FIG. 52.
Figure 52:
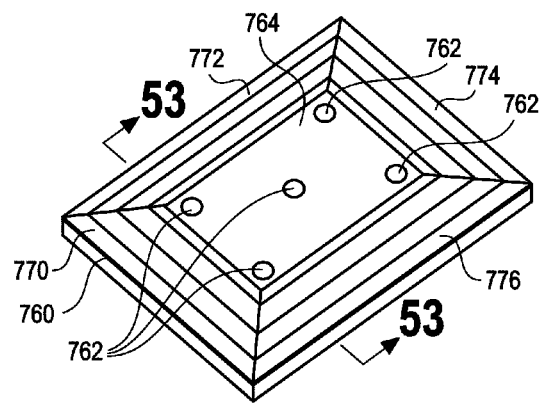
FIG. 52 is a diagrammatic isometric view of yet another embodiment of an optical waveguide.

FIGS. 52 and 53 illustrate an embodiment of a waveguide 760 identical to the embodiment of FIGS. 49-51, with the exception that LEDs 762 are disposed in a two-dimensional array in a central section 764, as opposed to the linear array of FIGS. 49-51. Conical plug members 766 are disposed in bores 768 opposite the LEDs 762. The waveguide 760 includes outer sections 770, 772, 774, and 776 having one or more extraction features therein that result in such sections being tapered. As in the previous embodiments, one or more extraction features 778 (FIG. 53) may also be disposed in the central section 764. As in the previous embodiment, one or more extraction features 779 may be disposed in a lower surface, if desired. As in the previous embodiment, the waveguide 760 may be combined with other similar or identical waveguides 740 and/or 760 in a single light fixture to obtain high illumination levels.

The embodiments of FIGS. 49-53 may not extract light as efficiently as the other waveguides disclosed herein; however, the waveguides may be simpler to produce, and thus useful in a low-cost application where high output illumination levels are to be achieved.

In the embodiments of FIGS. 49-53, and more generally in any of the embodiments disclosed herein that utilize multiple waveguides, depending on the application, one could provide an air gap between waveguides, or a reflective material (specular, diffuse, metal, or dielectric) that fills the gaps between and/or is coated on the end of each or some of the waveguides. Still further, one could provide an optical coupling material between waveguides and/or at one or more ends of a waveguide array that matches the index of refraction of the waveguide material or that creates an index of refraction differential with adjacent waveguide(s) or the surrounding environment. Still further, an opaque material may be coated on or disposed between two or more waveguides of an array or may be provided at one or more ends of an array. These materials can fill the gap between waveguides and/or be coated on one or more waveguides. Such materials(s) can also or alternatively be provided about some or all of a waveguide array perimeter.

Figure 54:
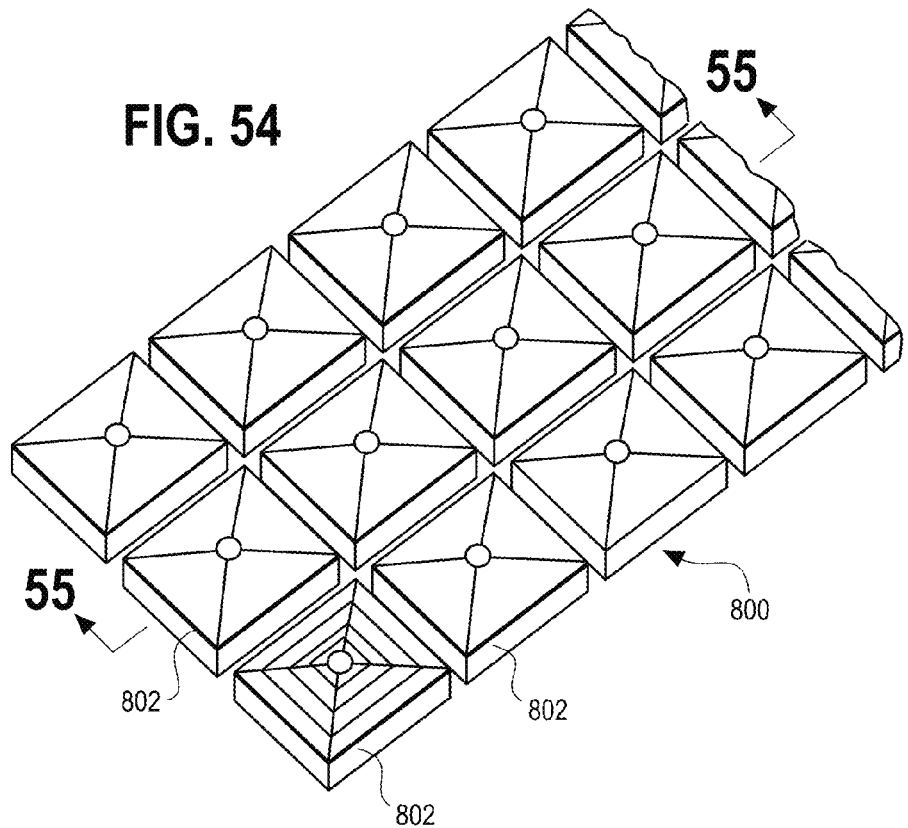
FIG. 54 is an diagrammatic isometric view of a still further waveguide arrangement.
Figure 55:
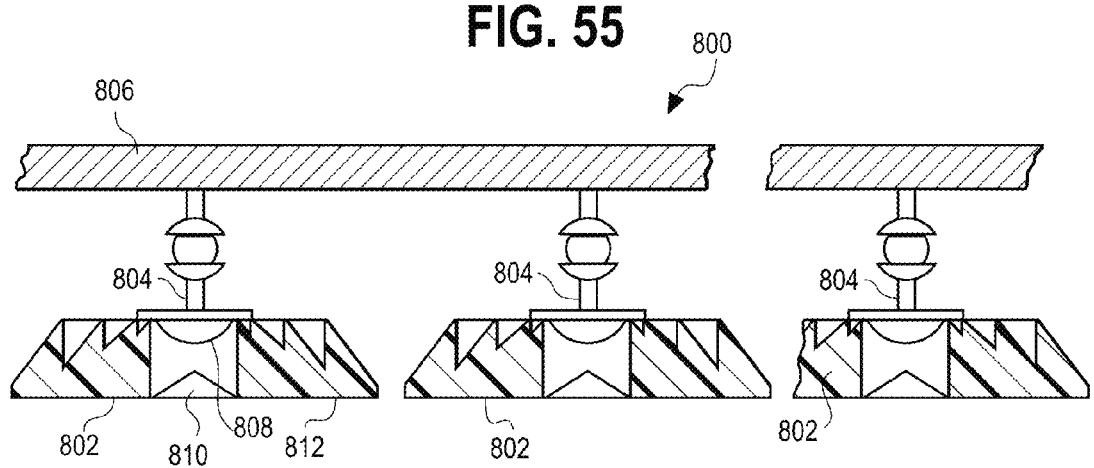
FIG. 55 is a sectional view taken generally along the lines 55-55 of FIG. 54.

FIGS. 54 and 55 illustrate a two-dimensional waveguide array arrangement 800 wherein a number of separate waveguides 802 are disposed closely adjacent one another. Each of the waveguides 802 may be similar or identical to any of the embodiments disclosed herein. Also, each of the waveguides 802 is mounted by a gimbal or other suitable mounting structure to a supporting structure 806 so that the waveguides may be adjustably positioned in two dimensions. Still further, each of the waveguides 802 includes extraction features in outer sections thereof to form tapered regions so that light developed by an associated LED 808 is deflected by a conical plug member 810 into the waveguide 802 and is emitted out a lower surface 812 preferably during a single pass of such light through the waveguide 802. Each of the waveguides 802 may be moved independently of the remaining waveguides so that illumination can be directed onto a target surface in a desired fashion. This embodiment may be used for general illumination, for example, in a downlight or a troffer.

Figure 56:
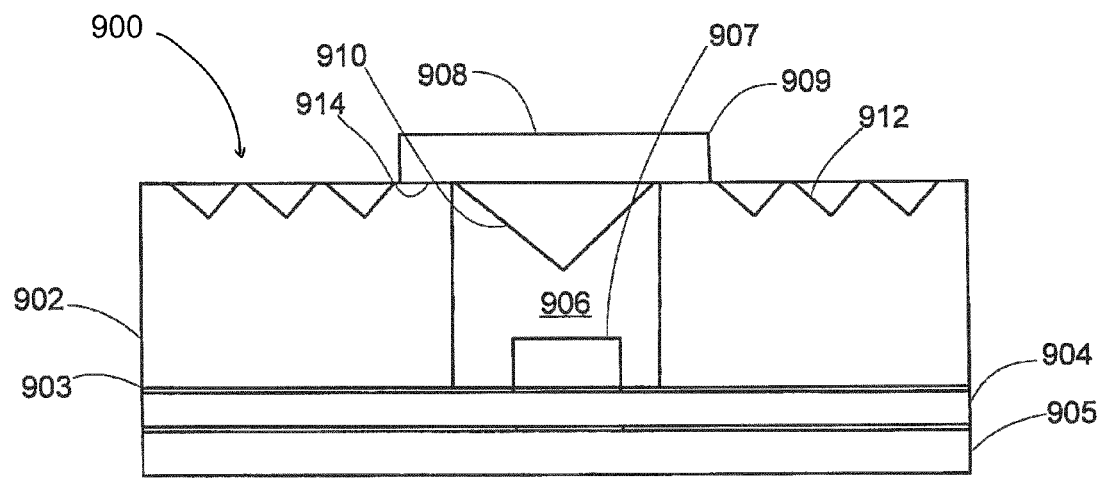

FIG. 56 comprises a still further embodiment of a waveguide 900 comprising a waveguide body 902 having a lower surface 903 disposed atop a reflective layer 904 comprising a sheet of 0.425 mm thick White97 paper available from WhiteOptics LLC of Newark, Del. and a circuit board substrate 905. The waveguide body 902 includes an interior coupling cavity or recess 906 in the form of a 3.2 mm diameter through hole and one or more LEDs 907 are connected to and receive power from components carried by the circuit board substrate 905 and are disposed in one end of the internal recess 906. A plug member 908 includes an overhanging circumferential flange 909 that is secured atop a second end of the recess 906 such that a conical portion 910 extends into the recess 906. Alternatively, as seen in FIG. 57, the circumferential flange 909 may be omitted and the plug member 908 may be press-fitted, friction fitted, and/or secured by an adhesive or made integral with the waveguide body 902.

Still further, as in any of the embodiments disclosed herein, the LEDs 907 and plug member 908 may be omitted and the LEDs 514 arranged on the cylindrical carrier 516 of FIGS. 43-45 may extend into the interior recess 906, in which case the interior recess may be a blind bore.

Figure 57:
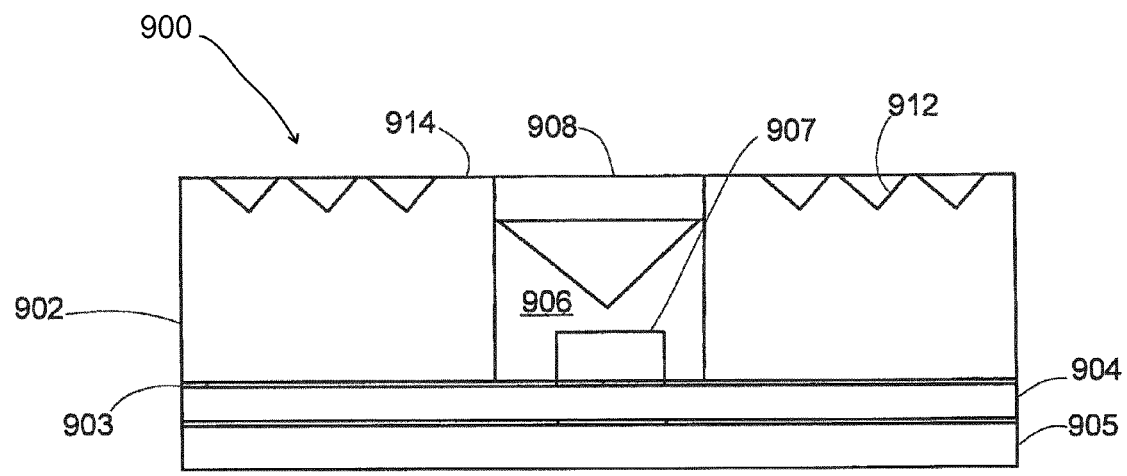
FIGS. 56 and 57 are cross sectional view of further waveguide embodiments.

In each of the embodiments shown in FIGS. 56 and 57, extraction features 912 are disposed in a surface 914 of the waveguide body 902. The extraction features 912 are similar or identical to any of the extraction features disclosed herein. If desired, one or more extraction features may alternatively or in addition be disposed in the surface 903. The extraction features are designed to cause light to be emitted out of the surface 914, as opposed to the surface 903. If desired, any or all of the extraction features 912 may be polished or unpolished, as may the surfaces, 903, 914, the wall(s) defining the recess 906, and/or any other surface(s) of the waveguide body 902. In addition, optical performance may be improved by making the edges of the wall defining the recess 906 at the lower and upper surfaces 903, 914 of the waveguide body 902 sharp, as opposed to rounded. Preferably the radii of curvature at the edges of the wall defining the recess 906 at the upper and lower surfaces 903, 914 are between 25 microns and 500 microns. Still further, optical performance may be improved by ensuring full contact of the waveguide body 402 with the reflective layer 904, controlling the opacity of the plug member 908 so that a bright or dark spot is avoided at the location thereof, polishing the wall(s) defining the recess, using the plug member 908 of FIG. 57 as opposed to the plug member of FIG. 56, and leaving the extraction features 912 unpolished. The features that are used to hold the various elements in place can have an effect on the development of bright and dark spots.

The waveguide body 902 may be made of any suitable material, such as an optical grade acrylic or polycarbonate, a silicone, glass, or any other suitable optically transmissive material. As in any of the previous embodiments, the plug member 908 may be made of any suitable material (white polycarbonate, polytetrafluoroethylene (PTFE), acrylic, molded silicone, Delrin® acetyl resin, etc.)

Figure 58:
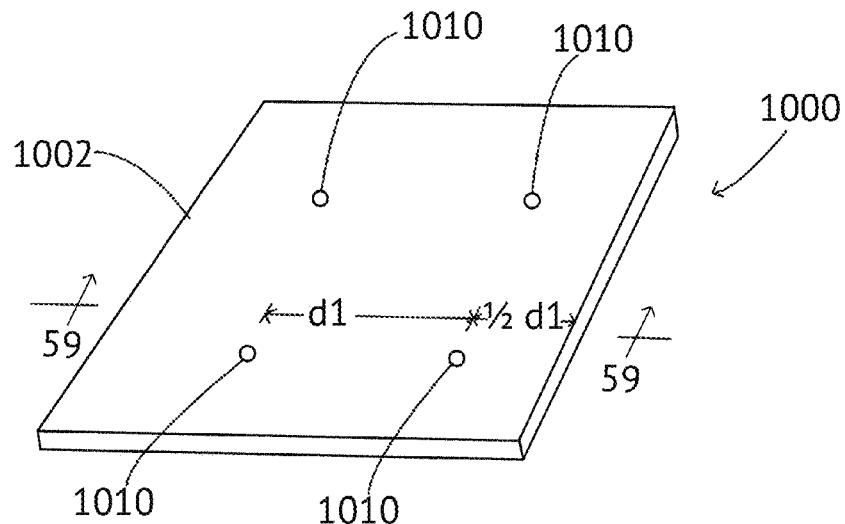
FIG. 58 is an isometric view of a tile lighting structure.
Figure 59:
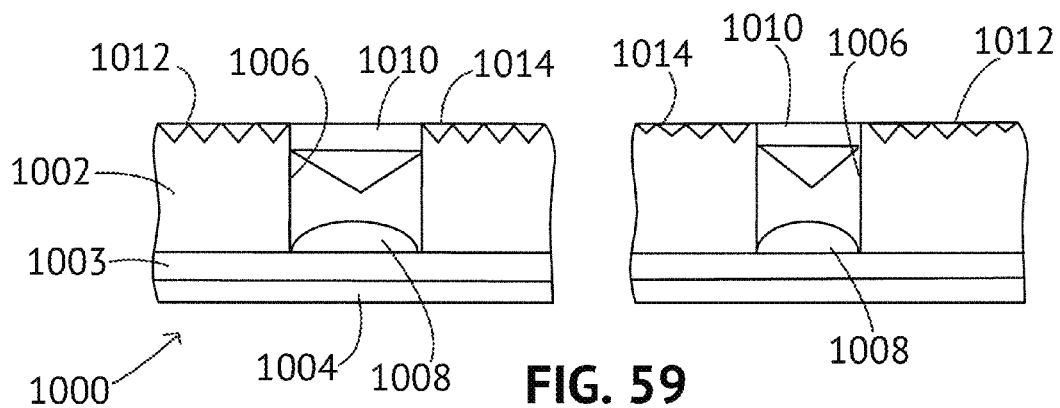
FIG. 59 is a cross sectional view taken generally along the lines 59-59 of FIG. 58.
Figure 60:
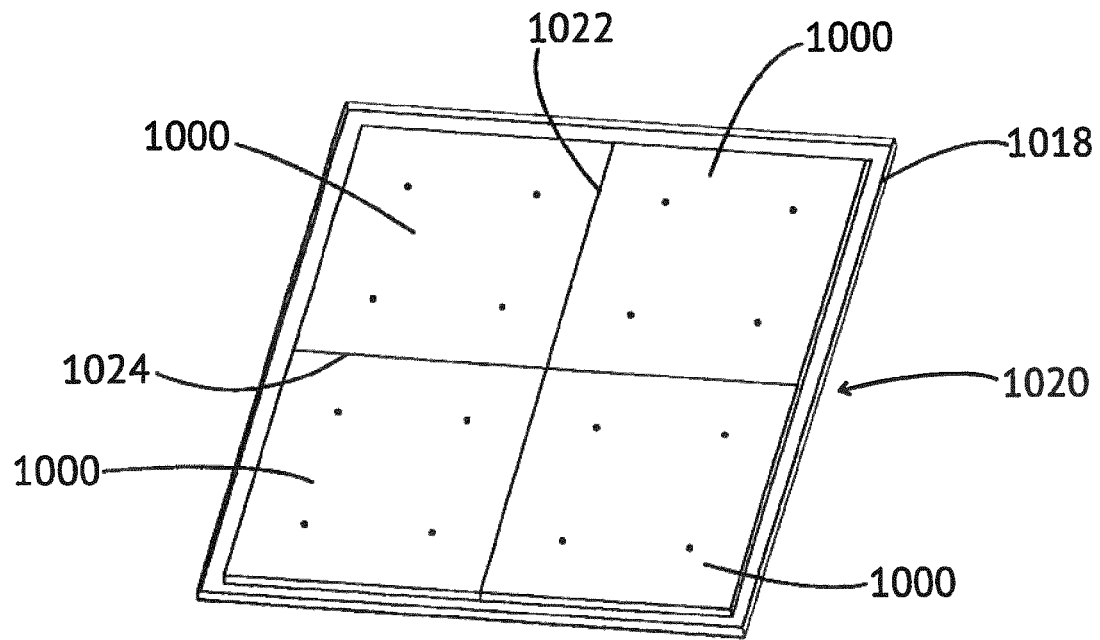
FIG. 60 is an isometric view of a luminaire incorporating multiple tile structures of FIGS. 58 and 59.

FIGS. 58 and 59 illustrate a modular tile structure 1000 that may utilize the same materials and extraction features of FIGS. 56 and 57. Thus, a waveguide body 1002 approximately 280×280 mm in size is disposed on a similarly sized sheet of reflective material 1003, such as White97 paper, which is, in turn, disposed on a circuit board substrate 1004. The waveguide body 1002 includes four spaced interior recesses 1006, although the waveguide body 1002 may include a different number of interior recesses 1006. Preferably, as seen in FIG. 58, the interior recesses 1006 are spaced about a distance dl relative to one another, and each recess 1006 is spaced preferably about one-half the distance dl from an adjacent side edge of the waveguide body 1002. One or more LEDs 1008 (FIG. 59) may extend into each of the four interior recesses 1006, as may reflective plug members 1010 as in the previous embodiments. Extraction features 1012 are disposed in a top surface 1014. The design considerations noted with the embodiment of FIGS. 56 and 57 may apply equally to the embodiment of FIGS. 58 and 59. The tile structure 1000 is capable of developing a uniform or nearly uniform light distribution (e.g., a lambertian or any other distribution) and can be used alone assembled in a support structure. Alternatively, multiple tile structures 100 may be assembled together in a frame 1018 in a modular fashion to form a luminaire, such as the 2 foot by 2 foot luminaire 1020 of FIG. 60 that includes four tile structures 1000. Cross members 1022 and 1024 and/or other members of the frame 1018 may be transparent, translucent, or opaque, as necessary or desirable.

If desired, any of a number of diffusers may cover the tile structures 1000, such as a 3030, 5050, or 8080 PMMA diffuser sold by FusionOptix of Woburn, Mass.

Figure 64:
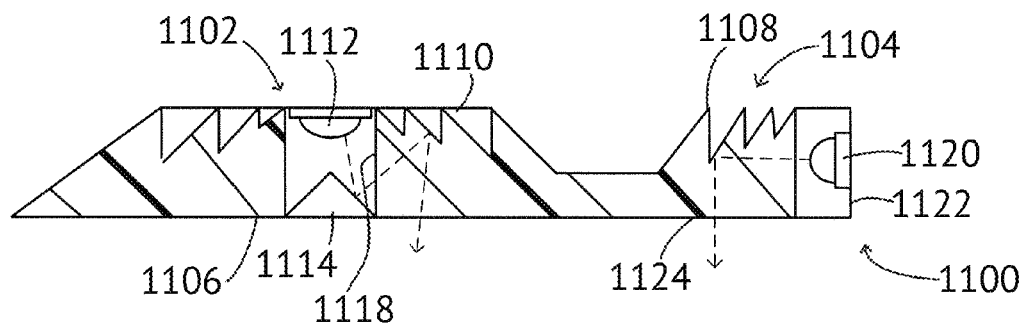
FIG. 64 is a cross sectional view taken generally along the lines 64-64 of FIG. 63.
Figure 63:
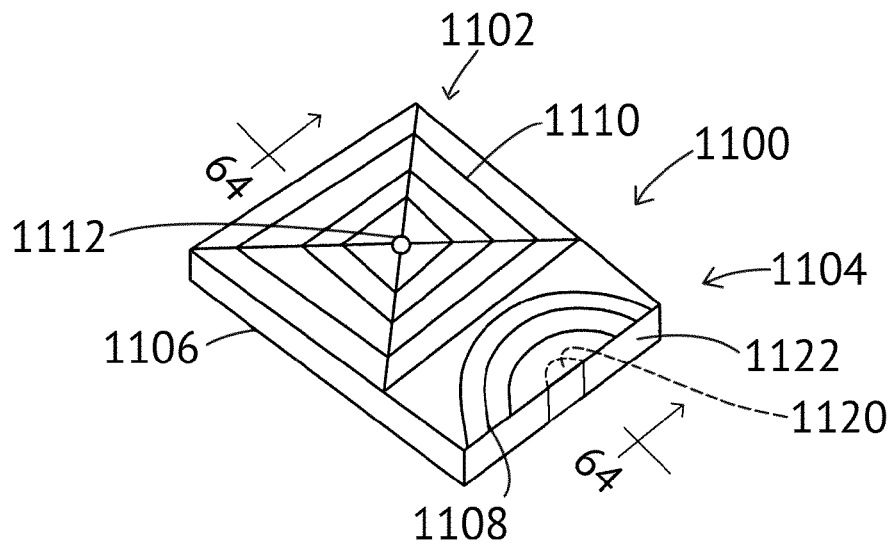
FIG. 63 is an isometric view of a lighting structure using interior-lit and side-lit waveguides.

FIGS. 63 and 64 illustrate a lighting structure 1100 that utilizes a combined interior-lit waveguide 1102 and an edge-lit waveguide 1104. The interior lit waveguide 1102 may incorporate a waveguide body 1106 similar or identical to any of the waveguide bodies disclosed herein. The interior lit waveguide 1102 may incorporate any of the edge-lit waveguide bodies disclosed in copending U.S. patent application Ser. No. 13/842,521, entitled "optical Wave guides, owned by the assignee of the present application and filed contemporaneously with the present application, the disclosure of which is expressly incorporated by reference herein. In the embodiment illustrated in FIGS. 63 and 64, extraction features 1108 of the edge-lit waveguide 1104 are similar to extraction features 1110 of the interior-lit waveguide 1102. The interior lit waveguide includes one or more LEDs 1112 and a reflective plug member 1114 disposed in an interior coupling cavity 1118, as in previous embodiments. One or more further LEDs 1120 may be disposed in proximity with an edge or side wall 1122. The LED's develop light that is directed out a surface 1124 by the extraction features 1108 and 1110.

As should be evident, any number of interior-lit lit waveguides can be combined with one or more edge-lit waveguides, as desired.

A still further embodiment comprehends the use of a number of any of the lamps or light fixtures disclosed herein in any combination in a single combined lighting fixture. For example, the asymmetric extraction features of FIGS. 11D-11F may be used in a lamp or tile of any of the embodiments disclosed herein and may be combined with other lamps and/or tiles in a single lighting fixture. Such a combined lighting fixture may have the outward appearance of the luminaire 1020 of FIG. 60 or any other outward appearance. As noted previously, the variable extraction features provide an asymmetric desired light pattern. By using a plurality of these repeating or different asymmetric light extraction patterns together in a large single tile or multiple discrete waveguide tiles or other structures (each of which could also have multiple optical internal coupling cavities), a larger desired symmetric or asymmetric light pattern can be achieved over a larger illumination surface simply by the combination of the illumination from the patterns around the multiple coupling cavities. This increased illumination may result from the combination or "additive" effect of multiple tiles or structure with the same desired symmetric or asymmetric pattern, a repeating desired symmetric or asymmetric pattern around internal coupling cavities in a single large waveguide, a single large tile with varied extraction feature patterns (symmetric or asymmetric or a desired combination, as desired) or multiple tiles with different light extraction patterns.

While a uniform distribution of light may be desired in certain embodiments, other distributions of light may be contemplated and obtained using different arrays of extraction features and/or waveguide bodies, and/or waveguide arrangements.

Other embodiments of the disclosure including all of the possible different and various combinations of the individual features of each of the foregoing embodiments and examples are specifically included herein. Thus, for example, a waveguide of one of the disclosed shapes may include extraction features of the same or a different shape, and the extraction features may be symmetric or asymmetric, the extraction features may have differing or the same geometry, spacing, size, etc. without departing from the scope of the invention.

INDUSTRIAL APPLICABILITY

In certain embodiments, the waveguides disclosed herein generally taper from a central axis to an outside edge thereof so that substantially all light is extracted during a single pass of each light ray from the LED(s) to the outer edge of the waveguide. This extraction strategy maximizes the incidence of light rays impinging on an outer side of each extraction feature and being reflected out a surface (or surfaces) of the waveguide in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Further, where the lamp is to be used for general illumination such that the plug 44 is above the waveguide, the heat exchanger 52 is effective to maintain LED junction temperature below specified limits so that LED life is maximized without the need for heat pipes and/or flex wires. Still further, the waveguide is very low profile, leaving more room for heat exchanger structures, driver components, and the like. Also, glare is reduced as compared with other lamps using LED light sources because the LED(s) are shielded from direct view by element(s), such as the conical plug member 78, and light is directed outwardly in the waveguide while being extracted from the waveguide by the extraction features such that the resulting emitted light is substantially mixed, highly collimated, and substantially uniformly distributed throughout the beam angle. The result is a light distribution that is pleasing and particularly useful for general illumination and other purposes using a light source, such as one or more LED's.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. An optical waveguide, comprising:
    a body of optically transmissive material comprising a width substantially greater than an overall thickness thereof and comprising a first side, a second side opposite the first side, an interior coupling cavity extending between the first and second sides and adapted to receive a light emitting diode, and extraction features on the second side;
    wherein the extraction features direct light out of at least the first side and wherein at least one extraction feature comprises an extraction feature depth extending from the second side toward the first side that is between about 5% and about 75% of the overall thickness of the body of material and is defined by first and second surfaces that are disposed at different angles relative to the first side;
    wherein at least one extraction feature is disposed in a ring extending at least partially around the interior coupling cavity; and
    wherein the extraction features comprise a first extraction feature disposed at a first distance from the interior coupling cavity and a second extraction feature disposed at a second distance from the interior coupling cavity, wherein the first extraction feature comprises a first tapered extraction surface and the second extraction feature comprises a second tapered extraction surface, and wherein the first tapered extraction surface and the second tapered extraction surface are disposed at different angles with respect to the first side.

2. An optical waveguide, comprising:
    a body of optically transmissive material comprising a width substantially greater than an overall thickness thereof and comprising a first side, a second side opposite the first side, an interior coupling cavity extending between the first and second sides and adapted to receive a light emitting diode, and extraction features on the second side;
    wherein the extraction features direct light out of at least the first side and wherein at least one extraction feature comprises an extraction feature depth extending from the second side toward the first side that is between about 5% and about 75% of the overall thickness of the body of material and is defined by first and second surfaces that are disposed at different angles relative to the first side;
    wherein at least one extraction feature is disposed in a ring extending at least partially around the interior coupling cavity; and
    wherein the extraction features comprise a first extraction feature disposed at a first distance from the interior coupling cavity and a second extraction feature disposed at a second distance from the interior coupling cavity, wherein the first extraction feature comprises a first tapered extraction surface and the second extraction feature comprises a second tapered extraction surface, and wherein the first tapered extraction surface and the second tapered extraction surface terminate at the second side and extend to first and second different distances, respectively, from the first side.

3. An optical waveguide, comprising:
a body of optically transmissive material comprising a width substantially greater than an overall thickness thereof and comprising a first side, a second side opposite the first side, an interior coupling cavity extending between the first and second sides and adapted to receive a light emitting diode, and extraction features on the second side;
wherein the extraction features direct light out of at least the first side and wherein at least one extraction feature comprises an extraction feature depth extending from the second side toward the first side that is between about 5% and about 75% of the overall thickness of the body of material and is defined by first and second surfaces that are disposed at different angles relative to the first side;
wherein at least one extraction feature is disposed in a ring extending at least partially around the interior coupling cavity; and
wherein the extraction features comprise a first extraction feature disposed at a first distance from the interior coupling cavity and a second extraction feature disposed at a second distance from the interior coupling cavity, and wherein the first extraction feature comprises a first pitch and the second extraction feature comprises a second pitch different than the first pitch.

4. An optical waveguide, comprising:
a body of optically transmissive material comprising a width substantially greater than an overall thickness thereof and comprising a first side, a second side opposite the first side, an interior coupling cavity extending between the first and second sides and adapted to receive a light emitting diode, and extraction features on the second side;
wherein the extraction features direct light out of at least the first side and wherein at least one extraction feature comprises an extraction feature depth extending from the second side toward the first side that is between about 5% and about 75% of the overall thickness of the body of material and is defined by first and second surfaces that are disposed at different angles relative to the first side;
wherein at least one extraction feature is disposed in a ring extending at least partially around the interior coupling cavity; and
wherein the extraction features comprise a first extraction feature disposed at a first distance from the interior coupling cavity and a second extraction feature disposed at a second distance from the interior coupling cavity, and wherein the first extraction feature comprises a first width and the second extraction feature comprises a second width different than the first width.

5. An optical waveguide, comprising:
a body of optically transmissive material comprising a width substantially greater than an overall thickness thereof and comprising a first side, a second side opposite the first side, an interior coupling cavity extending between the first and second sides and adapted to receive a light emitting diode, and extraction features on the second side;
wherein the extraction features direct light out of at least the first side and wherein at least one extraction feature comprises an extraction feature depth extending from the second side toward the first side that is between about 5% and about 75% of the overall thickness of the body of material and is defined by first and second surfaces that are disposed at different angles relative to the first side;
wherein at least one extraction feature is disposed in a ring extending at least partially around the interior coupling cavity; and
wherein a V-shaped groove extends into the waveguide from the first side, at least one rib extends outwardly from the first side, and lenslets are disposed on the first side.

6. An optical waveguide, comprising
a body of optically transmissive material comprising a width substantially greater than an overall thickness thereof and comprising a first side, a second side opposite the first side, a plurality of interior coupling cavities extending between the first and second sides each adapted to receive a light emitting diode, and extraction features on the second side;
wherein the extraction features are adapted to direct light out of at least the first side and wherein at least one extraction feature forms a taper disposed at an outer portion of the body.

7. The optical waveguide of claim 6, further comprising a reflective conical plug member extending into each interior coupling cavity for diverting light into and generally along the width of the body of material.

8. The optical waveguide of claim 7, wherein the reflective conical plug member is circular in a dimension transverse to the width and thickness of the body of material.

9. The optical waveguide of claim 8, in combination with LEDs disposed in the interior coupling cavities.

10. An optical waveguide assembly, comprising
a plurality of waveguides each comprising a body of optically transmissive material comprising a width substantially greater than an overall thickness thereof and comprising a first side, a second side opposite the first side and extraction features on the second side, and wherein at least one of the waveguides comprises an interior recess extending between the first and second sides and adapted to receive a light emitting diode;
wherein at least one extraction feature is disposed in a ring extending at least partially around the interior coupling cavity;
wherein the extraction features increase in depth with distance from the recess; and
wherein the extraction features are adapted to direct light out of at least one of the first and second sides and wherein at least one extraction feature is disposed at an outer portion of each body.

11. The optical waveguide assembly of claim 10, wherein the waveguides are integral with one another.

12. The optical waveguide of claim 10, wherein the at least one extraction feature comprises an inverted v-shape and extends fully about the interior recess.

13. The optical waveguide of claim 10, wherein the ring comprises a plurality of extraction features, each comprising a discrete prismatic shape.

* * * * *